(12) United States Patent
Budlong

(10) Patent No.: US 10,074,145 B2
(45) Date of Patent: Sep. 11, 2018

(54) METHODS FOR THE TRANSFORMATION OF COMPLEX ZONING CODES AND REGULATIONS TO PRODUCE USABLE SEARCH

(71) Applicant: Leigh Budlong, Sedona, AZ (US)

(72) Inventor: Leigh Budlong, Sedona, AZ (US)

(*) Notice: Subject to any disclaimer, the term of this patent is extended or adjusted under 35 U.S.C. 154(b) by 1086 days.

(21) Appl. No.: 14/319,937

(22) Filed: Jun. 30, 2014

(65) Prior Publication Data
US 2015/0058233 A1 Feb. 26, 2015
US 2015/0332419 A9 Nov. 19, 2015

Related U.S. Application Data

(63) Continuation-in-part of application No. 12/873,267, filed on Aug. 31, 2010, now Pat. No. 8,768,855.

(60) Provisional application No. 61/238,613, filed on Aug. 31, 2009.

(51) Int. Cl.
| | | |
|---|---|---|
| *G06Q 10/10* | (2012.01) | |
| *G06Q 30/08* | (2012.01) | |
| *G06Q 50/16* | (2012.01) | |
| *G06F 17/30* | (2006.01) | |
| *G06Q 10/00* | (2012.01) | |

(52) U.S. Cl.
CPC ..... *G06Q 50/165* (2013.01); *G06F 17/30241* (2013.01); *G06Q 10/00* (2013.01); *G06Q 50/16* (2013.01); *Y02P 90/84* (2015.11)

(58) Field of Classification Search
CPC .............................. G06Q 10/00; G06Q 50/16
USPC .......................... 705/313, 314, 315, 1.1–912
See application file for complete search history.

(56) References Cited

U.S. PATENT DOCUMENTS

| | | |
|---|---|---|
| 4,507,088 A | 3/1985 | Wilson |
| 7,346,519 B2 | 3/2008 | Carr et al. |
| 7,389,242 B2 | 6/2008 | Frost et al. |
| 7,873,524 B2 † | 1/2011 | Wenzlau |
| 7,881,948 B2 | 2/2011 | Carr et al. |
| 2010/0028719 A1 | 11/2010 | Fuhry et al. |
| 2011/0055091 A1 † | 3/2011 | Budlong |
| 2012/0290492 A1 | 11/2012 | Rodriquez |
| 2013/0036031 A1 † | 2/2013 | Hutchinson |
| 2013/0132041 A1 | 5/2013 | Sigaty |
| 2013/0159202 A1 | 6/2013 | Darden |
| 2013/0271462 A1 | 10/2013 | Frank |

(Continued)

OTHER PUBLICATIONS

Open Counter Enterprise, Inc. "Zoning Check" http://zoningcheck.com/ article dated Jul. 24, 2014 http://www.pbs.org/idealab/2014/07/what-works-where-zoningcheck-makes-zoning-data-more-open/.

(Continued)

*Primary Examiner* — Jonathan P Ouellette

(57) ABSTRACT

Computer implemented application to provide automated answers to zoning and real estate development questions by approaching the complex subject through the creation of modules representing the rules, property and process and accounting for user perspective. Real estate data, spatial data and municipal development codes, policy and zoning rules are transformed and translated into useable data enabling search, calculations, comparisons and visual display. The disclosed system facilitates zoning and/or land use development code impacts on a site selection search or specified location providing instant information about current and hypothetical building mass and use potential.

7 Claims, 67 Drawing Sheets

(56) References Cited

U.S. PATENT DOCUMENTS

2013/0290052 A1  10/2013  Settino
2013/0346151 A1  12/2013  Bleakley et al.
2014/0136294 A1   5/2014  Martinovic et al.

OTHER PUBLICATIONS

City of San Francisco, "Property Information Map" http://ec2-50-17-237-182.compute-1.amazonaws.com/PIM/ press release dated Mar. 30, 2011 http://www.sf-planning.org/index.aspx?page=2719&recordid=23.
City of Austin, "Zoning Profile Report" http://www.austintexas.gov/gis/ZoningProfile/ press release dated May 8, 2014 http://austintexas.gov/news/city-launches-new-%E2%80%9Czoning-profile-report%E2%80%9D-web-tool.
Blockbrief, "ZoningAlerts" http://zoningalerts.com/ press release dated Jul. 16, 2013 http://blog.blockbrief.com/blockbrief-launches-in-the-us-as-zoning-alerts/.
Create, Inc, www.create.io, 2015, web based application using structured zoning to provide numeric and visual outputs, Washington, DC.
Trimble Navigation Limited, Real Estate & Workplace Solutions, 2015, www.realestate.trimble.com/en-am/industry/real-estate, Sunnyvale, CA.
Costar Group, Costar Property, 2015, www.costar.com, www.costar.com/products/costar-property, Washington, DC.
Core Logic, Inc., Commercial Real Estate Data, 2015, www.corelogic.com/landing-pages/commercial-real-estate-data-and-analytic-capabilities.aspx#container-Products, Irvine, CA.

† cited by third party

FIG 1—Clarity to cross referenced parts of the existing zoning codes

17.24.070 Permitted facilities.

The following facilities, as described in the use classifications in Chapter 17.10, are permitted:
A. Residential Facilities
One-Family Dwelling
One-Family Dwelling with Secondary Unit, subject to the provisions specified in Section 17.102.360
Two-Family Dwelling
B. Nonresidential Facilities:
Enclosed
Open
C. Signs
Residential
Special
Development
Realty
Civic
D. Telecommunications Facilities
Micro, except as provided in Chapter 17.128
Mini, except as provided in Chapter 17.128

> Zoning codes are written based on the notion of "on an increase in intensity" so referencing other sections is the norm.
>
> Zonability collects those data pieces cited in another section to make a user looking at this code see a "complete" list sometimes with a synopsis to standardized language.

FIG 2a—Uses are broken down for individual look ups by a particular code or use and its approval rating by the code, i.e. by right, subject to special approval

| ZONING DISTRICT | OTHER PRINCIPAL USES (Permitted as of Right) (§§209–209.9) | OTHER CONDITIONAL USES (Subject to Commission Approval) (§§209–209.9) |
|---|---|---|
| RH-1(D) House, One-Family (Detached Dwellings) (§206.1) | | Residential care facility for 6 or fewer, child care facility for 12 or fewer, open space for horticulture or passive recreation, public structure or use of non-industrial character, sale or lease of sign. |
| RH-1 House, One-Family (§206.1) | | |
| RH-1(S) House, One-Family with Minor Second Unit (§206.1) | Residential care facility for 6 or fewer, child care facility for 12 or fewer, open space for horticulture or passive recreation, public structure or use of non-industrial character, sale or lease of sign. | |

FIG 2b—Shows the invention taking the zoning code "use" information and adding a category that people readily understand

Zoning Information

RH-2 is Residential Housing.

| What is Allowed? | |
|---|---|
| Uses Per Zoning | Examples/Details |
| Duplexes | 2 residential units |
| Residential care | 6 beds or fewer |
| Child Care | 12 children or fewer |
| Open Space | Parks, gardens |
| Public Use | Non-commercial |

At Home

At Gov

As shown with invention: uses are organized by category "at home", "at work", "at play", "at gov", and listed in a clear manner. Users can do data retrieval and ask for zoning allows for "at home" uses or a specific use like "child care".

FIG 3—Shows invention's method of breakdown of data by zoning code and specified use.

| | A | H | L | M | N | O | P |
|---|---|---|---|---|---|---|---|
| | | Except RH1-(D) | RH-1 | RH-1 (S) | RH-2 | RH-3 |
| 1 | | | | | | | |
| 2 | SEC. 209.1-209.9 RESIDENTIAL | | | | | | |
| 3 | Single family home | P | P | P | P | P |
| 4 | Single family home with minor 2nd unit | P | P | P | P | P |
| 5 | Duplex | | | | P | P |
| 6 | Triplex | | | | | P |
| 7 | Apartment | | | | | |
| 8 | Residential care - 6 bed or fewer | P | P | P | P | P |
| 9 | Childcare -12 or fewer | P | P | P | P | P |
| 10 | Residential care - 7+ beds | C | C | C | C | C |
| 11 | Childcare -13+ children | C | C | C | C | C |
| 12 | Group housing (boarding & religious) | | | | | C |
| 13 | Hotel - 5 rooms | | | | | |
| 14 | Childcare -13+ children (limited to ground floor) | | | | | |
| 15 | Hotel - 5 rooms (limited to ground floor) | | | | | |
| 16 | Hotel - 6 room (limited to ground floor) | | | | | |
| 17 | Live/work-art | | | | | |
| 18 | Auto parking | C | C | C | C | C |
| 19 | Elementary school | C | C | C | C | C |
| 20 | Secondary school | C | C | C | C | C |
| 21 | Greenhouse | C | C | | | |
| 22 | Plant nursery | | | | | |
| 23 | Private recreation facility | | | | | |

P = Permitted Use   C = Conditional Use

FIG 4 Shows typical table format for "Size" information related to Zoning Ordinance rules

| ZONING DISTRICT | MINIMUM LOT SIZE (§121) | AREA RATIO (Other than Dwellings) (§124) | FRONT SET-BACK REQUIREMENTS (§132) | REAR YARD REQUIREMENTS (§134) |
|---|---|---|---|---|
| RH-1(D) House, One-Family (Detached Dwellings) (§209.1) | Width: 33 ft. Area: 4000 sq.ft. | 1.8 times lot area | Based upon average of adjacent buildings; up to 15 ft. or 15% of lot depth | 25% of lot depth, but no less than 15 feet |
| RH-1 House, One-Family (§209.1) | Width: 25 ft. Area: 2500 sq.ft. | 1.8 times lot area | Based upon average of adjacent buildings; up to 15 ft. or 15% of lot depth | 25% of lot depth, but no less than 15 feet |

NOTE: Existing data sources do not allow a user to look up a minimal lot size for a specific zoning code or to ask what zoning supports a specified "size" related issue, i.e. minimal lot size of 2,500.

FIG 5—Shows invention's method of breakdown of data by zoning code and size requirements

| | A | B | C | D | E | F | G | H |
|---|---|---|---|---|---|---|---|---|
| 1 | Zoning | City | | | Merged | Min. Lot Size | Min. Lot Width | Max Height |
| 2 | RH-1 (D) | San Francisco | One | RH-1 | Resi | 4000 | 25 | 35 |
| 3 | RH-1 | San Francisco | One | RH-1 | Resi | 2500 | 25 | 35 |
| 4 | RH-1 (S) | San Francisco | One | RH-1 | Resi | 2500 | 25 | 35 |
| 5 | RH-2 | San Francisco | Two | RH-2 | Resi | 2500 | 25 | 40 |
| 6 | RH-3 | San Francisco | Three | RH-3 | Resi | 2500 | 25 | |
| 7 | RM-1 | San Francisco | | | Mixe | 2500 | 25 | |
| 8 | RM-2 | San Francisco | | | Mixe | 2500 | 25 | |
| 9 | RM-3 | San Francisco | | | Mixe | 2500 | 25 | |
| 10 | RM-4 | San Francisco | | | Mixe | 2500 | 25 | |
| 11 | RC-3 | San Francisco | | | Resi | 2500 | 25 | |
| 12 | RC-4 | San Francisco | | | Resi | 2500 | 25 | |
| 13 | RED | San Francisco | | | Resi | 2500 | 25 | |
| 14 | RTO | San Francisco | | | Resi | 2500 | 25 | |
| 15 | C1 | San Francisco | | | C1 San Fra | 2500 | 25 | |
| 16 | C2 | San Francisco | | | C2 San Fra | 2500 | 25 | |
| 17 | C3-O | San Francisco | | | C3-O San | 2500 | 25 | |
| 18 | C3-R | San Francisco | | | C3-R Sa | 2500 | 25 | |
| 19 | C3-G | San Francisco | | | C3-G Sa | 2500 | 25 | |
| 20 | C3-S | San Francisco | | | C3-S Sa | 2500 | 25 | |
| 21 | C-M | San Francisco | | | C-M San | 2500 | 25 | varies |
| 22 | M-1 | San Francisco | | | M-1 San | 2500 | 25 | 40 |
| 23 | M-2 | San Francisco | | | M-2 San | 2500 | 25 | 40 |
| 24 | NC-1 | San Francisco | | | NC-1 San F | 2500 | 25 | |
| 25 | NC-2 | San Francisco | | | NC-2 San f | 2500 | 25 | |
| 26 | NC-3 | San Francisco | | | NC-3 San f | 2500 | 25 | |

FIG 6—Shows sample report with method to compare the zoning rules with a particular property to develop a hypothetical "what can be built" and what uses are "allowed"

RH-2 is Residential Housing

| What is Allowed? | | What is Allowed With Special Permission? | |
|---|---|---|---|
| Uses Per Zoning Examples/Details | | Uses Per Zoning Examples/Details | |
| Duplexes · 2 residential units | | Residential care · 7 beds or more | |
| Residential care · 6 beds or fewer | | Child Care · 13 children or more | |
| Child Care · 12 children or fewer | | Schools/Education · Elementary, secondary or medical | |
| Open space · Parks, gardens | | Group Housing · Boarding houses, religious orders | |
| Public Use · Non-commercial | | Small Hotel · Up to 5 rooms | |

What Size Building Can Be Built?

| Criteria | Requirements | Your Property |
|---|---|---|
| Minimum lot size in sf | 2,500 | |
| Minimum lot width in feet | 25 | |
| Front yard in feet | 15 | |
| Rear yard in feet | Calculated one of two ways: take 45% of the lot's depth or average the adjacent buildings. The last 10 feet is limited to a 30 foot height. | |
| Maximum Number of Residential Units | 2 | |
| Floor Area Ratio – residential | Take lot area and divide by 1,500. | |
| Floor Area Ratio – for commercial | 1.8 | |
| Maximum Height | 40 feet (30 feet at front) | |

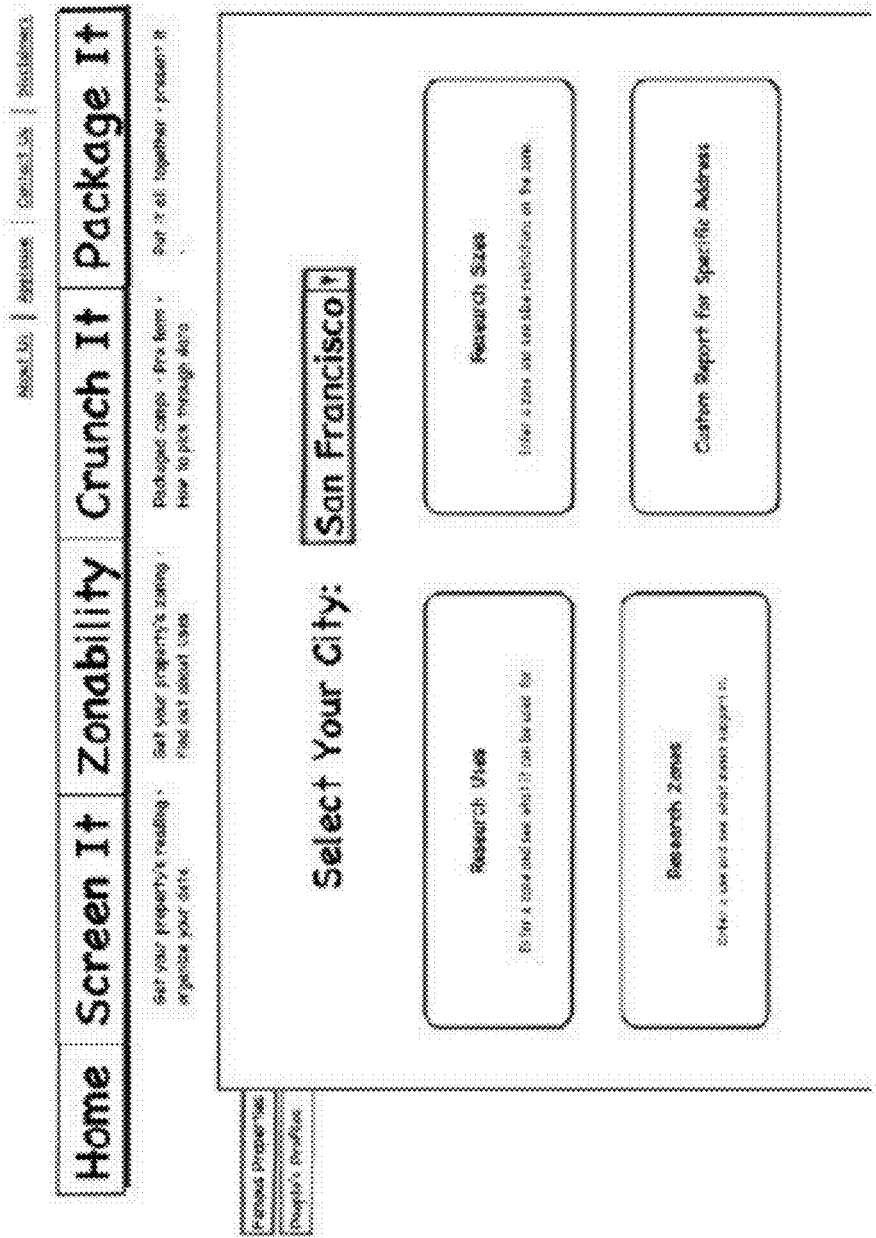
FIG 7—Shows screen shots in development for user to search database (excludes parking/signage/"watch use" and "watch code" list (www.DIYvalue.com and www.zonability.com)

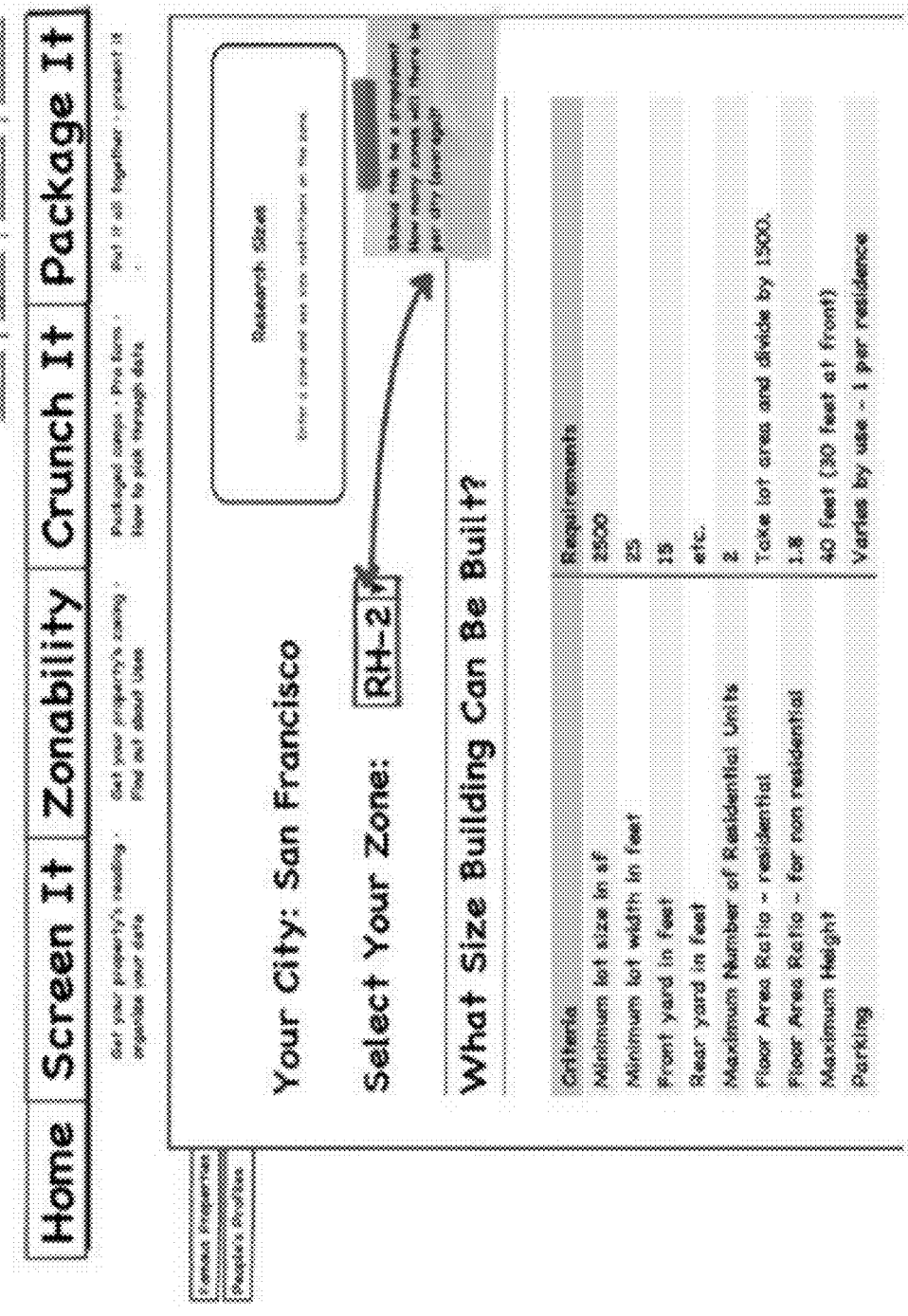
FIG 8—Shows another inventor's screen shots: the process of looking up "Size" data by a specified zoning code for a specified city (this could also be a county)

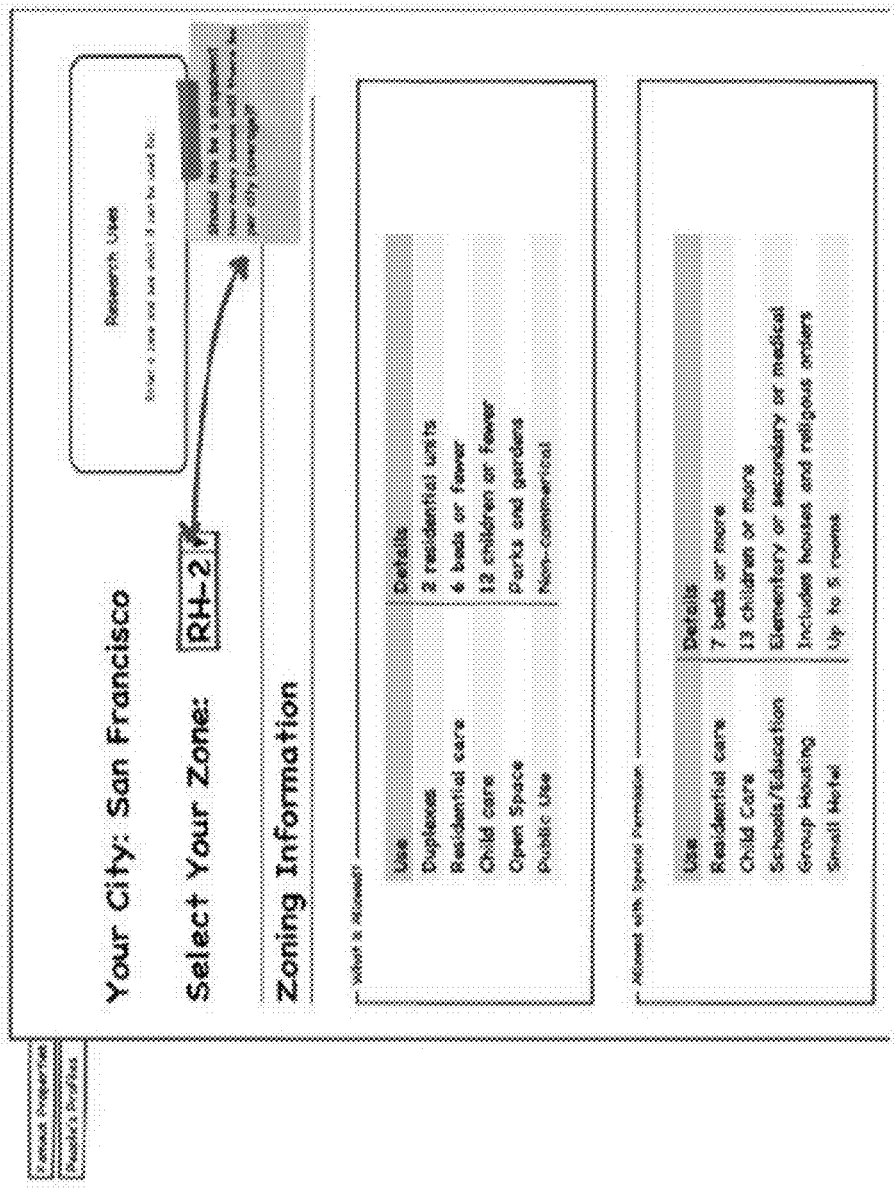
FIG 9—Shows inventor's screen shot showing process of looking up "Use" data by a specified zoning code for a specified city (this could also be a county)

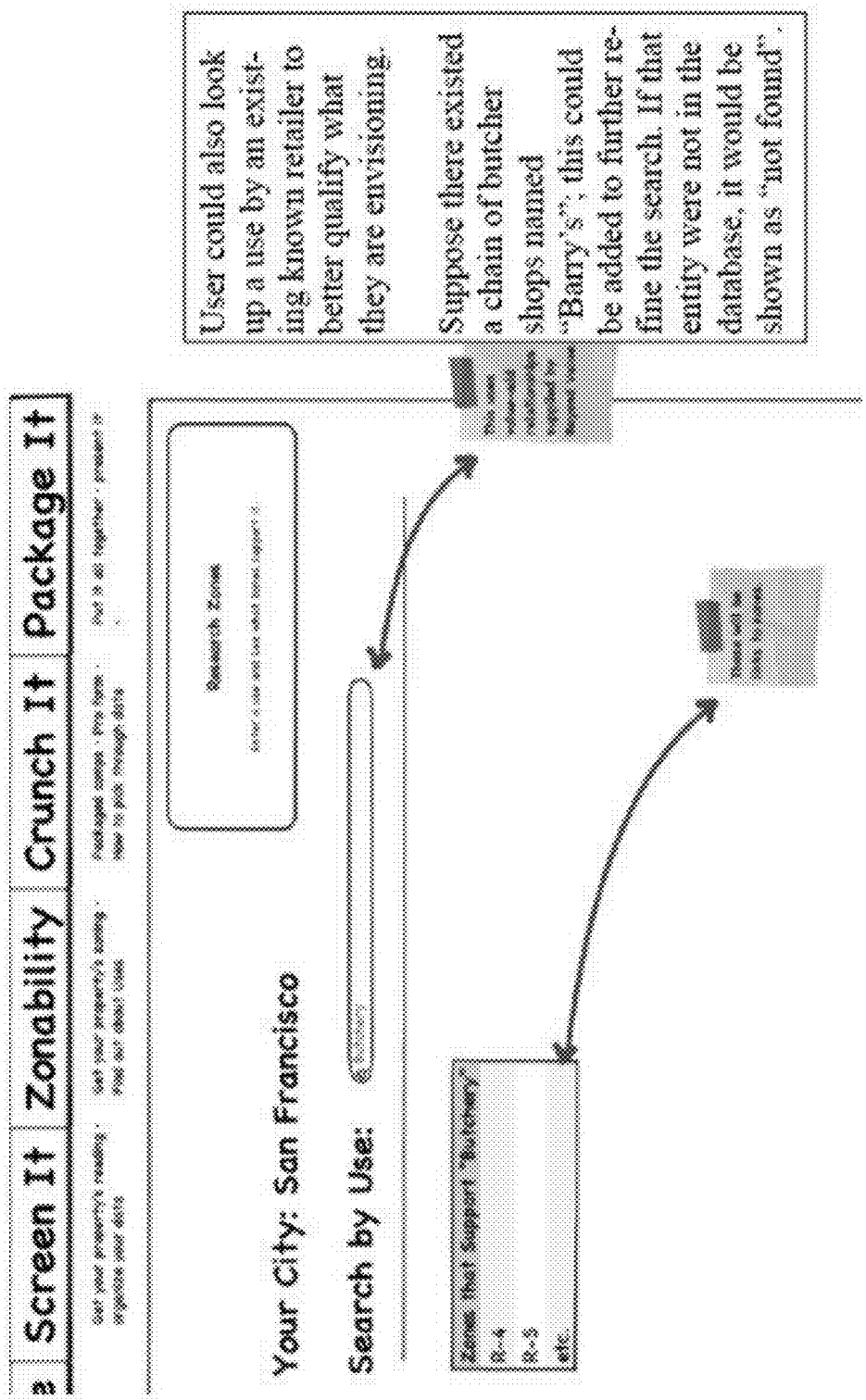
FIG 10—Shows process of looking up "Specified Use" and the results show what zoning codes allow that specified use (this does not show option for user to see list of uses by a specified "use category" as referenced in the patent "at play", "at work", "at home", "at gov")

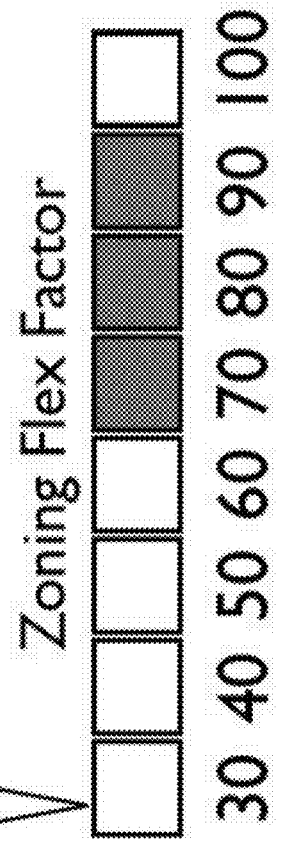
FIG 11 - Shows design for Zonability Flexibility Rating

FIG 12—Shows drawing for Zoning Score

The score is 0 to 100

90 to 100 is an excellent score | No roadblocks detected and possibly upside potential
75 to 89 a good score | Minor number of roadblocks detected/possibly upside potential
50 to 74 a moderate score | Suggests a few hurdles and no upside potential detected
25 to 49 a fair score | Suggests a few hurdles to jump through/some downside risk Necessary steps to create a Zoning Score
This relates to a specific property.
1. Set of development standard rules for a particular zoning code
2. List of uses permitted for a particular zoning code
3. Size characteristics with an emphasis on lot size, building heights, project density and overall size (floor area ratio—FAR)
4. Other physical traits including year built, last remodel, parking and construction type.

1. The Zoning Score generates automatically using available data.
2. The Zoning Score can change as the user interacts with the data.

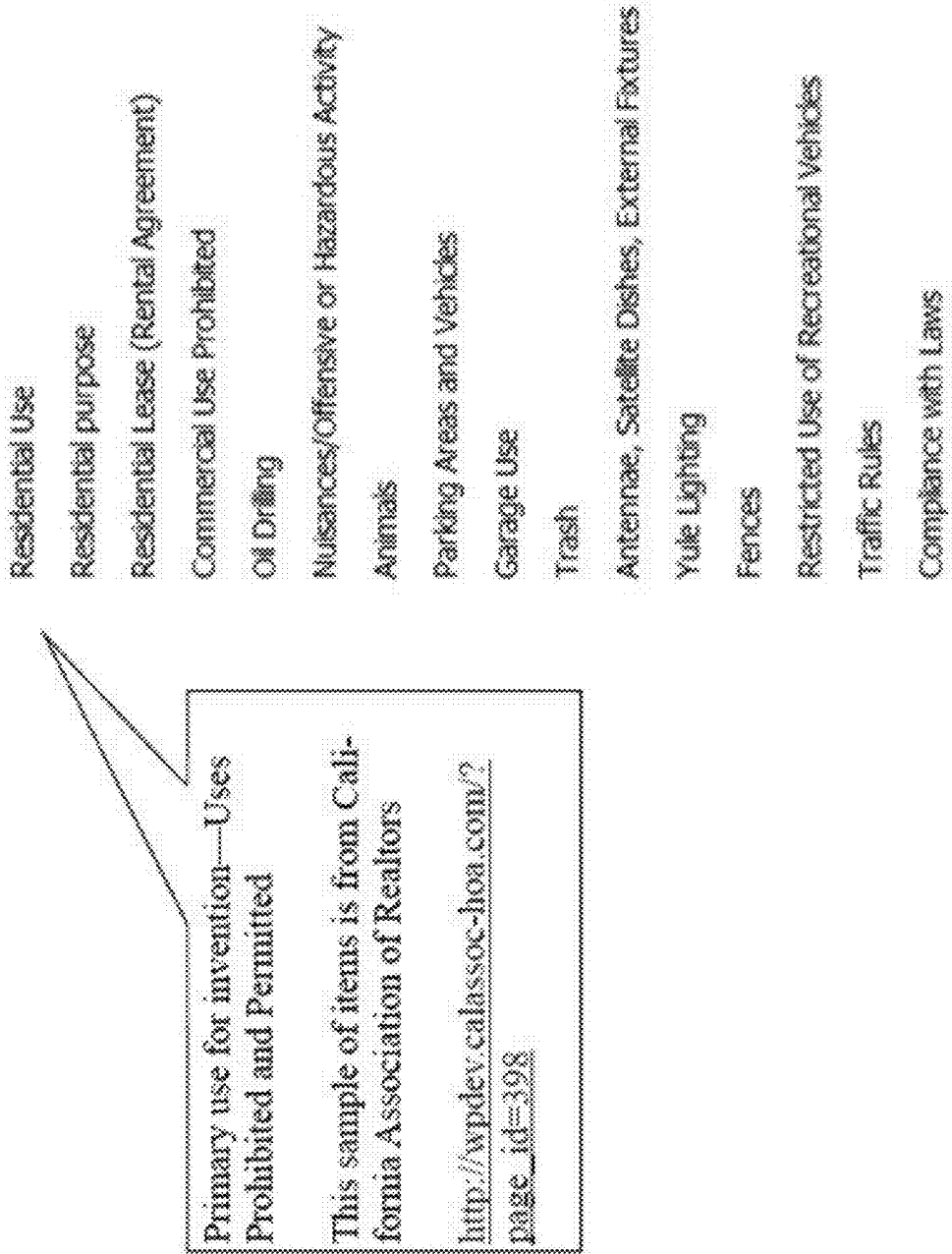
FIG 13—Shows a sample CC&R document and provides an example of the section relevant to this invention for data retrieval

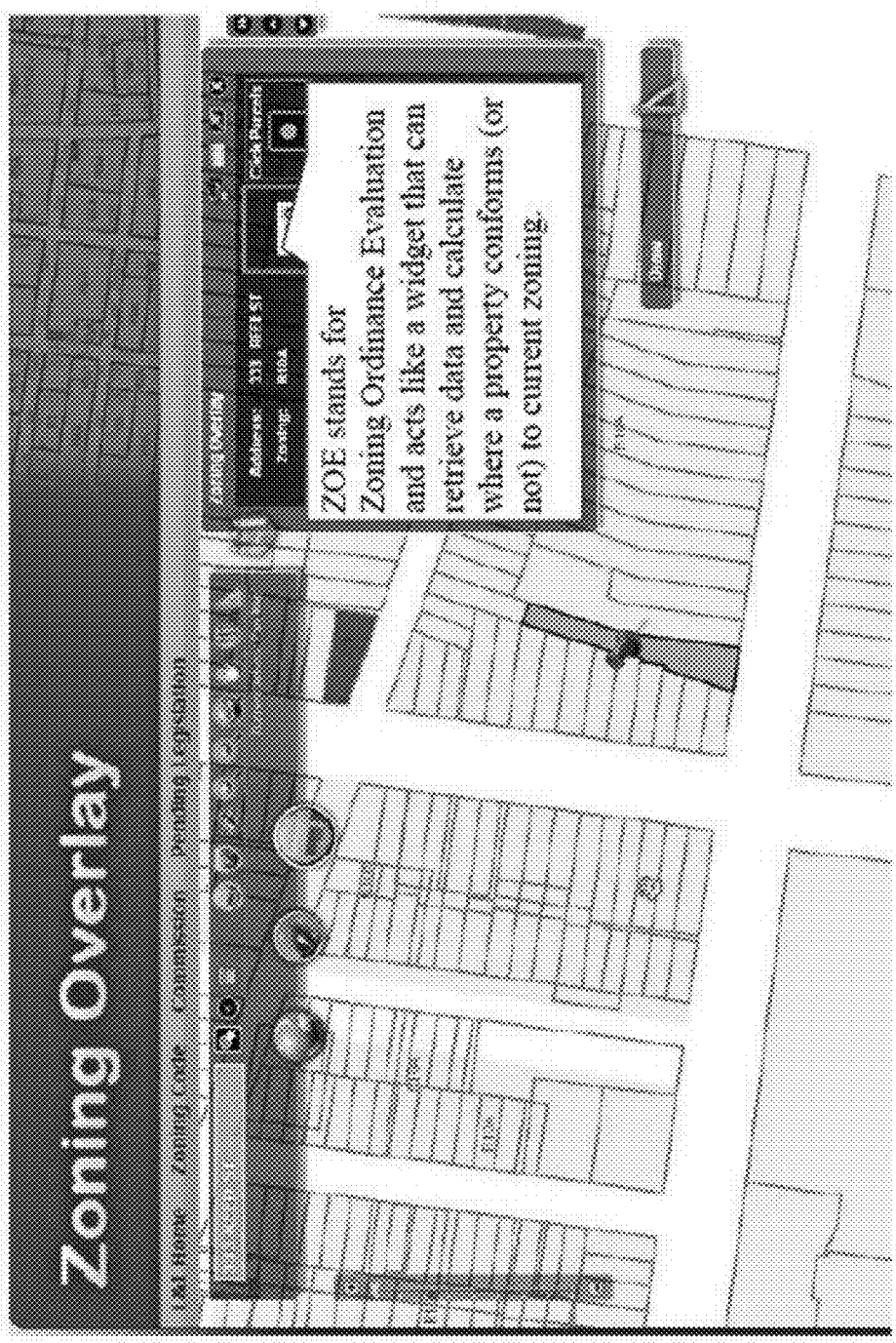
FIG 14—Shows how the invention could be used with existing sites using a widget or API application program interface FIG 15—Shows drawing for Size related output from the Zoning Code Rules

| What is the Size Criteria? | Details |
|---|---|
| Minimum lot size | 5,000 sf |
| Minimum lot width | 50 feet |
| Front yard setback | none |
| Rear yard setback | 15 feet |
| Side yards setback | 5 feet |
| For multiple units: lot size per unit | 2,500 sf |
| Maximum House size | 0.65 |
| Coverage Ratio | 50.0% |
| Maximum Height | 32 feet |
| Parking | 2 per residence |

FIG 16—Shows drawing for Use related output

| What Is Allowed by Use? | Details |
|---|---|
| Single Family Home | n/a |
| Duplexes | 2 residential units |
| Home occupations | Restrictions on use/ employees/ license required |
| Residential Care | 6 beds or fewer |
| Small Family Child Care | 12 children or fewer |
| Accessory Uses | Limited size and location |
| Storage accessory | Restrictions on use/location |
| Open Space | Parks, gardens |
| Piers, docks, floats | For pleasure crafts – some restrictions |
| Utility lines | No details available |

FIG 17—Shows the internal calculation that uses a data provider, like GIS technology, or user entered data regarding the property's attributes such as lot size, house size etc. in comparison to the zoning code rules.

| What is the Size Criteria? | Details | Property | Result |
|---|---|---|---|
| Minimum lot size | 5,000 sf | 9,500 | Conforms |
| Minimum lot width | 50 feet | 80 | Conforms |
| Front yard setback | none | ? | |
| Rear yard setback | 15 feet | ? | |
| Side yards setback | 5 feet | ? | |
| For multiple units: lot size per unit | 2,500 sf | n/a | |
| Maximum House size | 0.65 | 0.23 | Conforms |
| Coverage Ratio | 50.0% | ? | |
| Maximum Height | 32 feet (or approximately 3 +/- stories) | ? | |
| Parking | 2 per residence | ? | |

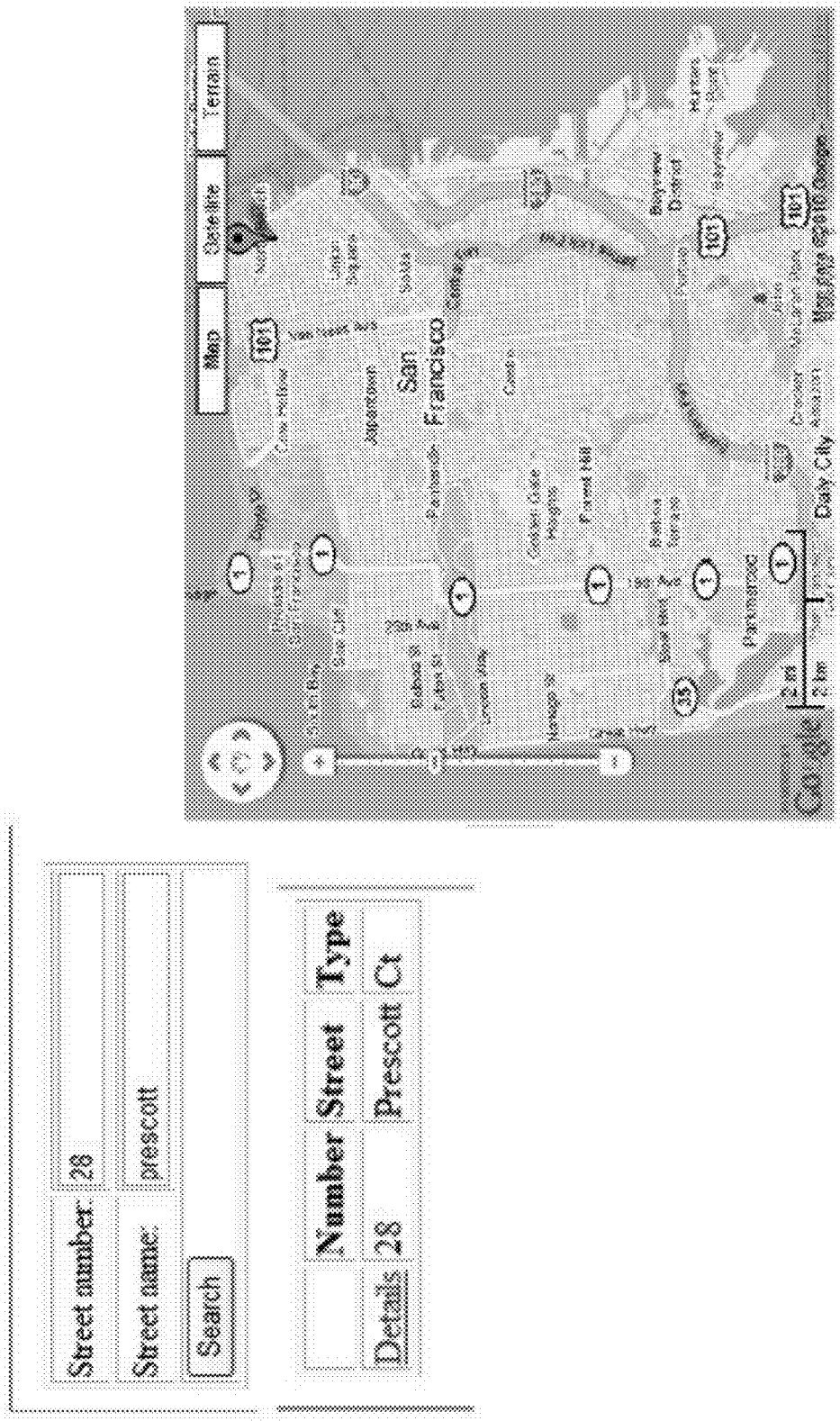
FIG 18—Shows screenshots using GIS technology—users enter in address

FIG 19a—Shows screenshots using GIS technology—clicking "details" provides extensive content culled from the database.

Address

| Street number: | 28 |
| Street name: | Prescott |
| Street type: | Ct |
| Zip code: | 94133 |
| Neighborhood (Planning) | North Beach |
| Neighborhood (Realtor) | Telegraph Hill |

Lot information

| Lot number | 0143030 |
| Lot area | 1300.23 sq. ft. |
| Land use | Residential |

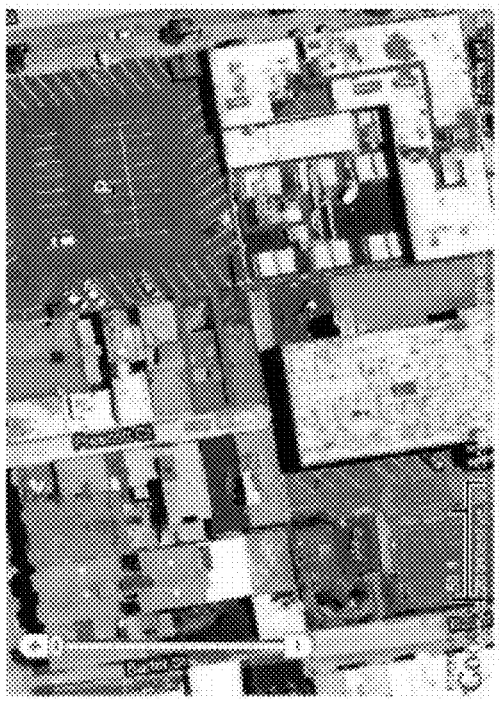
FIG 19b—Shows screenshots using GIS technology—clicking "details" provides extensive content culled from the database.

FIG 20a—Shows screenshots using GIS technology—focus is to show sample of data culled from the database and the calculations referred to as Z.O.E. (zoning ordinance evaluation)

| Street number: | 28 |
| Street name: | Prescott |
| Street type: | Ct |
| Zip code: | 94133 |
| Neighborhood (Planning) | North Beach |
| Neighborhood (Realtor) | Telegraph Hill |

Lot information

| Lot number | 0143030 |
| Lot area | 1300.23 sq. ft. |
| Land use | Residential |

Zoning information

| Zone code: | RH-3 |
| Zone name: | House, Three-family |

FIG 20b—Shows screenshots using GIS technology—focus is to show sample of data culled from the database and the calculations referred to as Z.O.E. (zoning ordinance evaluation)

| One-family dwelling |
| Senior citizens or physically handicapped housing - special rules - see City |
| Two-family dwelling |
| Three-family dwelling |

Restrictions

| | Name | Value | Unit |
|---|---|---|---|
| 1. | Minimum lot size | 2500 | square feet |
| 2. | Minimum lot width | 25 | linear feet |
| 3. | Floor area ratio (FAR) | 1.8 | floor area ratio |
| 4. | Density-lot size | 1000 | square feet |
| 5. | Setback - front | 15 | linear feet |
| 6. | Setback - rear | 0.45 | percentage of lot's depth |
| 7. | Setback - sides | 0 | linear feet |
| 8. | Open space | 100 | square feet | zoe

FIG 20c—Shows screenshots using GIS technology—focus is to show sample of data called from the database and the calculations referred to as Z.O.E. (zoning ordinance evaluation)

| Restrictions | Outcomes* |
|---|---|
| Name |  |
| Minimum lot size | 1. Ok |
| Minimum lot width | 2. Ok |
| Floor area ratio (FAR) | 3. Ok |
| Density-lot size | 4. Ok |
| Setback - front | 5. Not ok |
| Setback - rear | 6. Maybe/maybe not ok |
| Setback - sides | 7. Ok |
| Open space | 8. Ok |

*Does the criteria conform or not to the zoning rules? Users will be able to override content to check data and the sensitivity.

FIG 20d—Shows screenshots using GIS technology—focus is to show sample of data culled from the database and the calculations referred to as Z.O.E. (zoning ordinance evaluation)

Address

| | |
|---|---|
| One-family dwelling | |
| Senior citizens or physically handicapped housing - special rules - see City | |
| Two-family dwelling | |
| Three-family dwelling | |

Restrictions

| | Name | Value | Unit |
|---|---|---|---|
| 1. | Minimum lot size | 2500 | square feet |
| 2. | Minimum lot width | 25 | linear feet |
| 3. | Floor area ratio (FAR) | 1.8 | floor area ratio |
| 4. | Density-lot size | 1000 | square feet |
| 5. | Setback - front | 15 | linear feet |
| 6. | Setback - rear | 0.45 | percentage of lot's depth |
| 7. | Setback - sides | 0 | linear feet |
| 8. | Open space | 100 | square feet | zoe

Outcomes*
1. Ok
2. Ok
3. Ok
4. Ok
5. Not ok
6. Maybe/maybe not ok
7. Ok
8. Ok

*Does the criteria conform or not to the zoning rules? Users will be able to override content to check data

| Street number: | 28 |
| Street name: | Prescott |
| Street type: | Ct |
| Zip code: | 94133 |
| Neighborhood (Planning) | North Beach |
| Neighborhood (Realtor) | Telegraph Hill |

Lot information

| Lot number: | 0143030 |
| Lot area: | 1500.25 sq. ft. |
| Land use: | Residential |

Zoning information

| Zone code: | RH 3 |
| Zone name: | House, Three-family |

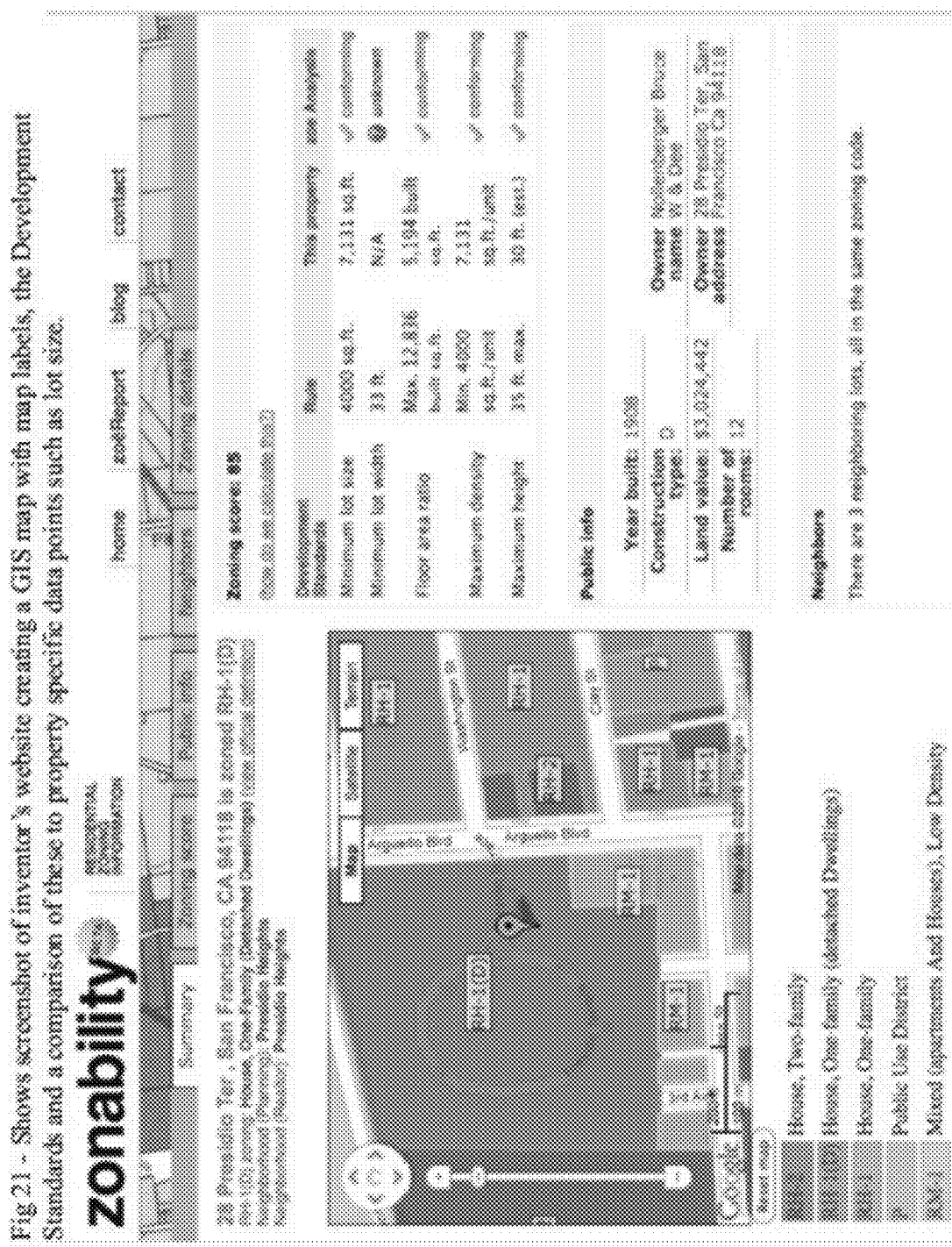
Fig. 21 - Shows screenshot of inventor's website creating a GIS map with map labels, the Development Standards and a comparison of these to property specific data points such as lot size.

Fig. 22 - Shows combination of screenshots from the inventor's website and data retrieval options. "Specific to this zoning code" such as uses no longer approved San Francisco Zone: RH-1(D)
Name: House, One-Family (Detached Dwellings)

Description: These districts are characterized by lots of greater width and area than in other parts of the City, and by single-family houses with side yards. The structures are relatively large, but rarely exceed 35 feet in height. Ground level open space and landscaping at the front and rear are usually abundant. Much of the development has been in scalable tracts with similarities of building style and narrow streets following the contours of hills. In some cases private covenants have controlled the manner of development and helped to maintain the street scene.

Zoning details

✓ One-family house, free-standing
✓ Housing designation for senior citizens
✓ Housing designation for physically handicapped
✓ Child care facility
✓ (a need more items)

Specific to this zoning code
Zoning stats - percentage of properties zoned, average lot size, average building size
Variances - a list of addresses, as mapped, public record application information
Historic properties - a list of addresses, as mapped
Uses no longer approved in this zoning code
Conditional uses - a list of uses requiring special permission
Carbon trading opportunities and risks
Planning Commissioner outcomes - a list of addresses, as mapped

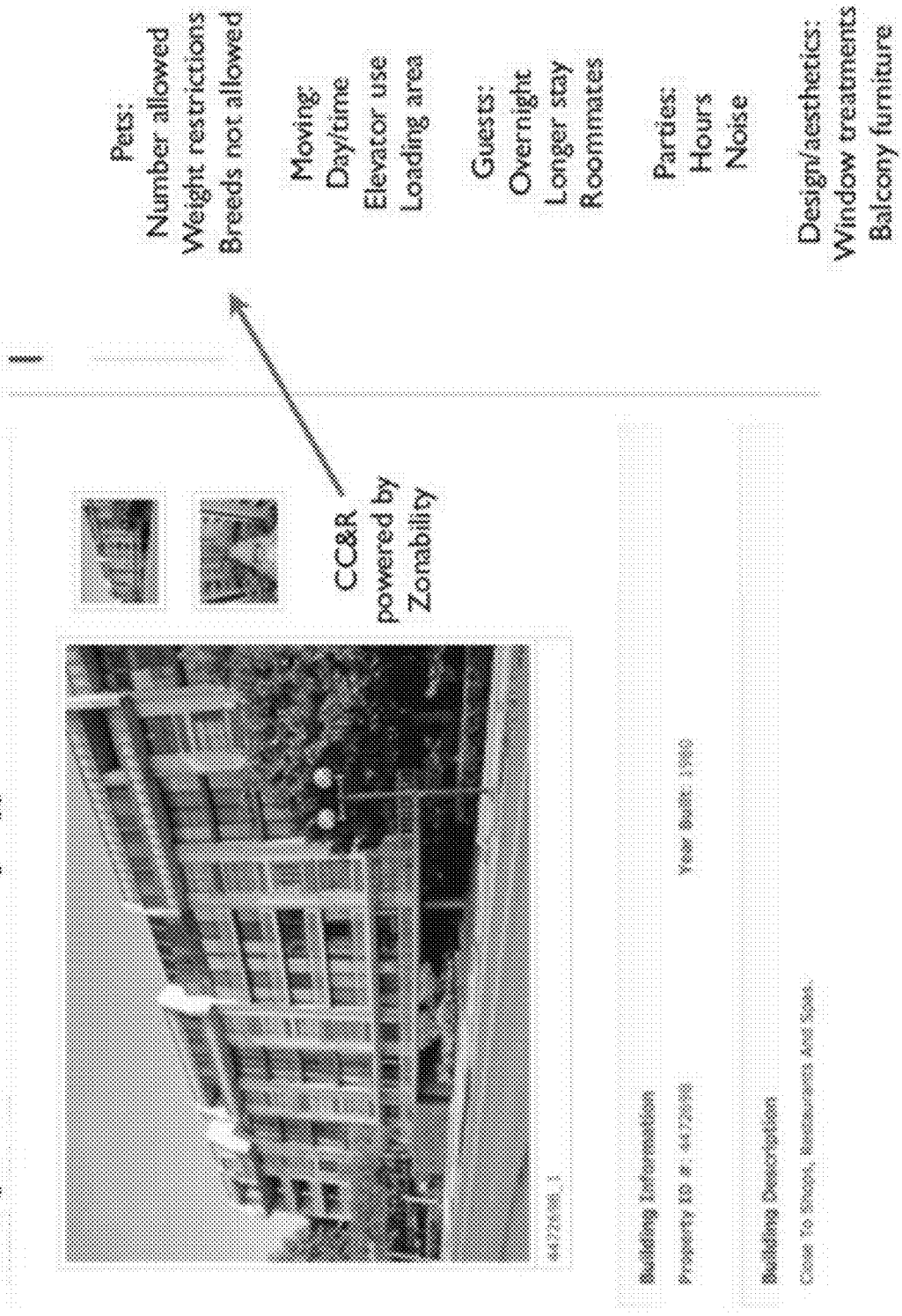
Fig 23 - Shows combination of screenshots from the inventor's website and data retrieval options "Specific to this zoning code" such as uses no longer approved Fig 24 - Shows examples of a pre-formatted email that creates a form allowing the Planner to click on answers - the idea is to improve the efficiency of communication.

Pre-populated Letter

Hello SF Planning:

I'm a potential (homebuyer, remodeler, business owner, renter, un-described) and want to get a firm understanding of the zoning impacts for:

22 Hancock Avenue, San Francisco

Can you please confirm its zoning is:
RH-2 (yes, no - if no, please let me know other _____)
Are there any overlays that impact it? (yes, no - if yes, please list/describe _____) and
Does the property how a historic status? (none, yes - if yes, potential natural resource, historic significance, landmark status, other _____)

Inquiry about What Might Be Possible:
in-law unit - Please let me know more about how to (add, legalize, remove) an in-law at this property
roof deck - What are the steps to build a deck approximately (2' feet or less, 2' higher or higher off the ground) and (____ sf)
solar panels - What is the approval process to add solar panels (on the roof, other _____)
change of use - Per zoning, how would this space work as a potential (store, restaurant, cafe, bar, urban farm, start up office, professional office, medical office, studio, residential unit, (blank) ); ie. was a (garage, store, office, residential unit, "not sure")

o Open field

Thank you for your assistance!

their name (optional)
email only

This letter was generated on a mobile device.

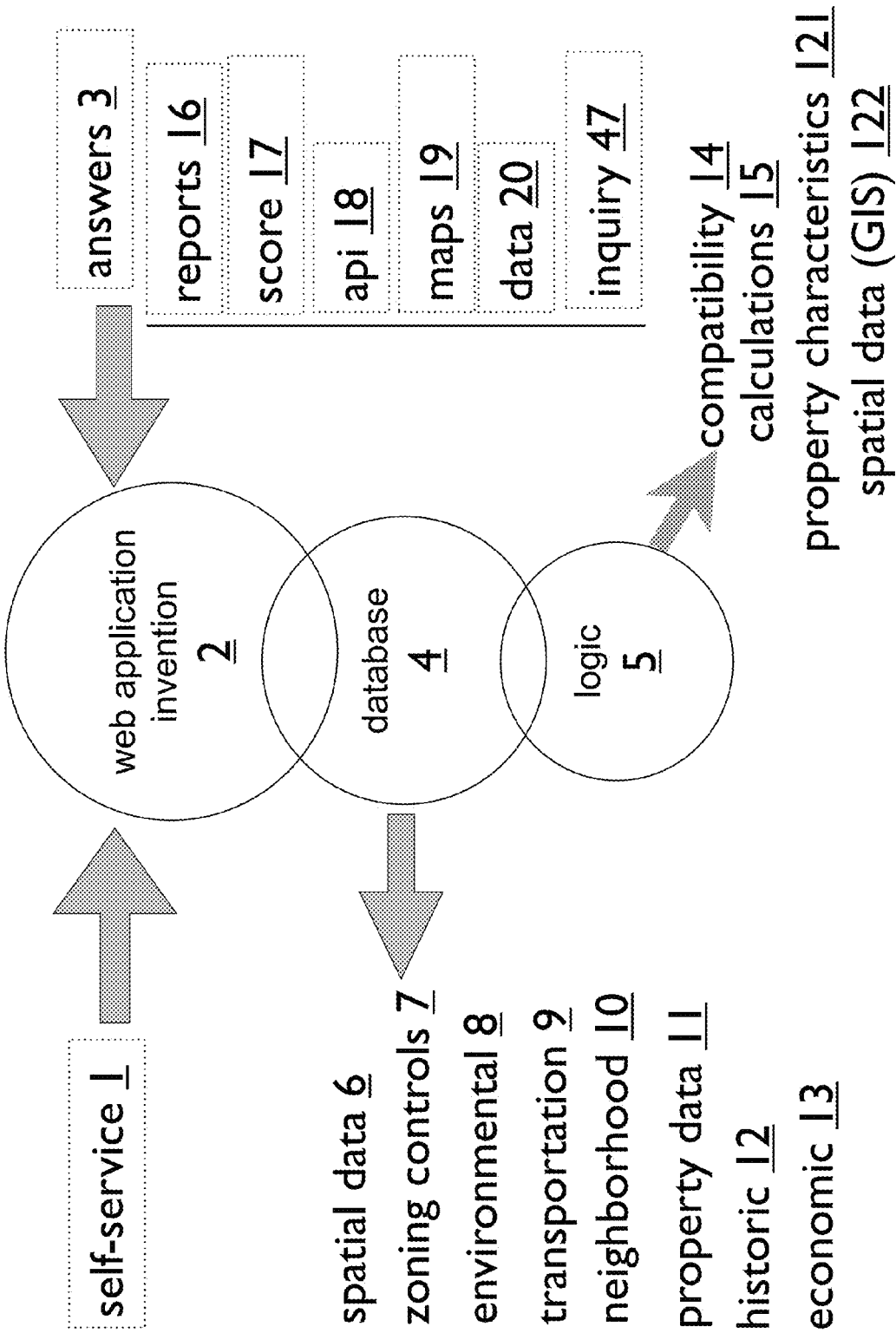
Fig 25 - Application Elements

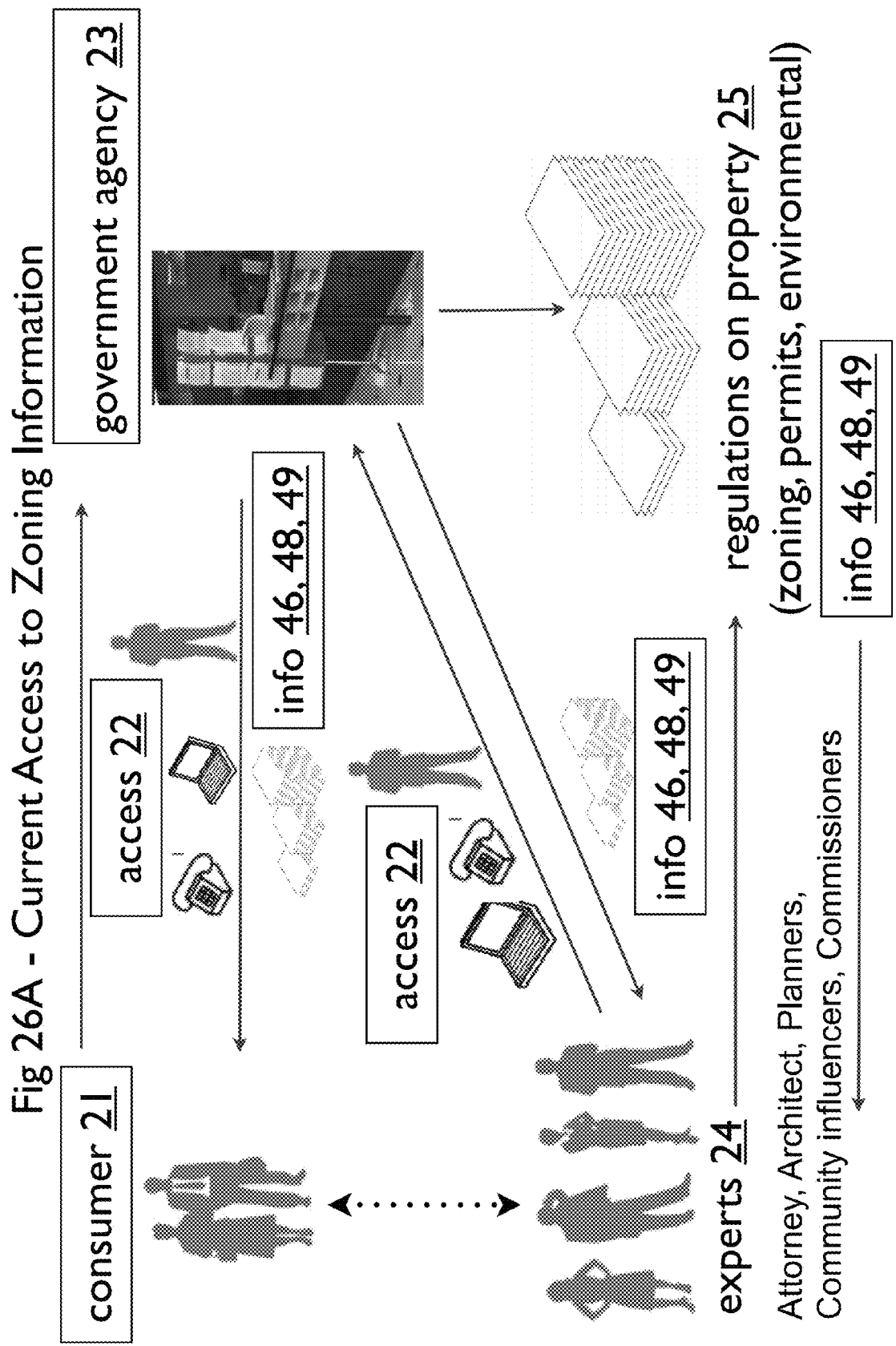

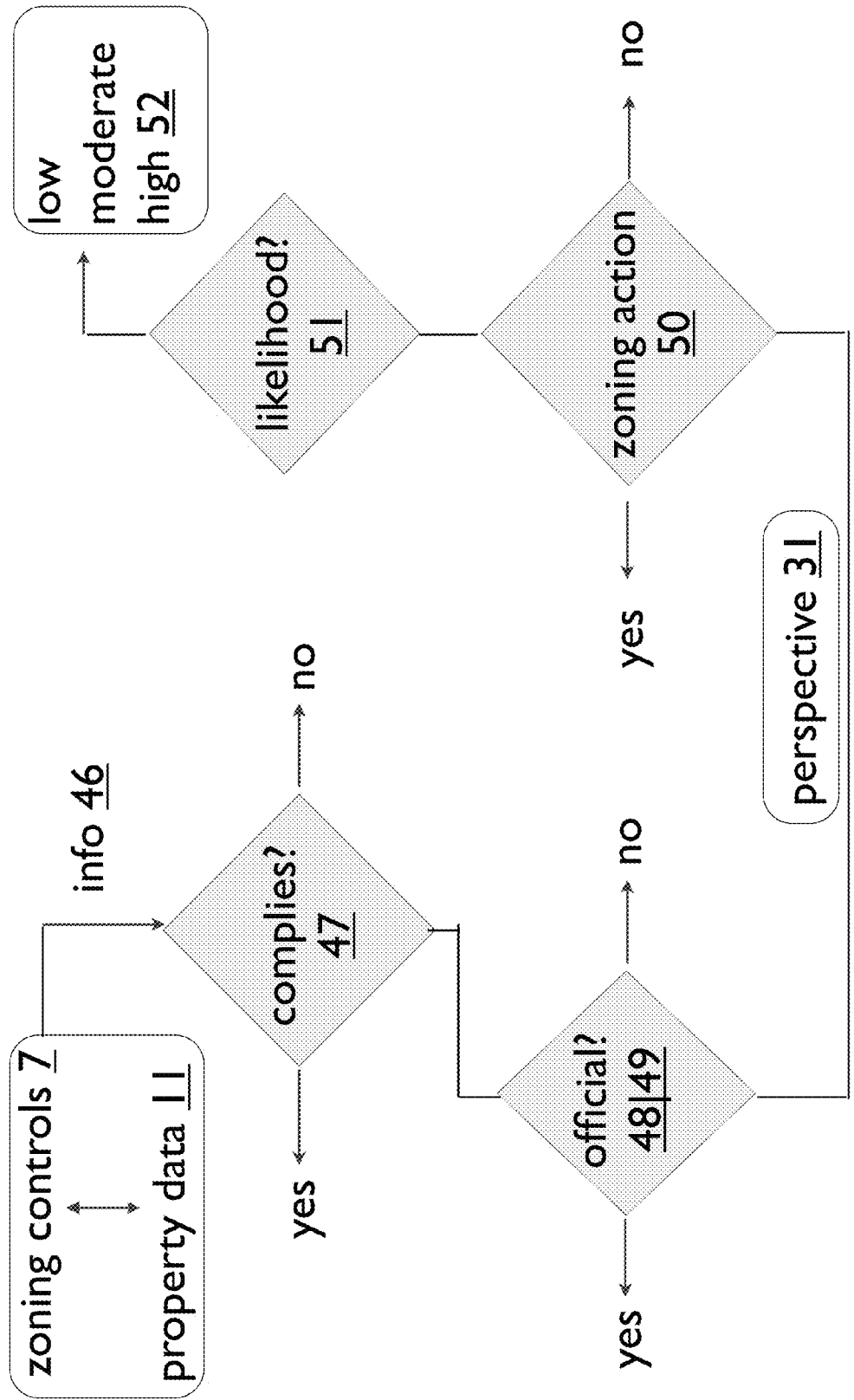
Fig 26B - Zoning Information Decision Tree

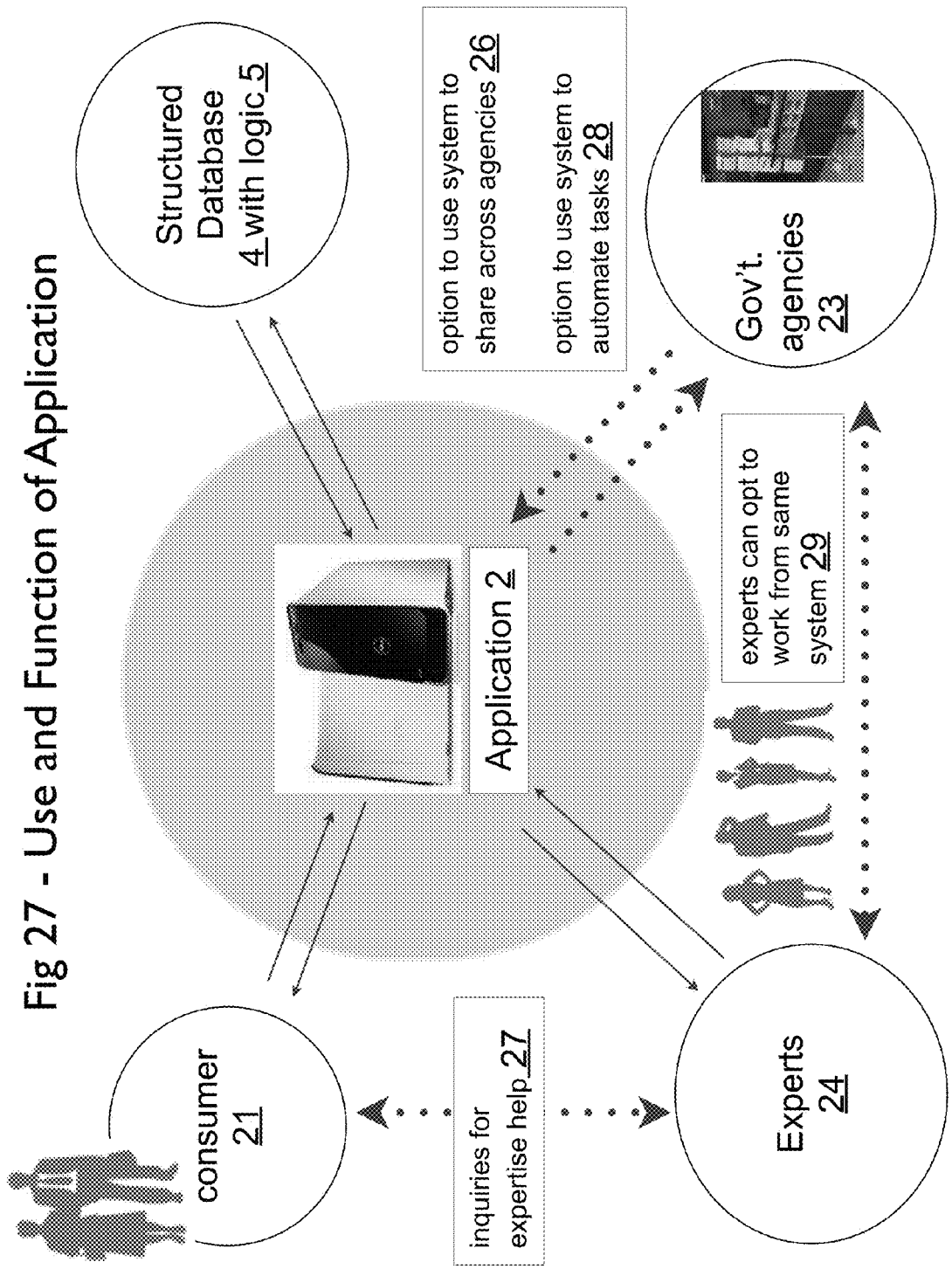
Fig 27 - Use and Function of Application

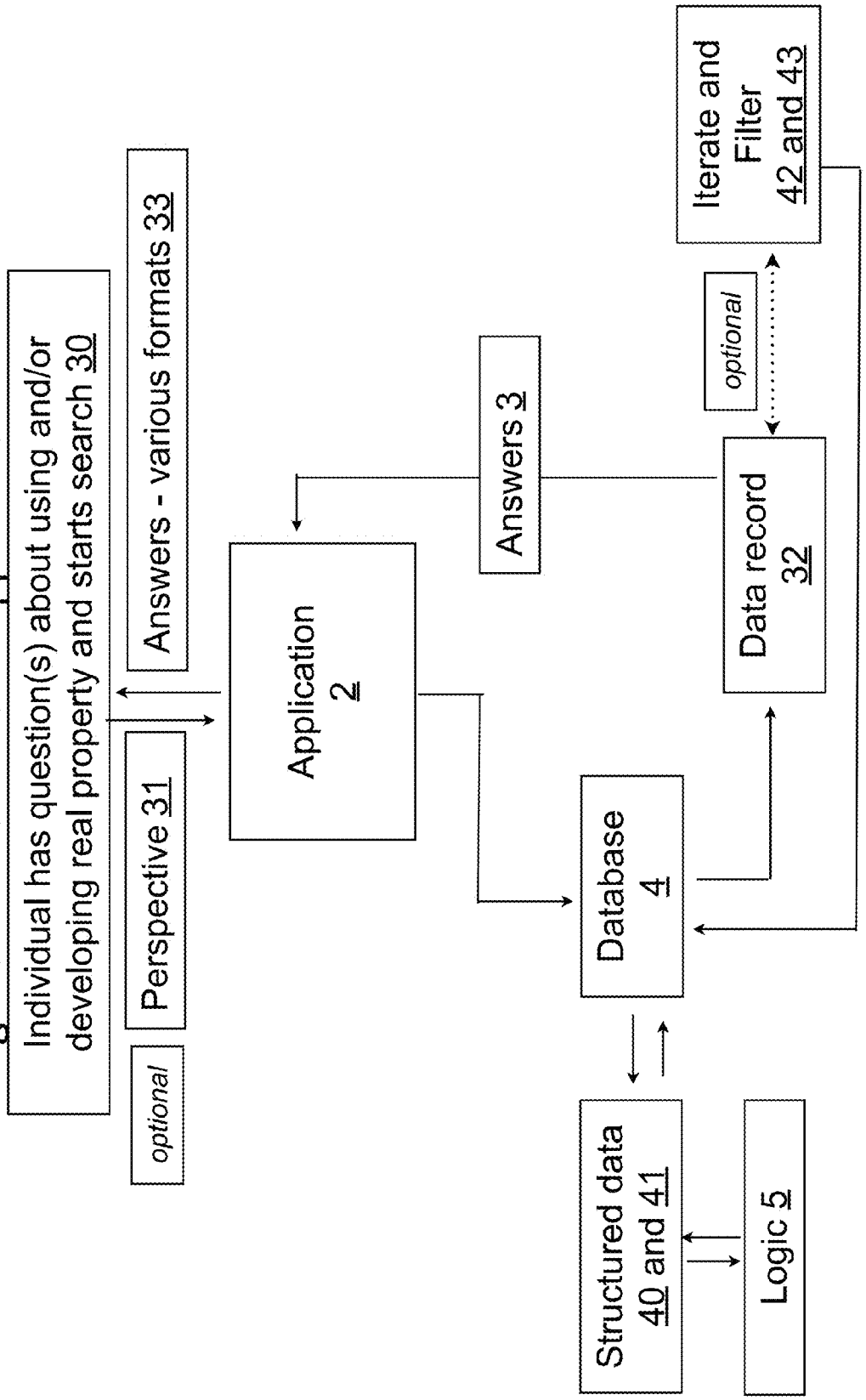

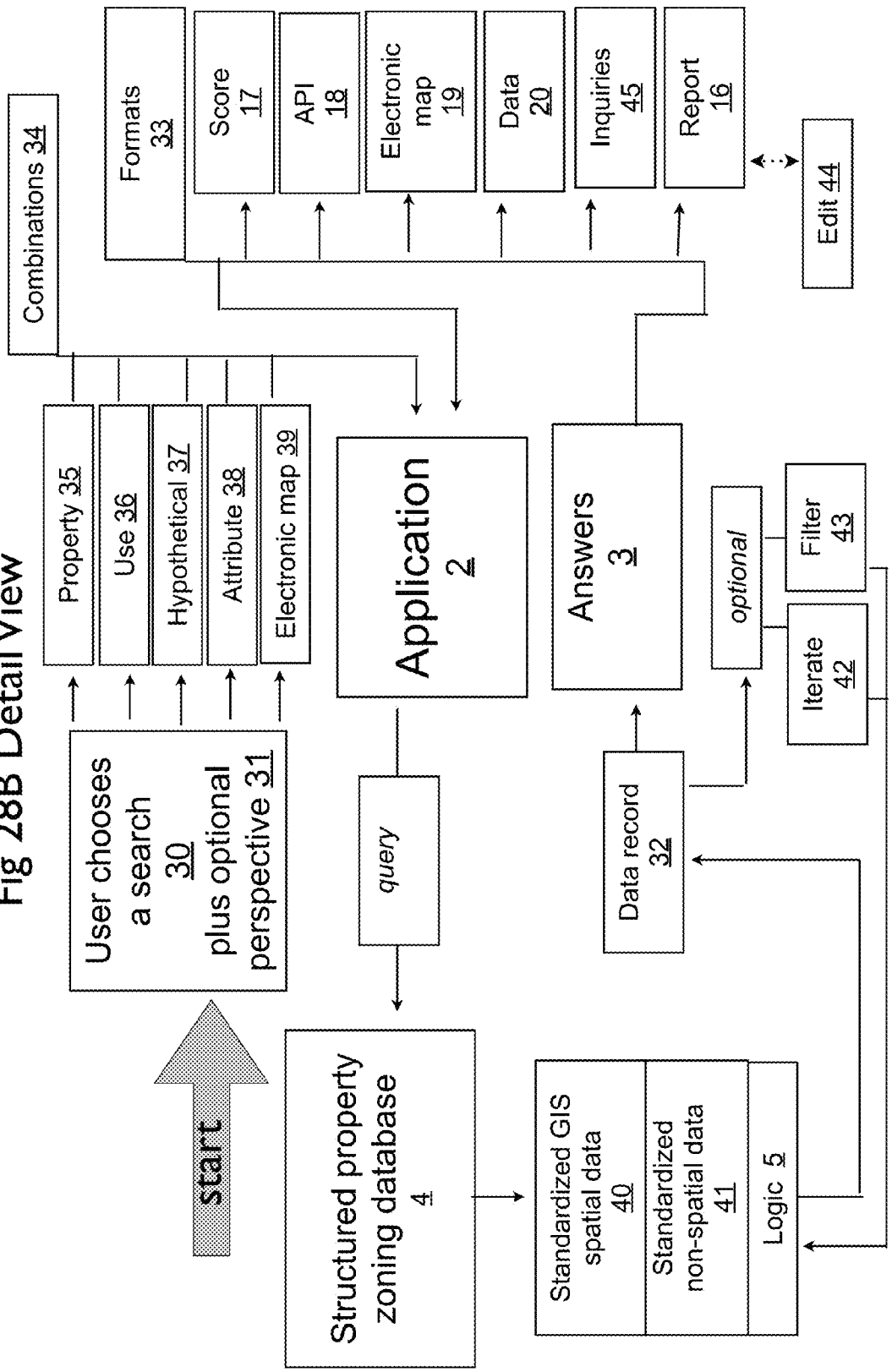

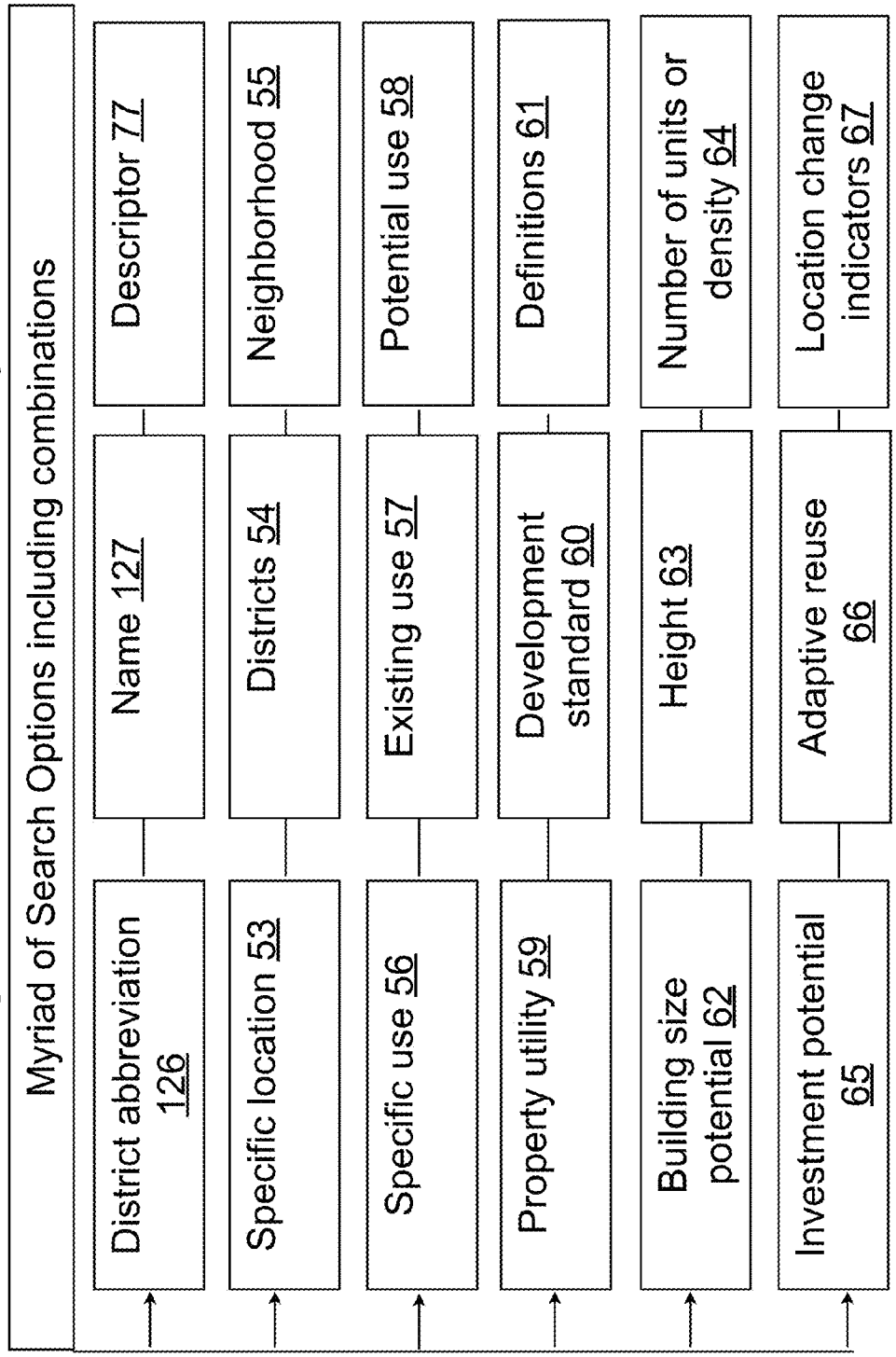

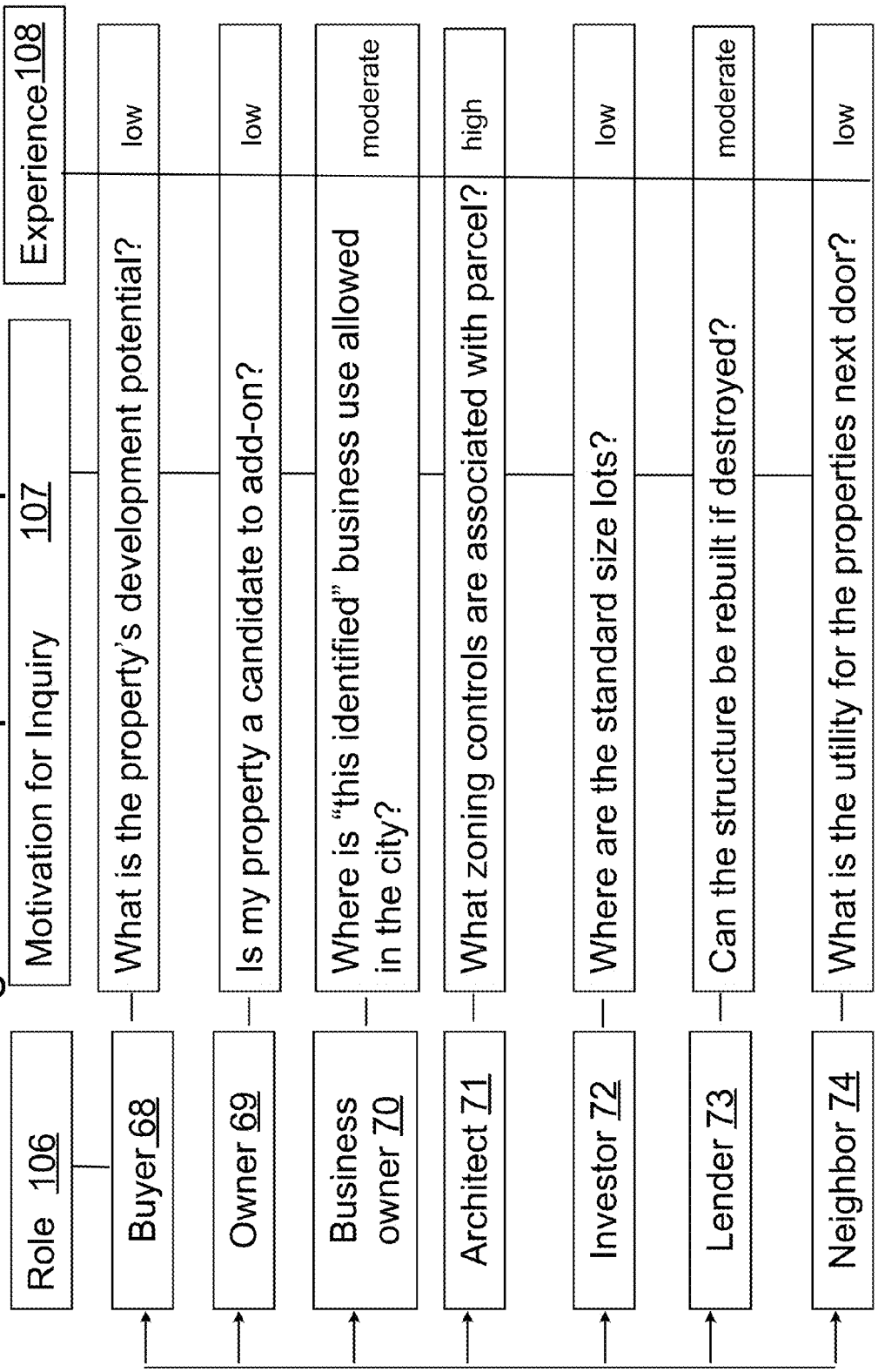

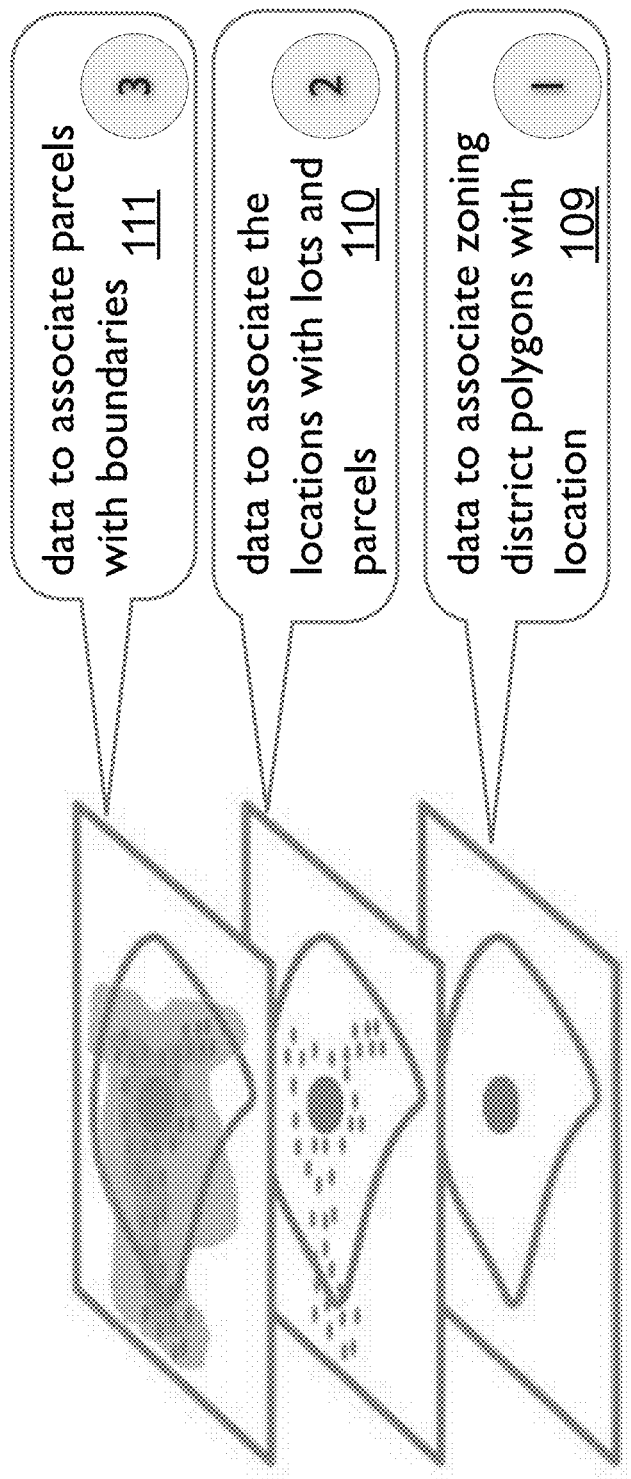
Fig 29 - Spatial Data Combining

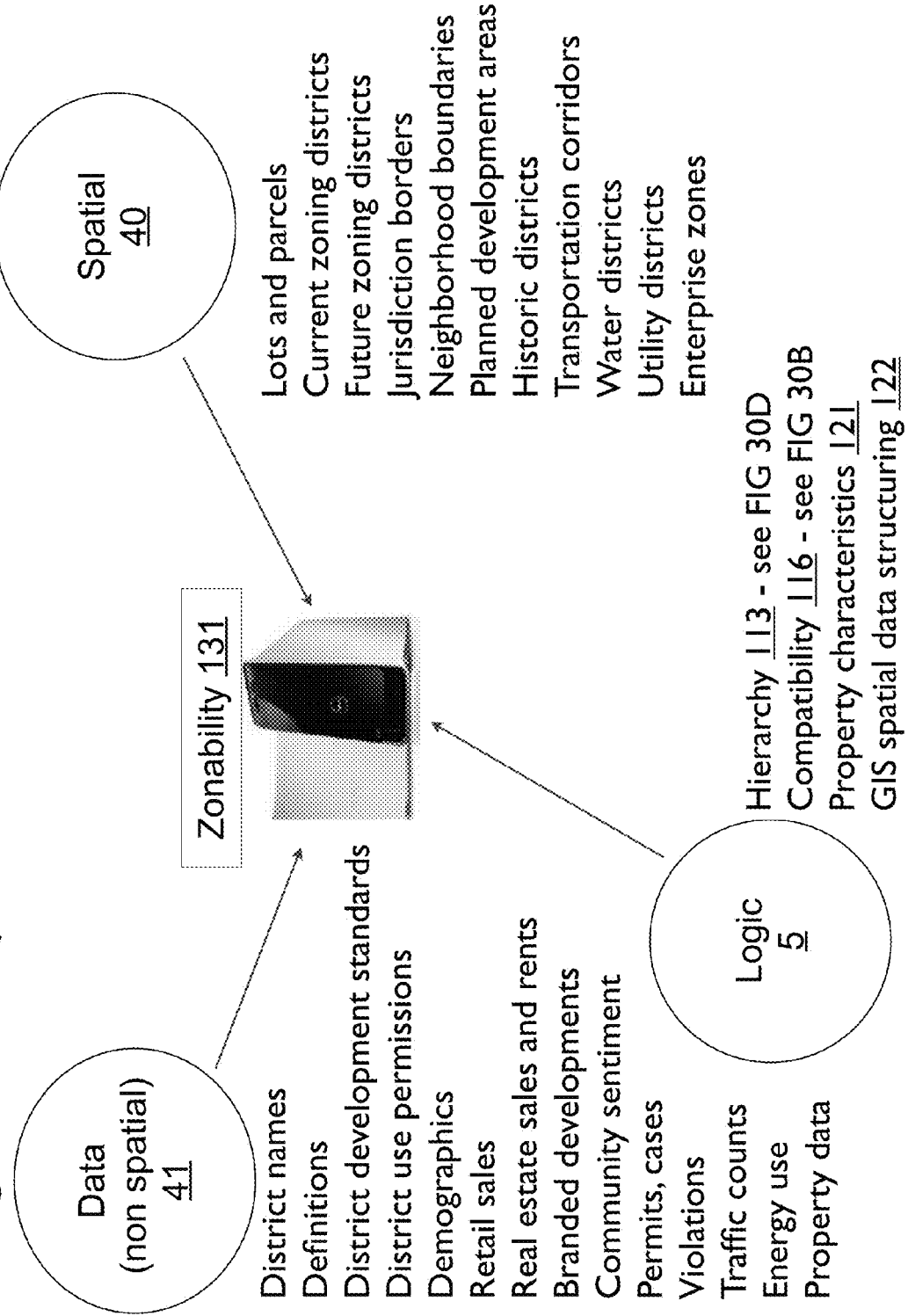
Fig 30A - Examples of Structured Data used in Database

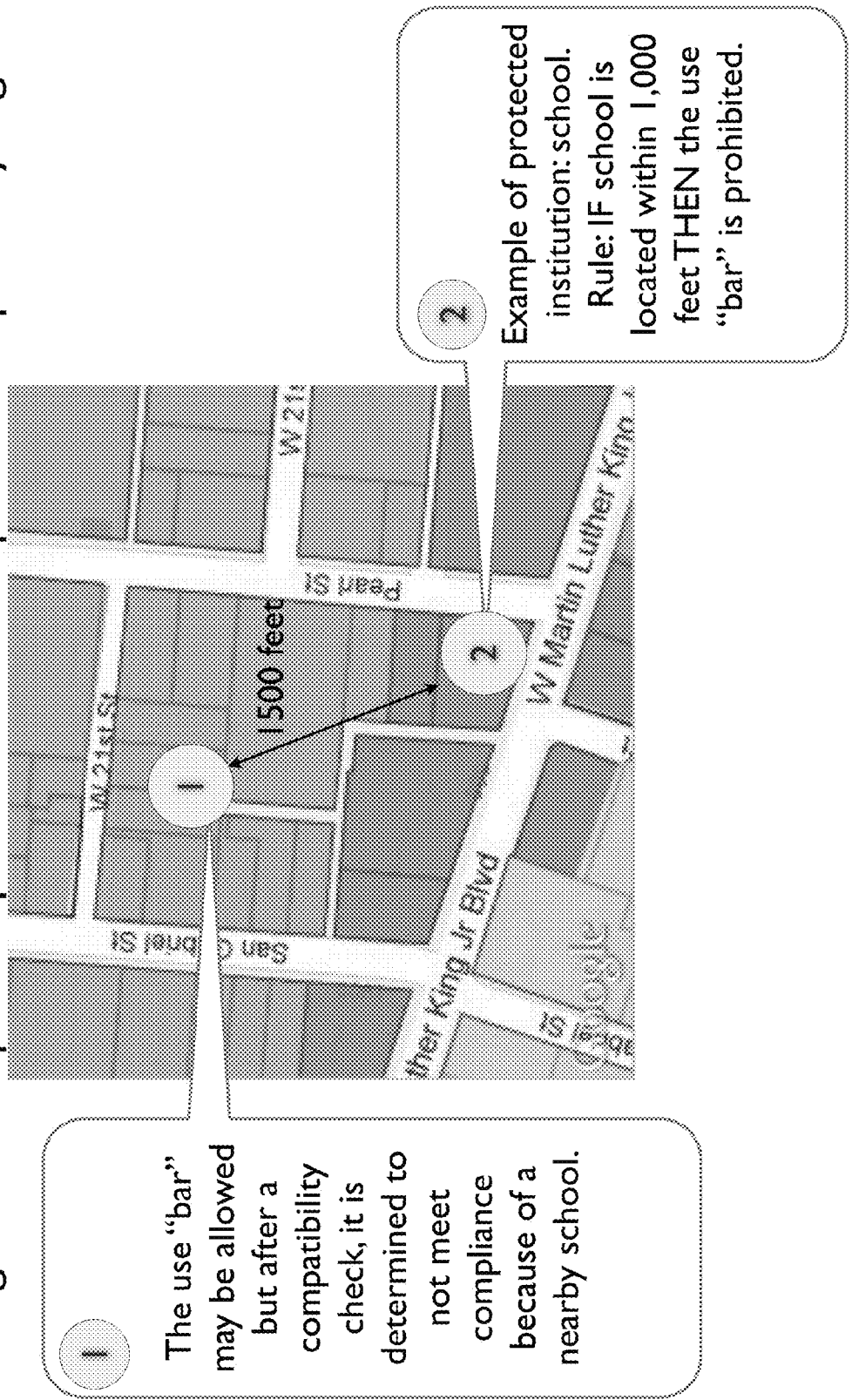
Fig 30B - Sample Output for Location specific compatibility logic

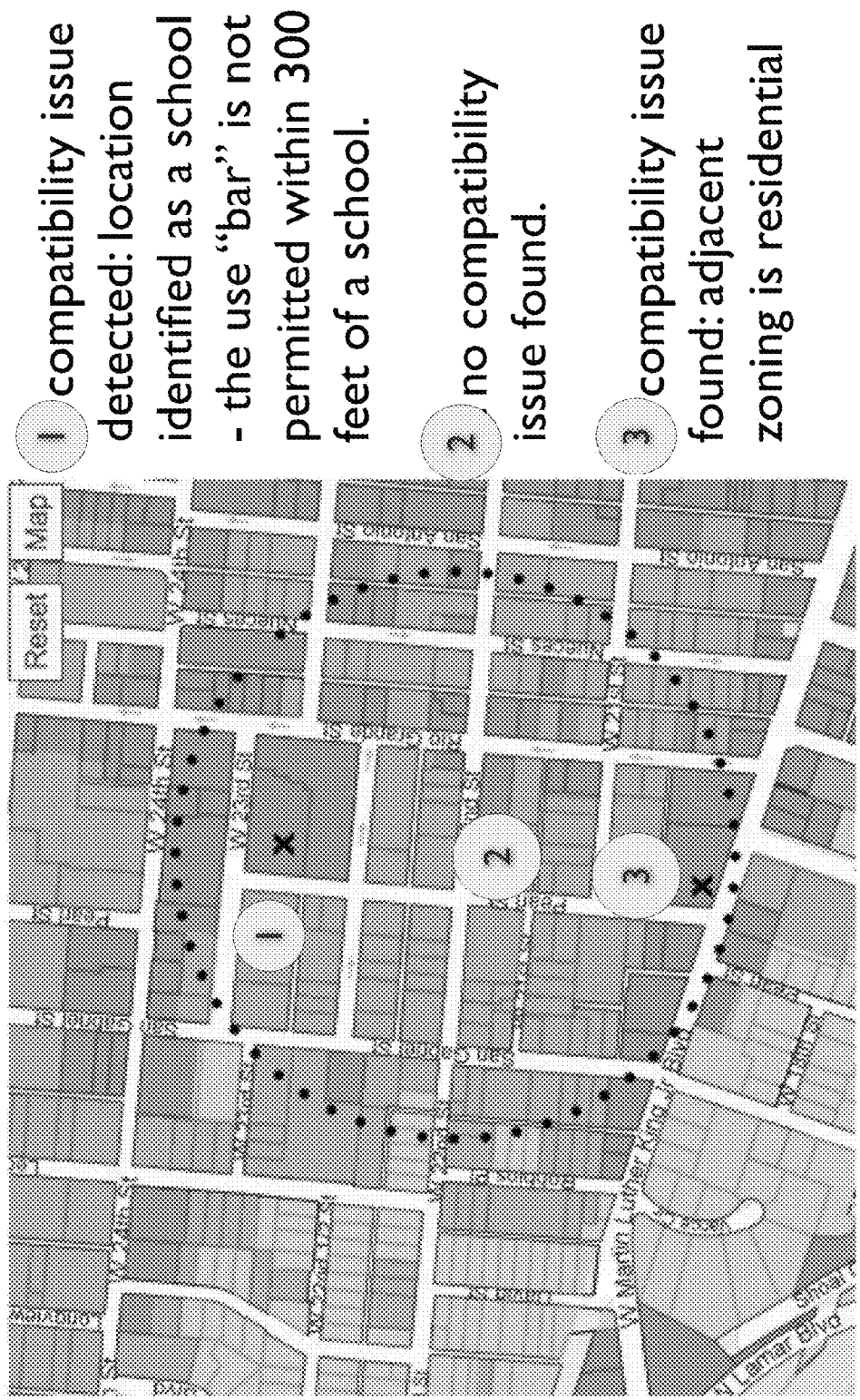
Fig 30C - Identified Properties Using Compatibility
X identifies potential location conflict

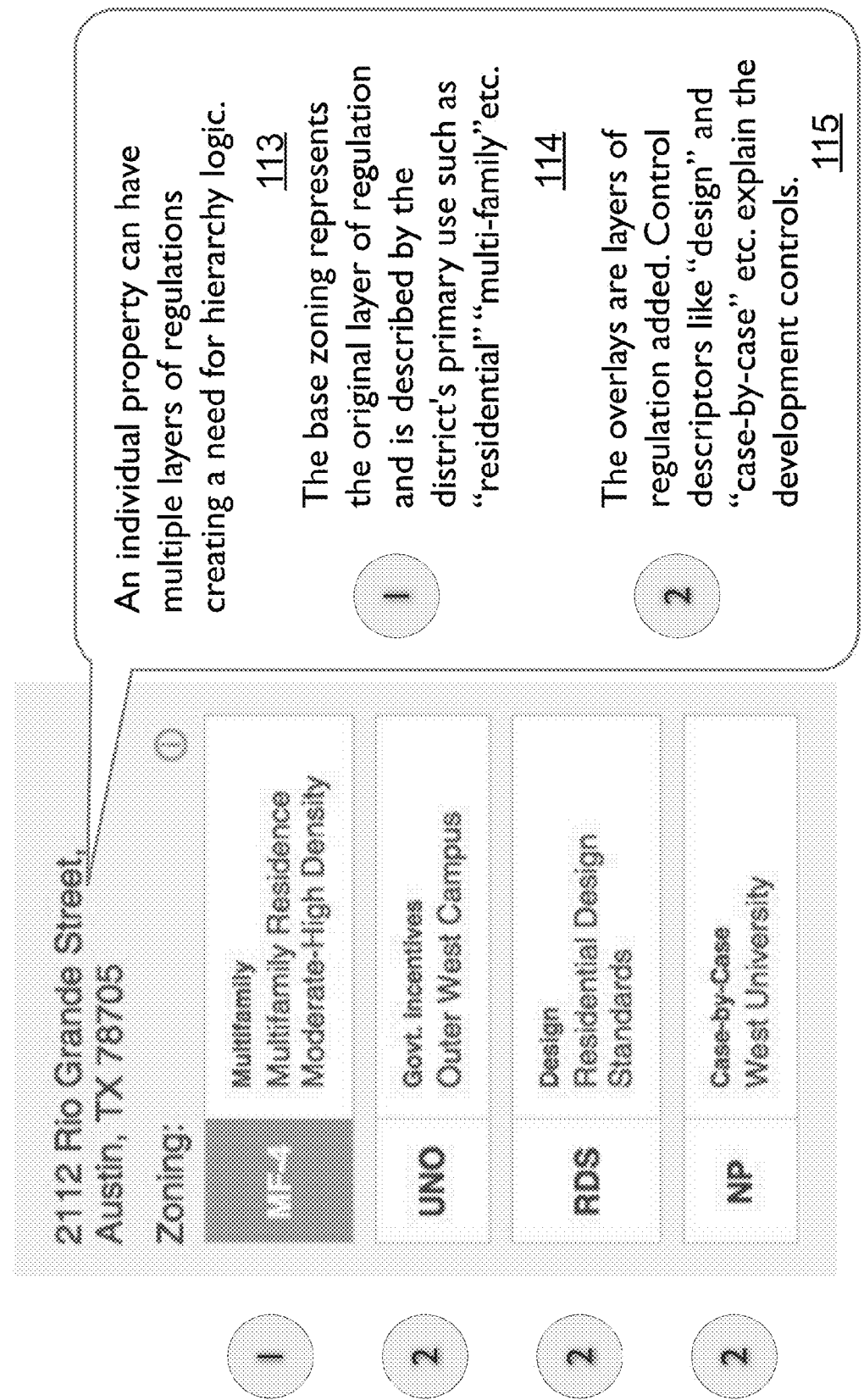
Fig 30D - Hierarchy

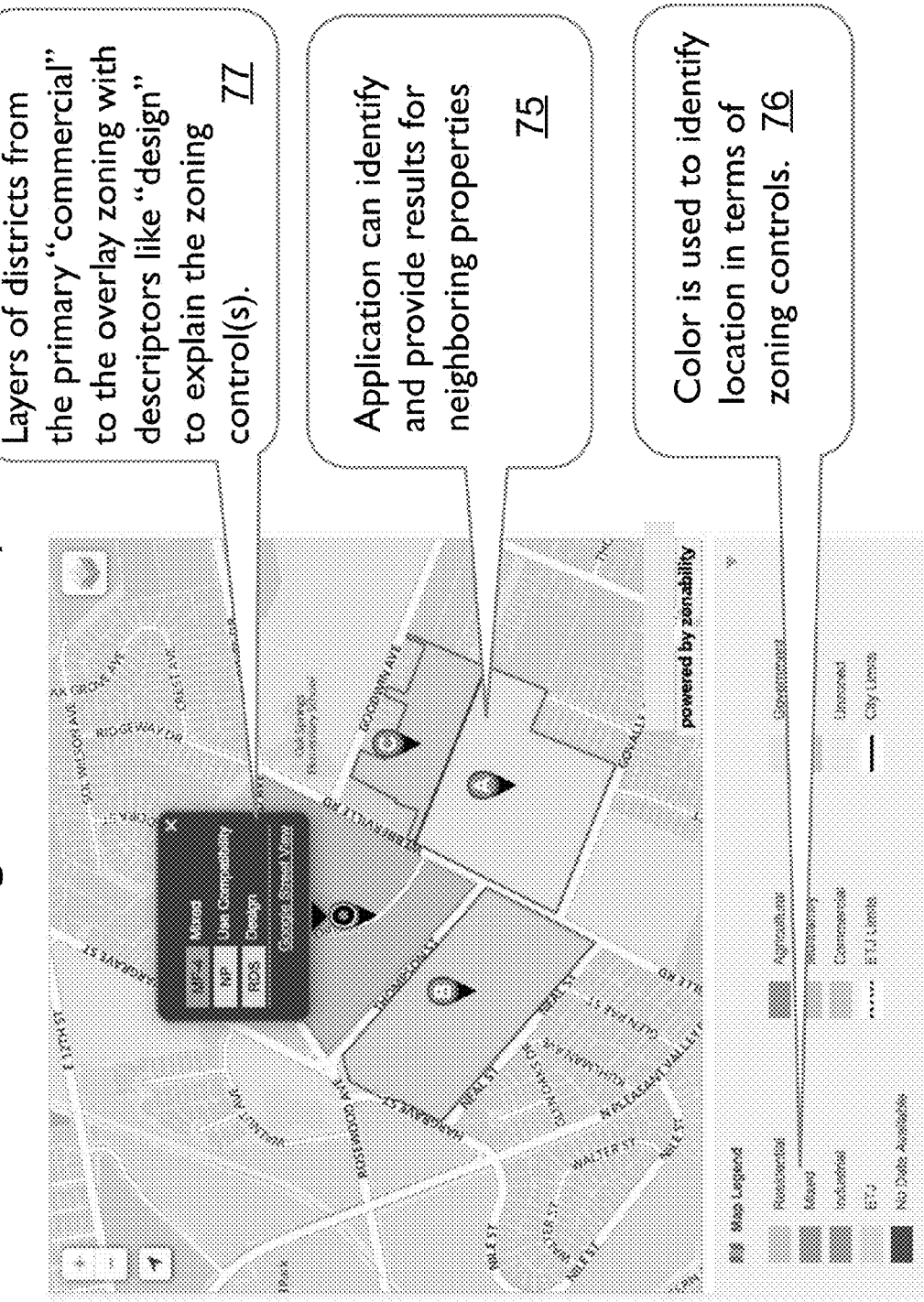
Fig 31 - Data Output

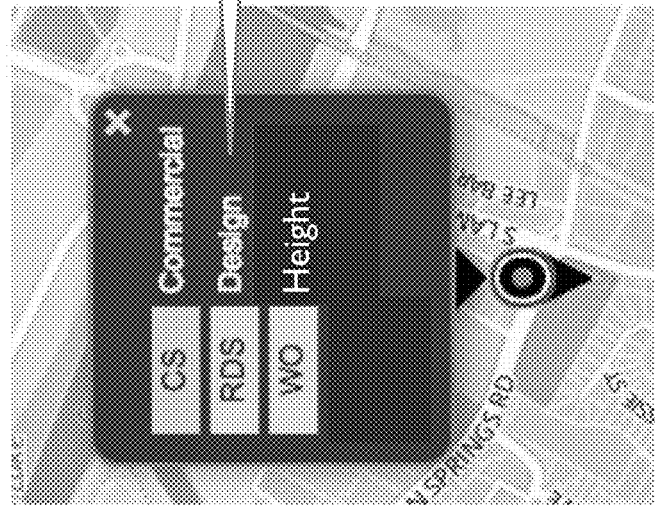
Fig 32 - Data Output

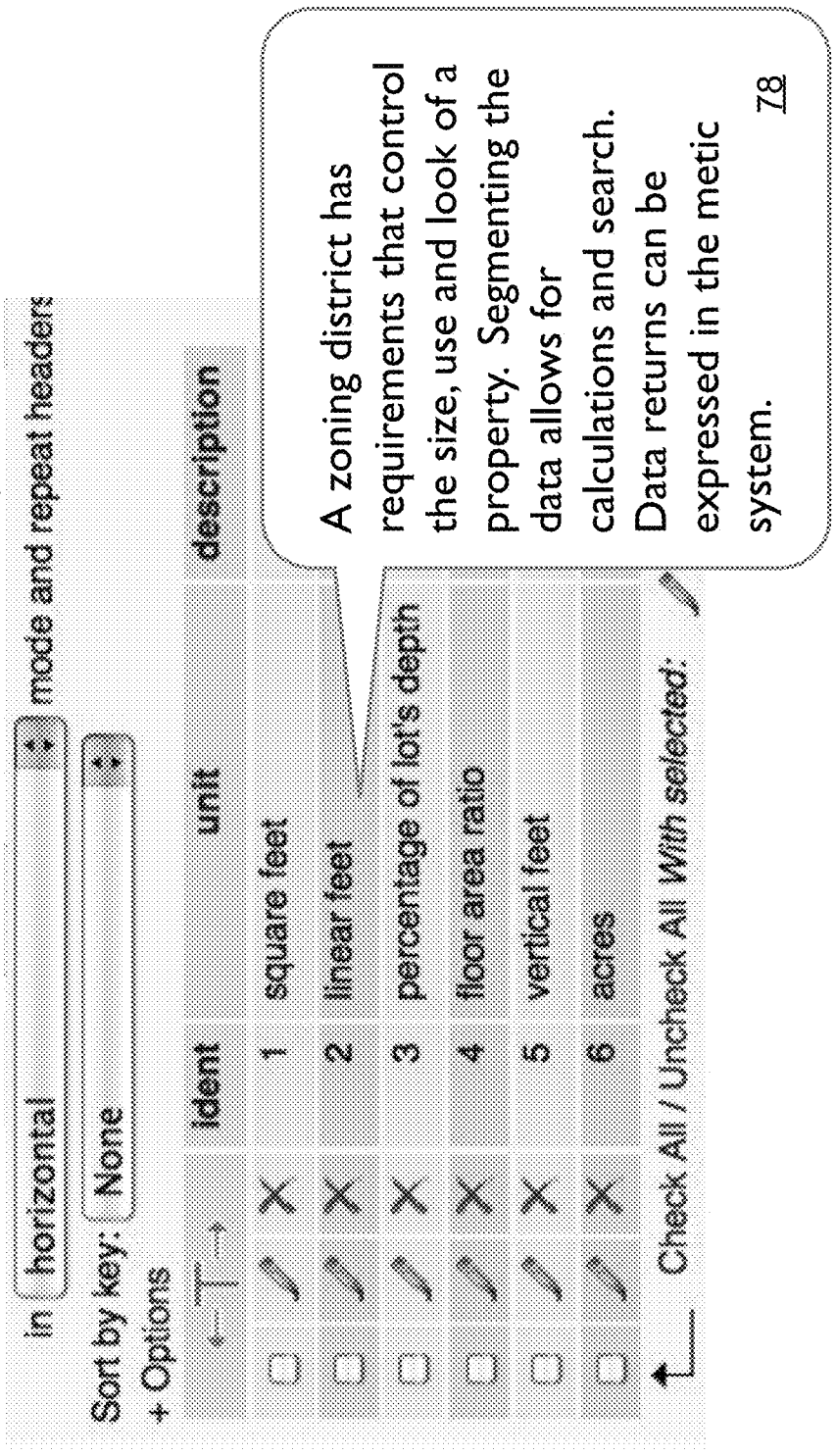
Fig 33 - Non-spatial Data Showing Example of Development Standards, A Zoning Control

Fig 34 - Data Output

San Francisco, CA [X]

| District | Contact Info | Uses | CIS | Definitions | Import Date 12/15/11 |
|---|---|---|---|---|---|
| Total Codes: 148 | | | | | Total Uses: 193 |
| 1500 Page | | 1500 Page Street Residential Care Special Use District | | | |
| 17th-RI Grocery | | 17th and Rhode Island Street Grocery Store Special Use Subdistrict | | | |
| 1800 Mkt St | | 1800 Market Street Community Center Project Special Use District | | | |
| 24TH-MISSION | | 24th Street – Mission Neighborhood Commercial Transit | | | |
| 24TH-NOE | | 24th Street- Noe Valley Neighborhood Commercial District | | | |
| 3rd Alc | | Third Street Alcohol Restricted Use District | | | |
| 3rd-Armstrong | | Third Street and Armstrong Avenue Affordable Housing Use District | | | |
| 3rd-Le Conte | | Third Street and Le Conte Avenue Affordable Housing Special Use District | | | |
| 3rd-Oakdale | | Third Street and Oakdale Avenue Affordable Housing Special Use District | | | |
| 901 Bush | | 901 Bush Street Special Use District | | | |
| Alabama | | Alabama and 18th Streets Affordable Housing Special Use District | | | |
| Automotive | | Automotive Special Use District | | | |

> The structure of the zoning ordinance data allows for an inventory view by district with controls broken down into segmented data.
> 
> 79

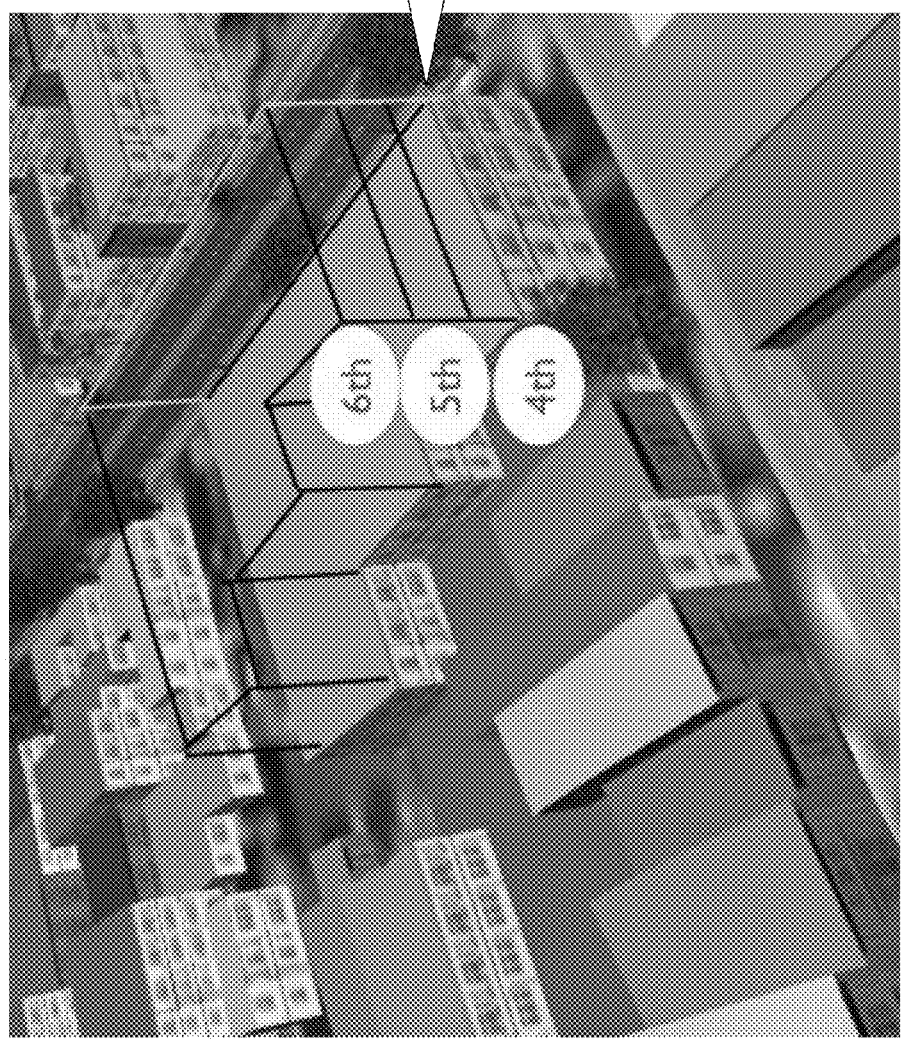
Fig 35A - Example of Application's Visual Output

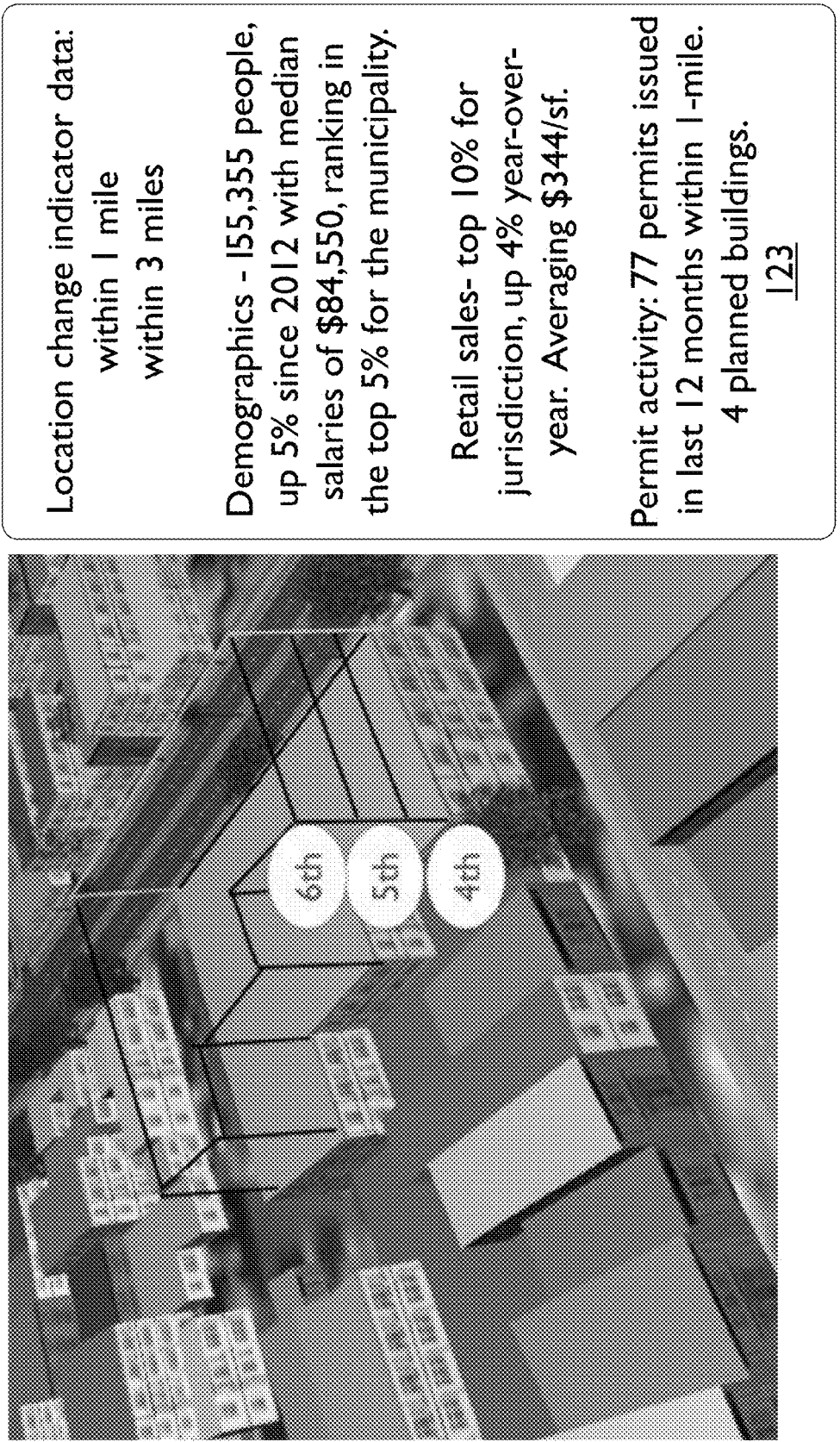
Fig 35B - Example of Application's Visual Output

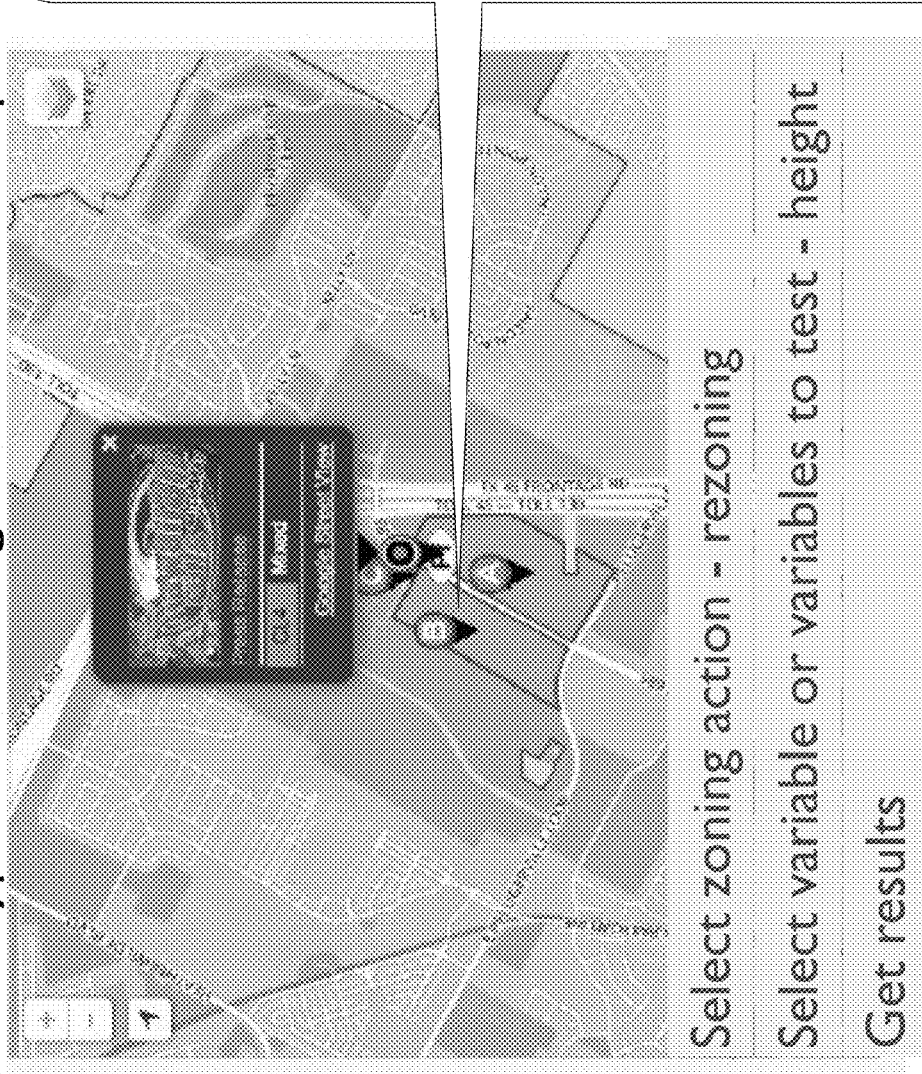
Fig 36 - Hypothetical using Economic Development Projects

Fig 37 - Search Capability

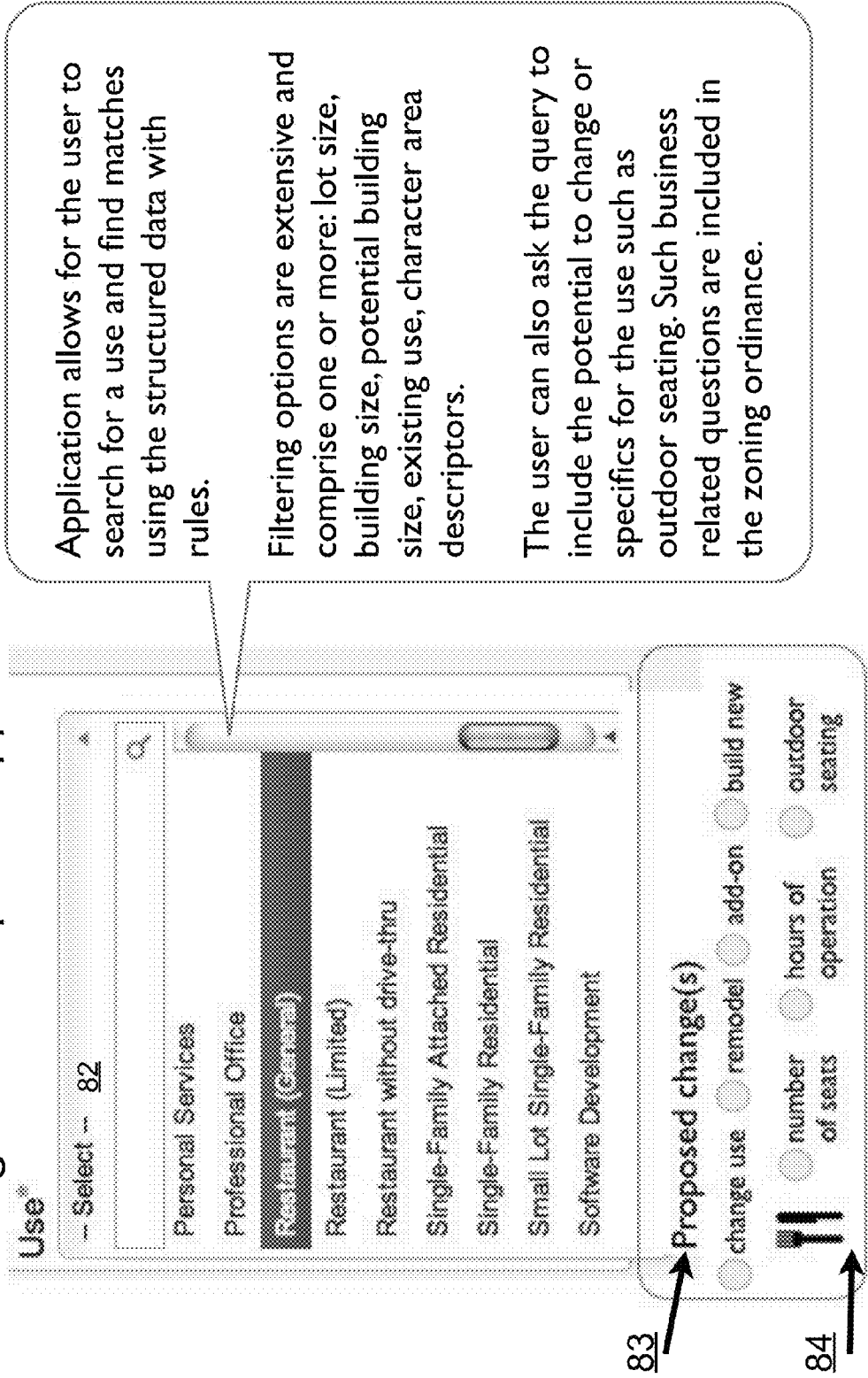
Fig 38 - Example of Application's Search Function

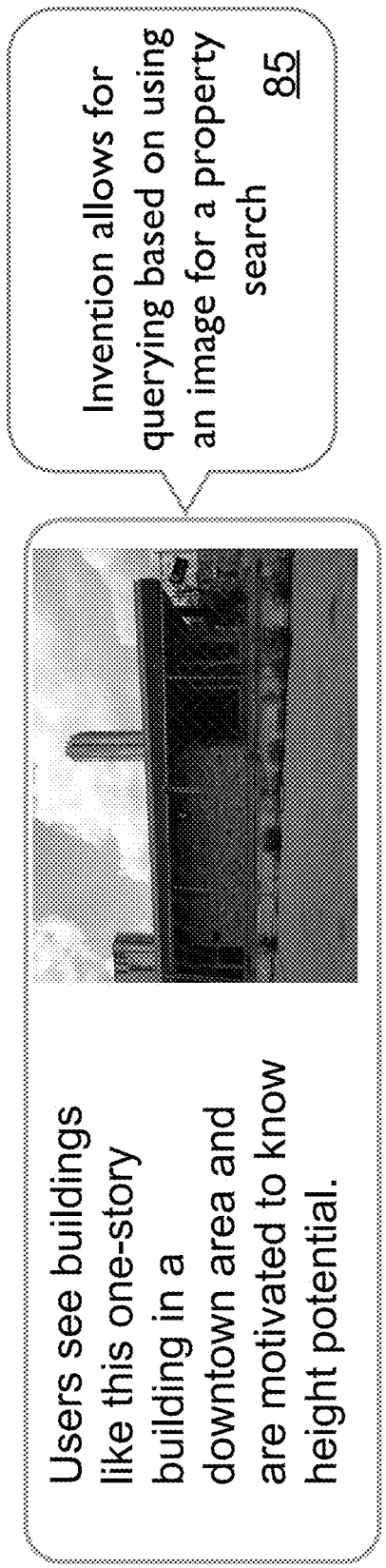

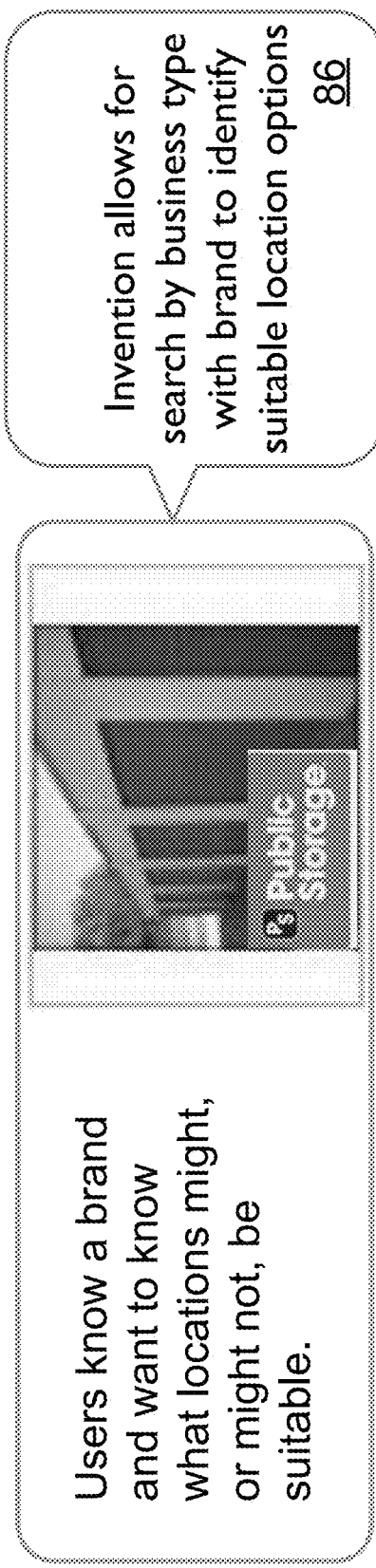
Fig 39B - Search
Users know a brand and want to know what locations might, or might not, be suitable.
Invention allows for search by business type with brand to identify suitable location options
86

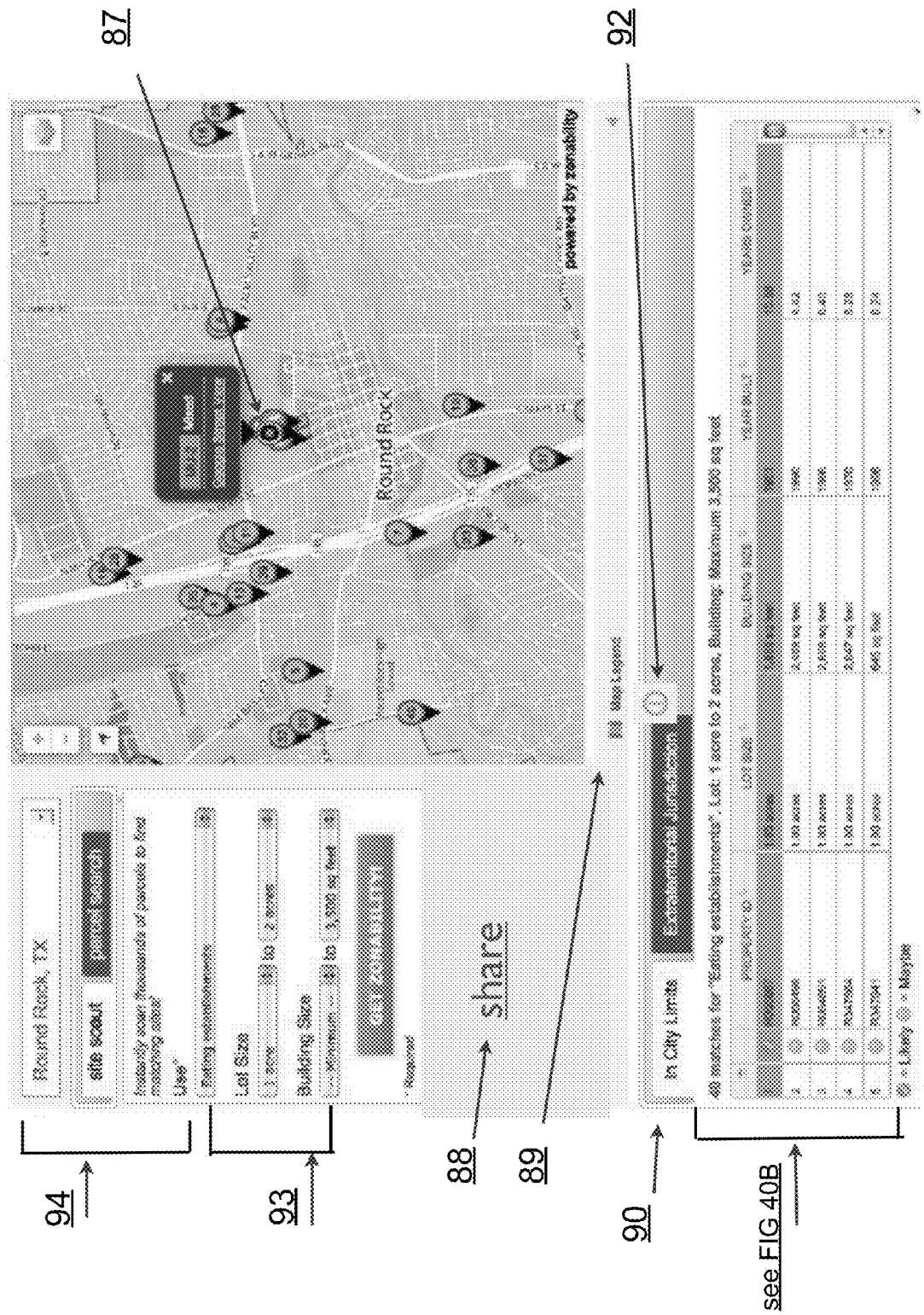
Fig 40A - Interactive Search and Report

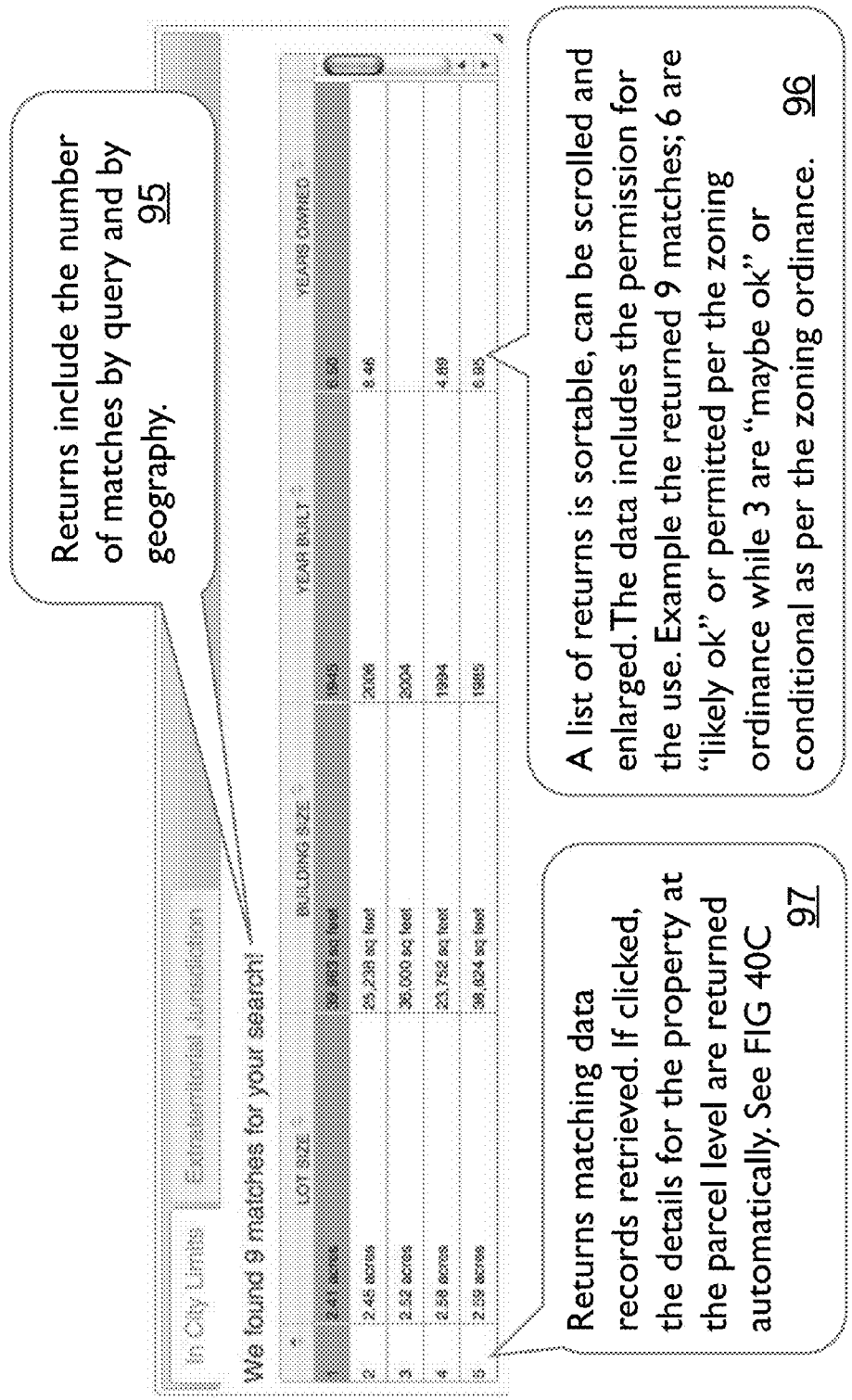
Fig 40B - Search matches

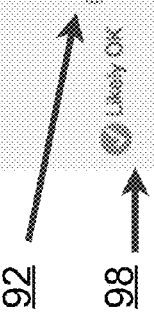

Fig 40D - Example of Calculations and
Building Size Potential Data Retrieval z nability calculations: ESTIMATED DEVELOPMENT POTENTIAL

Max Building Size (Sq Ft)   174,379
Max Height (Stories)        4.0

102
103
92

Retrieves and runs calculations using the property data, the structured data and logic such as maximum building size, maximum number of units, maximum height.

Results can be returned using the metric system and converting stories to feet or feet to stories.

Figure 40E:
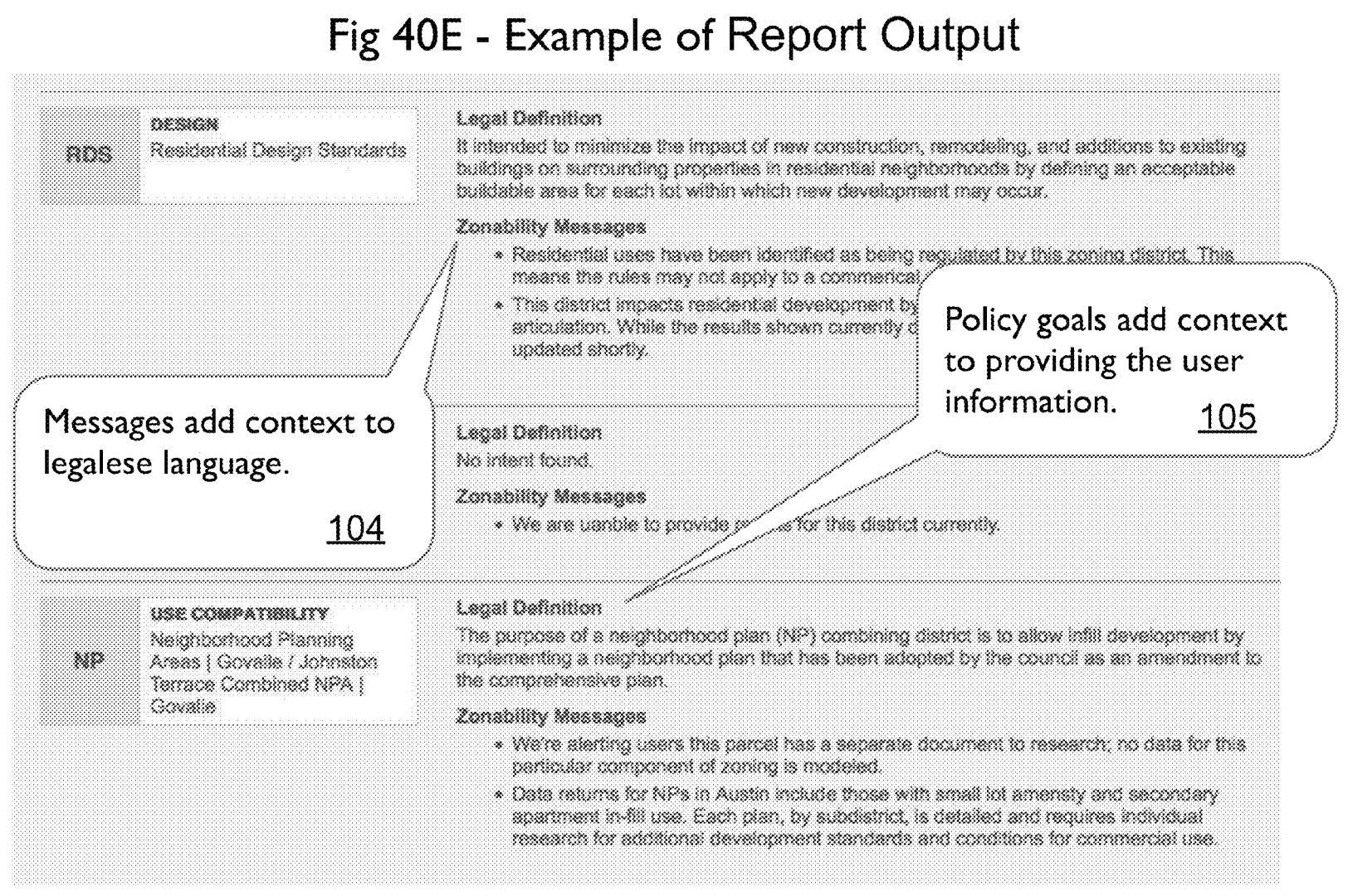

Fig 40E - Example of Report Output

Messages add context to legalese language. 104

Policy goals add context to providing the user information. 105

Fig 40F - Example of Report Output

PROPERTY BASICS

| | |
|---|---|
| Assessor Address | 3201 KAY ST 78702 |
| County Property ID | 198057 |
| Owner(s) of Record | Quiroz Ernest & Aurora |
| Ownership in Years | 32.25 |
| Year Built | 1955 _125_ |
| Lot Size | 7,536 sq ft _125_ |
| Buildings Size Estimate (Sq Ft) | 2,006 _125_ |
| Floor Area Ratio (FAR) | 0.27 _125_ |
| Existing Use (per assessor) | • 1 fam dwelling _125_ |
| County | Travis |
| School District | Austin ISD |
| Incorporated City Status | Within City Limits _125_ |

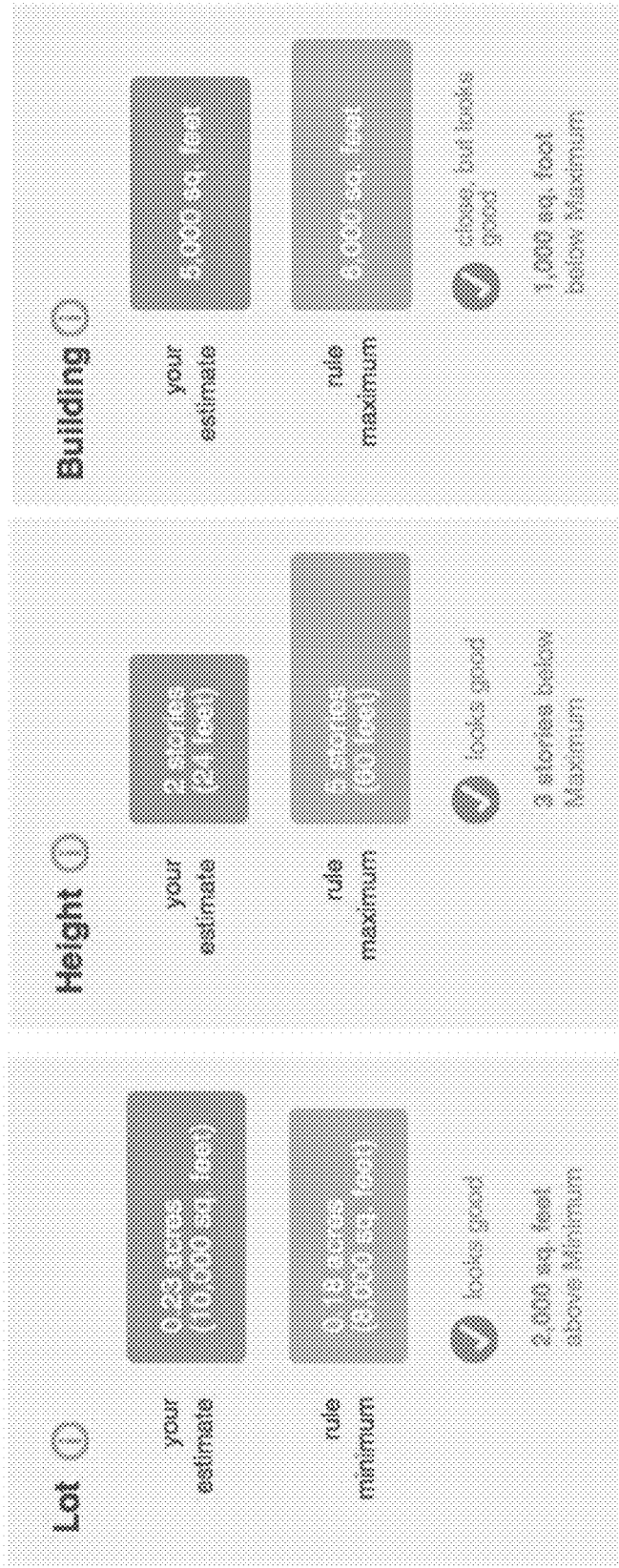
Fig 40G - Visual Output Comparison At A Specific Property

Fig 40H- Example of Report Output (.csv format)

| prop_id | geo_id | py_owner | py_address | py_city | py_zip | deed_date | ownership_%year_built | improvement | land_sqft |
|---|---|---|---|---|---|---|---|---|---|
| 192048 | 204100312 | CASH AMER | 2315 E 7 ST | Austin | | 1/17/03 | 10.1780822 1982 | 13901 | 20643.084 |
| 191054 | 203090410 | ANCHOR EQ | 1917 E 7 ST | Austin | | 6/30/04 | 8.7260274 | 53454 | 61881.336 |
| 187616 | 200100807 | ROSAS BENU | 2731 E CESA | Austin | 78702 | 2/4/92 | 21.1369863 | 7164 | 12880.692 |
| 189351 | 202100116 | LAFUENTE LU | 2200 E CESA | Austin | 78702 | 12/10/69 | 43.3041096 | 2007 | 7152.552 |
| 189426 | 202180603 | MALKAN HO | 2205 E S ST | Austin | 78702 | 7/16/12 | 0.67671233 | 7332 | 8254.62 |
| 189450 | 202100719 | G & G PROPE | 2406 E CESA | Austin | 78702 | 7/31/12 | 0.63561644 | 49066 | 28801.872 |
| 189455 | 202100725 | MEZA JUAN I | 2306 E CESA | Austin | 78702 | 7/27/12 | 0.64657534 1969 | 12066 | 15002.064 |
| 189802 | 202110919 | PRISM DEVEL | 2709 E S ST | Austin | 78702 | 1/13/97 | 16.1917808 1980 | 3030 | 9060.48 |
| 189646 | 202110413 | ANGULO ALB | 2519 E S ST | Austin | 78702 | 7/2/04 | 8.72054795 1940 | 762 | 8725.068 |
| 189446 | 202100715 | G & G PROPE | 2420 E CESA | Austin | 78702 | 7/31/12 | 0.63561644 1968 | 12801 | 15171.948 |
| 771908 | 203090414 | AMERICAN B | 2025 E 7 ST | Austin | 78702 | 4/5/11 | 1.95890411 1940 | 62995 | 86248.8 |
| 189590 | 202110110 | RENTERIA D/ | 2512 E CESA | Austin | 78702 | 11/10/08 | 4.35890411 1930 | 862 | 7348.572 |
| 191084 | 203090807 | NEWBY DARI | 2033 E S ST | Austin | 78702 | 8/31/04 | 8.55616438 2007 | 4808 | 9500.436 |
| 725823 | 202100601 | MENDOZA-A | 1901 E CESA | Austin | | | 1935 | 25393 | 33806.916 |
| 187583 | 200100601 | GONZALES N | 97 SAN SABJ | Austin | 78702 | 9/16/93 | 19.5205479 | 13553 | 13721.4 |
| 771910 | 203090416 | EAST END P/ | 2129 E 7 ST | Austin | 78702 | | | 18592 | 21780 |
| 189186 | 202080507 | CONTRERAS | 1910 E CESA | Austin | 78702 | 9/11/99 | 13.5589041 1962 | 3600 | 9726.948 |
| 191056 | 203090412 | ZAMORA ME | 2100 E 6 ST | Austin | 78702 | 12/6/02 | 10.2931507 | 14328 | 39116.88 |

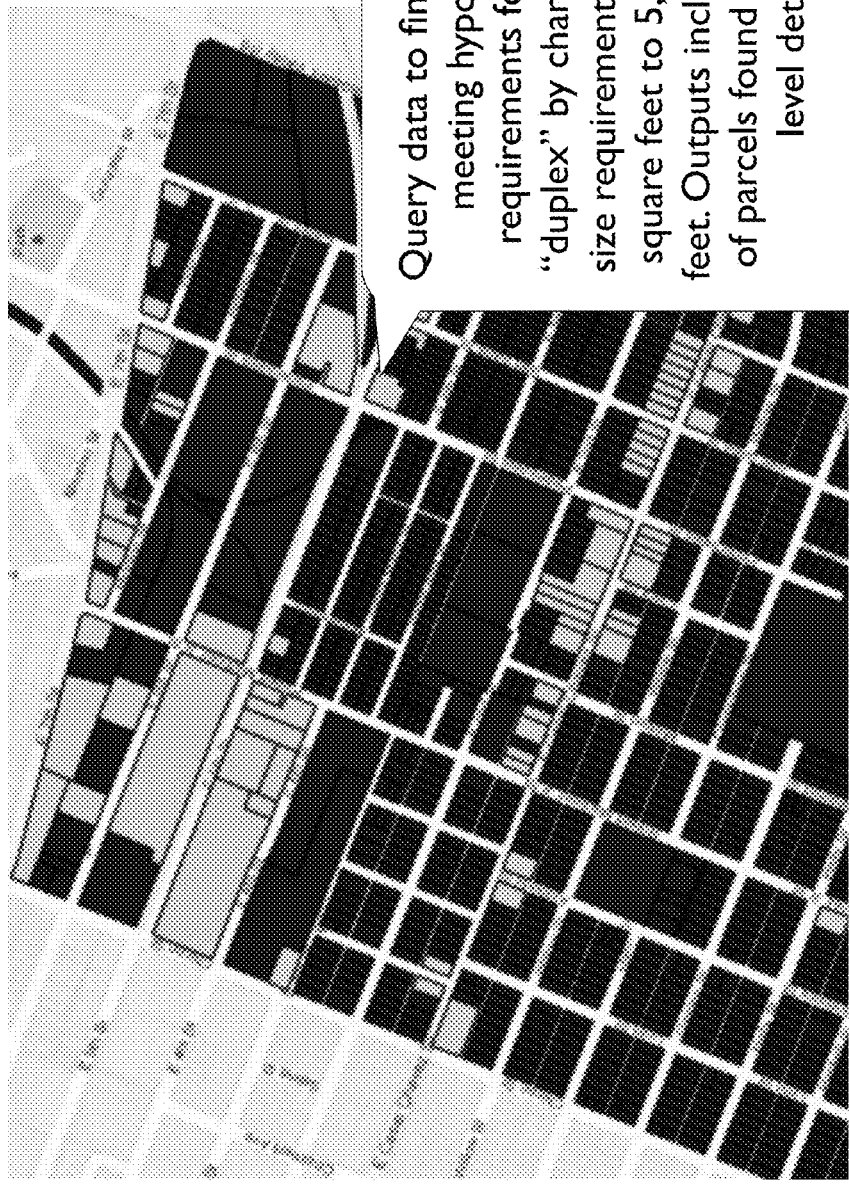
Fig 41 - Data Output for Hypothetical Scenario Testing

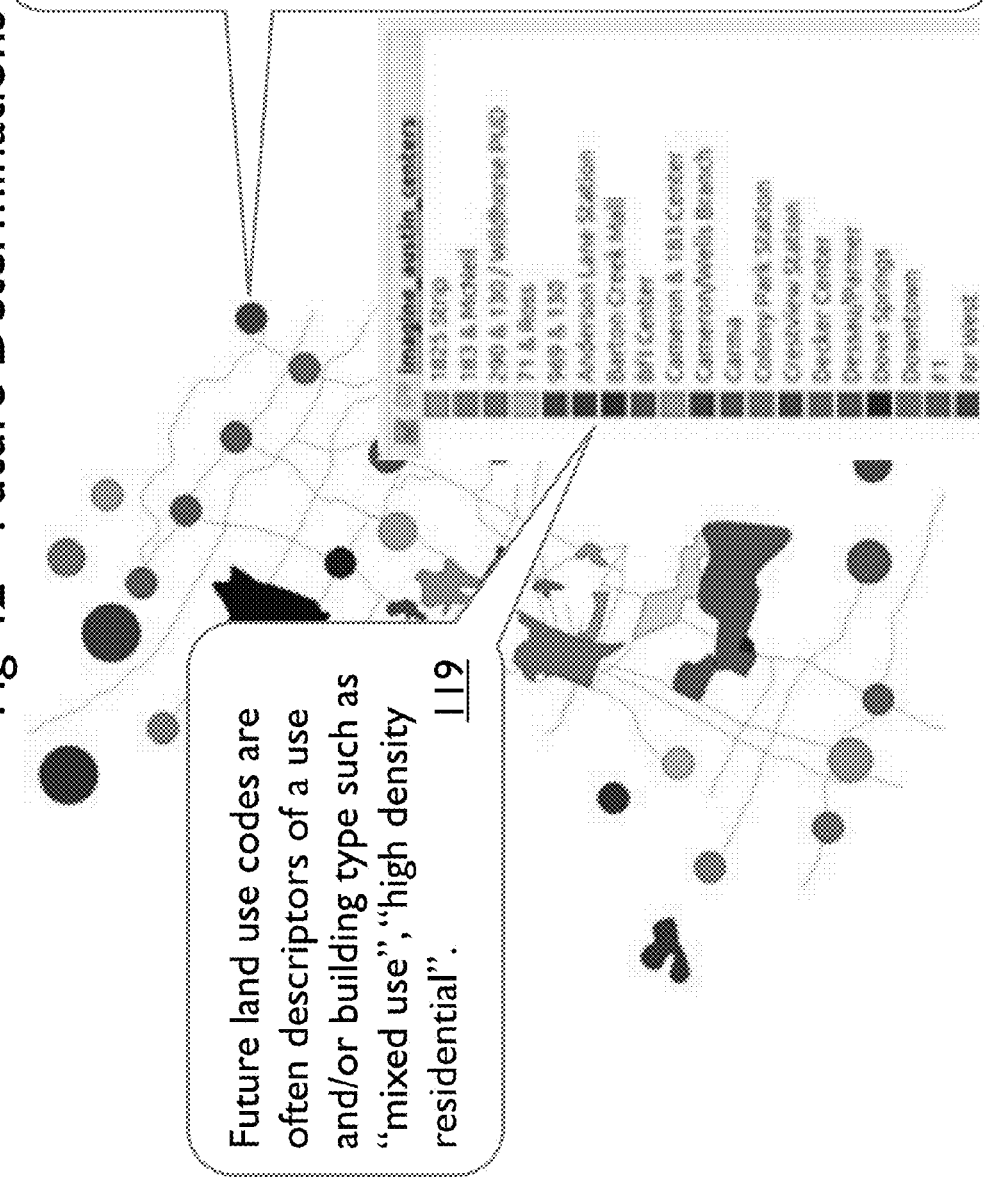

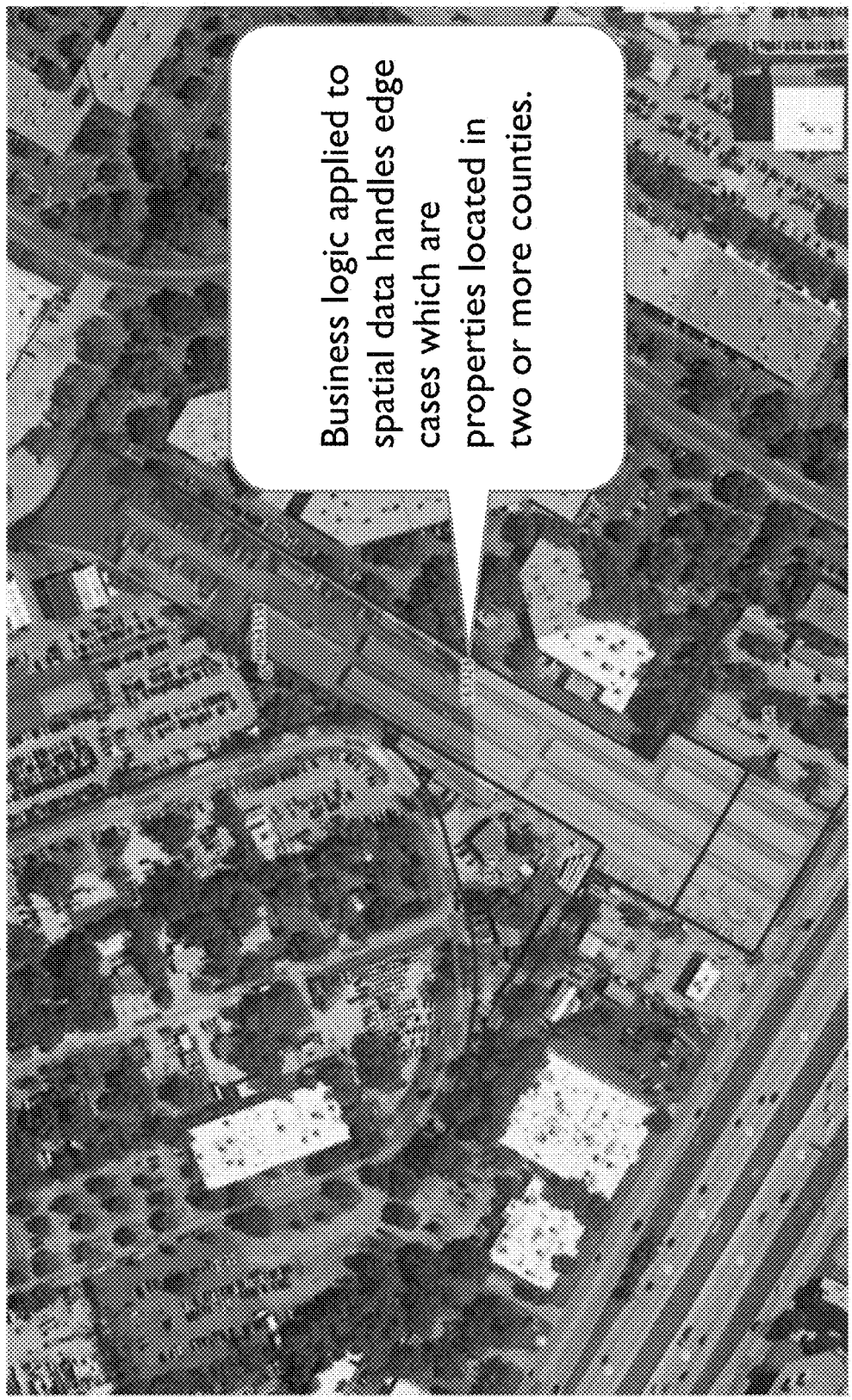
Fig 43 - Portions of a Parcel

Fig 44 - Water Districts

| WATER | |
|---|---|
| District Focus | Residential |
| Aquifer | E    EDWARDS |
| Watershed name | BC   BARTON CREEK |
| | WC   WALLER CREEK/ DOWNTOWN |
| District Abbreviation(s) and Name(s) | |
| Development location | DD   Desired development |
| Water Plan | Lower Colorado |
| Control Abbreviation(s) and Name(s) | GMA   Groundwater Management Area 14 |

Inventions works with other land development regulations like water districts which impact property development and use.

The invention connects meaning to district controls by providing definitions, calculations, descriptors and data otherwise found in a document.

Definition: GMA provides conservation, preservation, protection, recharging and prevention of waste of the groundwater,...
(more)

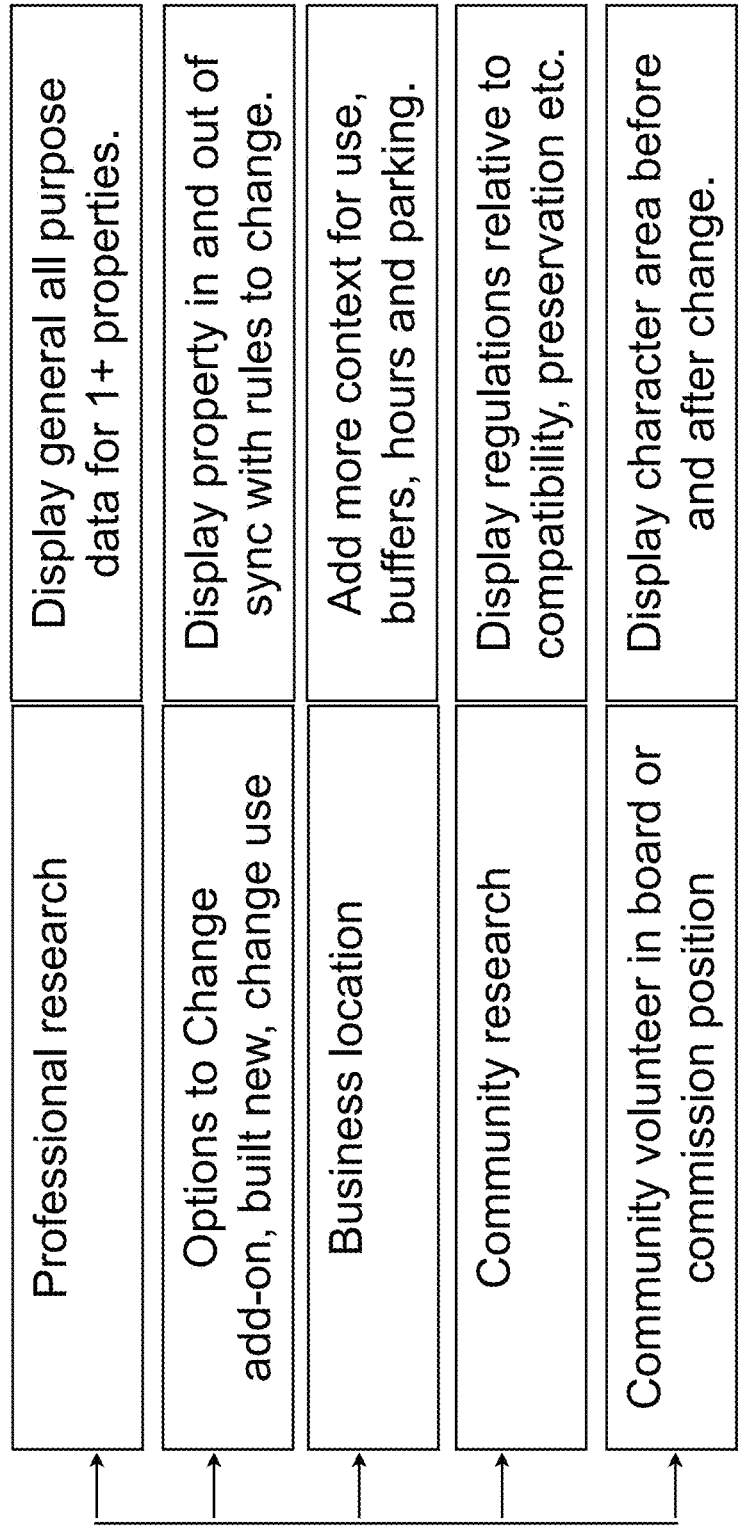
Fig 45 - Examples of Optional Consumer Perspective and Display Outputs

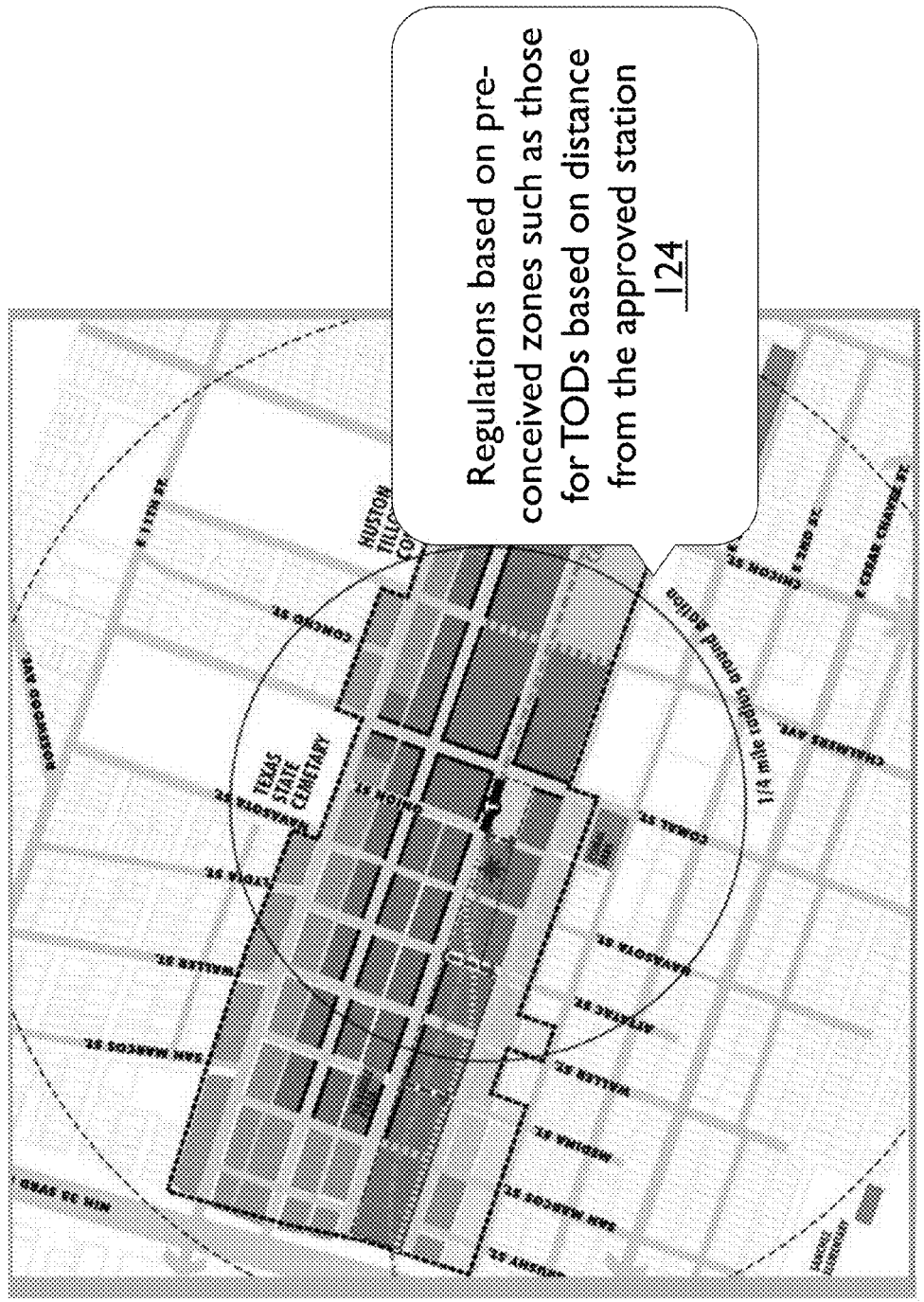
Fig 46 - Example of Formulated Regulations such as Transit Oriented Development (TOD) and Transect Zones

US 10,074,145 B2

METHODS FOR THE TRANSFORMATION OF COMPLEX ZONING CODES AND REGULATIONS TO PRODUCE USABLE SEARCH

RELATED PATENT APPLICATIONS AND INCORPORATION BY REFERENCE

This is a Continuation in Part application based upon utility patent application Ser. No. 12/873,267 filed on Aug. 31, 2010, now U.S. Pat. No. 8,765,855, which claims the benefit and priority date provisional application No. 61/238,613 filed on Aug. 31, 2009. These related patent applications are incorporated herein by reference as if restated in their entirety. This Continuation in Part application claims the priority dates of the related patent applications.

BACKGROUND OF THE INVENTION (1) Field of the Invention

The present invention relates to the field of real property development and utility. More specifically, the embodiments relate to computer enabled search of structured data with business logic and business methods specific to the complex subject of zoning and land-use development controls. The invention generally relates to the development of real property. More particularly, the invention relates to creating data sets pertaining to particular parcels of real property to provide property development potential and use. Results can be tailored to reflect the particular needs of potential purchasers, sellers, renters, planners, economic developers, remodelers or real estate developers of property based on their role, motivation and experience.

(2) Related Art

The known related art comprises printed publications disclosing zoning regulations, municipal regulations, covenants, conditions and restrictions (referred to as CC&Rs), and maps showing zoning. The known related art fails to make zoning information and its impacts readily accessible to a lay person attempting to engage in real estate acquisition, remodeling, understanding a proposed new development, neighborhood assessments, real estate development or other land use studies, future planning and financial consequences for decisions.

In the related art of applications using zoning, the related art looks at the subject of zoning as a code to optionally decipher through manual processes. U.S. Pat. No. 7881948 (Continuation of U.S. Pat. No. 7,346,519) by Carr, discloses a location standardization invention in which "zoning" is a field for providing the abbreviated name and/or name without any attempt to explain the meaning of the zoning controls.

U.S. Pat. No. 20050273346 by Frost is real property information management system in which zoning maps from a city can be viewed, and the user can manually determine the zoning abbreviation associated with a property with a descriptor.

U.S. Pat. No. 7,389,242 by Frost, incorporates zoning as part of a shared document process for professionals and allows for data about a requested zoning district to be uploaded by a governmental entity service provider into a user interface.

Prior artwork has focused on the zoning district abbreviation or district name without providing the rules or controls associated with the zoning district. Furthermore, prior artwork does not associate the impacts of current and proposed future zoning controls on one or more properties.

BRIEF SUMMARY OF THE INVENTION

The present invention overcomes shortfalls in the related art by presenting an unobvious and unique combination, configuration and manipulation of real estate related data sets, user defined criteria, and other sets of data. The present invention overcomes shortfalls in the known related art by, inter alia, presenting unique user interfaces, search methods, data structures and informational paradigms to assist a person in deciphering complex zoning codes and regulations. The invention presents unobvious combinations of components, search methods data organization and data transformation. The present invention overcomes shortfalls in the known related art by, inter alia, presenting unique user interfaces, search methods, data structures and informational paradigms to assist a person in recognizing the impacts of zoning codes and regulations including the ability to run searches using hypothetical scenarios mimicking the zoning process. The invention connects "cause" comprising the zoning controls and the zoning process to hypothetically change a control with "effect" from both a physical and economic view comprising building size, number of units, building height, changes in demographics, transportation options, retail sales and employment opportunities. It also allows for improved communication between the general population and the proposed and planned developments in their communities.

Certain embodiments of the invention may serve as a data manipulation and retrieval tool that transforms publicly available zoning ordinance data from cities and counties into a more user-friendly structure by breaking down the data into individual data points and cataloging the formal names using commonly recognized names. Methods to measure the flexibility of a particular zoning code or classification includes a sub-component related to the rating of a city or county's practices as they pertain to the obstacles for obtaining a special use permit, a permit to remodel and the enforcement of their regulations. Method to use structured data to allow an electronic map to convey zoning controls and/or zoning policy objectives by location. Methods to locate suitable properties using a desired use of a property as the primary search criteria for one or more jurisdictions. Methods to measure and test hypothetical scenarios involving zoning and land-use development controls on a subject property, area and/or specified constraint to obtain quantifiable results of development and use constraints associated with zoning case and permit history. Methods to identify zoning compatibility issues for real estate development and/or business use. Methods to allow user to ask questions and retrieve answers relevant to their needs using perspective.

Embodiments of the invention include the following features:

Unique logic developed to form groups of data; visual guideposts to find look up functions using user need, use, size, building codes, addresses and other criteria; reverse direction of information retrieval; and the creation and measurement of a zoning code's flexibility or ease of obtaining conditional use permits, and/or variances.

Further embodiments include the creation of a Zoning Score to measure compatibility of proposed uses to certain sites and/or the conformity of existing improvements on the site and/or level of compatibility of a property's zoning considering adjacent properties; the creation of letters of verification for issuance from a city or county municipality to a user; and the creation of letters from users to a city or county municipality to request clarification or confirmation of a proposed use.

The present invention provides a novel way to search real property data relative to zoning and land-use development controls through a methodic design to address the complex by combining and associating logic for a) the rules b) property data and c) the zoning process.

In one aspect of the invention, the invention provides the user a way to access data from multiple governmental agencies in one interface, associate a descriptor with each district and/or area and search for one or more properties and/or uses and/or zoning districts and/or development control to query the data for better understand of policy impacts.

In another, the capabilities expand to allow the user to search for one or more properties relative to existing and/or potential conditions for a zoning control variable comprising use, building size, building type and/or some combination, to automatically analyze site selection viability for one or more jurisdictions. Results can be mapped, viewed at the parcel level and/or viewed as a group with the ability to apply economic data including zoning permits as a way to further search and/or filter results. Search is the emphasis and includes the pairing of the invention with known technologies such as free text.

In still another aspect of the invention, users can test outputs using hypothetical scenarios for data modeling with zoning actions comprising rezoning, asking for a change in use and/or development standard requirement. Results are paired with economic data, including zoning permits, and hypothetical financial impacts.

The invention takes current processes and known outputs and automates and/or streamlines and/or creates an interactive aspect to services currently only provided by the government planners or private planners. These include but are not limited to letter of verification and/or determination, character area, planning capacity study, existing condition report and/or notification of proposed project and/or outcomes from public hearings regarding zoning cases for use in unofficial capacity.

Unique logic associated with the concept of zoning compatibility in which zoning district permissions for a development or use are supplemented by the need for the location to not be in conflict with identified uses the community protects such as churches and schools. This logic allows for a more targeted search, evaluation of site suitability and planning tool.

Methods to measure the impacts of a flexibility of a particular zoning code or zoning control on a specified property or group of properties relative to hypothetical zoning classification includes a sub-component related to the rating of a city or county's practices as they pertain to the obstacles for obtaining a special use permit, a permit to remodel and the enforcement of their regulations.

In one embodiment of the invention, users may obtain needed information by requesting a specific data element or data grouping. The novel use of spatial data, also referred to as, Geographic Information System (GIS) records may be used to provide a "ballpark" or rough estimate analysis regarding the zoning conformity to a user's proposed use of a property.

BRIEF DESCRIPTION OF THE DRAWINGS

FIG. 1 is a sheet of text demonstrating a cross-reference to another code section. And showing the uses permitted by the zoning district; this is an example of a zoning control.

FIG. 2a is a table of code and zoning values.

FIG. 2b is a table of translations.

FIG. 3 is a table of zoning codes and permitted uses.

FIG. 4 is a table of zoning codes and various lot size requirements.

FIG. 5 is a table of zoning code information parsed by lot size restrictions.

FIG. 6 is a collection of tables with an example report of allowed construction for a given set of municipal restrictions.

FIG. 7 is a pseudo screen shot of one disclosed user interface.

FIG. 8 is a pseudo screen shot for the display of size data for a giving zone code.

FIG. 9 is a pseudo screen shot showing a look up of use data for a specified zoning code.

FIG. 10 is a pseudo screen shot showing a look up of specified use for a selected zoning code.

FIG. 11 is a chart demonstrating a Zonability Flexibility Rating and its related elements.

FIG. 12 is a table describing the steps needed to create one embodiment of a Zoning Score.

FIG. 13 is a listing of CC&R restrictions.

FIG. 14 is a pseudo screen shot showing an application program interface (API).

FIG. 15 is a table of information relevant to a set of zoning code rules regarding "size" restrictions.

FIG. 16 is a table of information comparing a set of zoning code rules regarding allowed "uses."

FIG. 17 is a table of comparison of user entered data to zoning code rules.

FIG. 18 is a pseudo screen shot showing one contemplated use of GIS technology with a user entered address.

FIG. 19a is a pseudo screen shot showing details from a use of GIS technology.

FIG. 19b is a pseudo screen shot showing allowed uses for a selected property.

FIG. 20a is a pseudo screen shot showing a sample selection of data generated from a GIS search.

FIG. 20b is a pseudo screen shot showing a sample selection of data generated from a GIS search that shows the zoning ordinance rules.

FIG. 20c is a pseudo screen shot showing a sample selection of data generated from a GIS search and related outcomes.

FIG. 20d is a pseudo screen shot showing a sample selection of data generated from a GIS search that combines all aspects—the look up by address, the zoning code, the rules and the outcomes.

FIG. 21 is a pseudo screen shot showing a GIS map with a Zoe Analysis.

FIG. 22 is a pseudo screen shot showing a data retrieval option.

FIG. 23 is a pseudo screen shot showing CC&R categories. These pertain to properties with shared common areas such as condominiums and master planned communities.

FIG. 24 is a sample letter generated by one embodiment of the invention.

FIG. 25 is an overview of the computer implemented application.

FIG. 26A show the current access to the information this application automates for the consumer, expert and government agency.

FIG. 26B shows the Zoning Information Decision Tree used by the application to anticipate the consumer's data needs.

FIG. 27 show the use and function of the application.

FIG. 28A shows the overview of the system.

FIG. 28B shows a detailed view of the system.

FIG. 28C shows some of the search options.

FIG. 28D shows examples of perspective with role and motivation.

FIG. 29 shows the basis of the spatial data structure.

FIG. 30A is a view of the types of structured data in the database.

FIG. 30B shows a sample output for compatibility logic showing distance-to rules for protected uses and/or districts as per the zoning rules.

FIG. 30C shows another output for compatibility.

FIG. 30D shows an example of an address with multiple layers of regulation.

FIG. 31 shows an example of a data output, an electronic map.

FIG. 32 shows an example of data output, the use of descriptors to associate a zoning district with a zoning control or controls.

FIG. 33 shows an example of structuring non-spatial data zoning controls regarding development standards.

FIG. 34 shows an example of data output, a dashboard view of a city's zoning with the ability to search because of the structured zoning data.

FIG. 35A shows another example of data output, the use of data to show a visual representation of one or more property's height potential.

FIG. 35B shows potential with location change indicator data.

FIG. 36 shows the use of hypothetical zoning actions to test scenarios.

FIG. 37 shows the application's search capability for one or more uses for one or more jurisdictions.

FIG. 38 shows the application's search capability for a specific use with options to tailor the search.

FIG. 39A shows the applications search capability by a property type through an image.

FIG. 39B shows the applications search capability by a recognizable brand name.

FIG. 40A is an example of data output showing a use based search with mapped and listed results.

FIG. 40B shows an output with a count of the number of matches.

FIG. 40C shows an output for a property and 3 closest neighbors based on a search for the use "hotel".

FIG. 40D is a sample output of calculations providing an estimate for maximum building size and height.

FIG. 40E is a sample output of messages and definitions associated with the data associated with one or more parcels comprising districts, uses, business controls.

FIG. 40F is a sample output of the property data associated with a parcel used to create meaning to the zoning and land-use development controls.

FIG. 40G is a sample of outputs for a specific parcel with visual display of the zoning and land-use development controls.

FIG. 40H is a sample output of data in an exportable format.

FIG. 41 shows results for hypothetical scenario testing.

FIG. 42 shows the use of the invention for future determinations.

FIG. 43 shows outlier parcels that potentially cross into two same-level jurisdictions.

FIG. 44 shows the invention's data structure applied to other districts besides zoning and land-use development but with real estate impacts such as water districts.

FIG. 45 shows sample data outputs based on perspective.

FIG. 46 shows an example of a formulated regulation.

REFERENCE NUMBERS 1 a self-service inquiry component to ask the user what they want to know comprising the type of query, their perspective and motivation.

2 the web application invention runs the queries on a structured database with logic and returns answers.

3 are the answers to property utility comprising potential development and use returned with the user in a number of formats.

4 is the database which stores structured spatial and non-spatial data.

5 is the logic used to run the queries.

6 is spatial data obtained from third parties or created.

7 is zoning controls obtained from the zoning ordinance comprising such attributes as development standards, use permissions, policy goals.

8 is environmental controls and span from watersheds, protected species, stormwater management, tree protection.

9 relates to transportation which drives zoning and land-use development control policy for areas based on zoning attributes such as street type, transit-oriented developments, traffic impact analysis tied to what uses are allowed.

10 is the neighborhood level data comprising of boundaries, businesses, permits.

11 is property data usually associated with the local county assessor comprising of lot size, building size, ownership, year built, existing use, assessed value.

12 is historic related data and comprises districts, landmarks.

13 is economic related data comprising demographics, retail sales, real estate sales, rental rates.

14 use logic to structure zoning control rules based on compatibility as defined by zoning which often restricts the development for a commercial building when adjacent to a residential with the restrictions varying by local.

15 uses logic to create calculations such as maximum potential building size, height, density, lot coverage and conformity to current local zoning rules.

16 is an output in the form of a report.

17 is an output in the form of a score.

18 is an output in the form of an API, application programming interface.

19 is an output in the form of an electronic map.

20 is an output in the form of data.

21 is the consumer and/or user of the application.

22 is the current ways the consumer can access the information this invention gathers automatically for un-official use such as calling or visiting the local government planning department or using their published online website documents and maps.

23 is the government agencies controlling the compliance and regulation of zoning and land-use development controls.

24 represents the experts with technical zoning and land-use development experience.

25 are the regulations associated with one or more properties that control the utility and development of real property.

26 is the government could opt to use the invention to share across multiple agencies.

27 is the ability for the application to connect experts with educated consumers who wish their expertise.

28 is the ability for government to use the invention to automate tasks comprising letters of verification and/or letters of determination, character area analyses and planning capacity studies.

29 is the ability for experts to work with government agencies; this includes quasi-governmental agencies such as economic development corporations.

30 is the questions the user has presented in the form of search.

31 is the perspective the user may provide to tailor search results; perspective includes role (owner, seller, agent), motivation linked to use of the property.

32 is the data record created by the query.

33 represents the format outputs.

34 represents the combinations possible for search.

35 is for a property comprising a single parcel or group, neighborhood or district inquiry with a known location but the utility of the property is to be found.

36 use inquiry in which the use comprising businesses, building types, brand and activities are known but the location or locations need to be found.

37 is a search for hypothetical scenarios to test new zoning controls applied to one or more parcels.

38 allows for attribute search as related to zoning and land-use development controls and comprise development standards (building height, floor area ratio, setback, parking), district use permissions (business uses, building types, activities), district policy goals, jurisdiction rebuilding damaged structure permissions, zoning district abbreviations.

39 is an electronic map based search using a map.

40 shows examples of spatial data used in the application.

41 shows examples of non-spatial data which takes the form of zoning controls for data related to the zoning ordinance (district names, definitions, development standards, district use permissions) and location change indicator data such as demographics, retail sales, permits.

42 is the option for the user to iterate with the data returns.

43 is the option for the user to filter the data returns.

44 is the option to edit report returns.

45 represents an output in the form of follow up inquiries.

46 is information without regard to consistency.

47 is a test of conformance for a property relative to the zoning controls.

48 is zoning information from an official government agency signed to attest to its warranty.

49 is unofficial zoning information from a non-governmental agency.

50 is a zoning action comprising rezoning, changing a use permission, changing a development standard.

51 is a measurement of likelihood regarding a zoning action.

52 is rating of likelihood low, moderate and high.

53 is a specific location.

54 is a district or districts referring to zoning districts, planned areas or any boundary constraint used to articulate a zoning and/or land-use development control.

55 is neighborhood.

56 is a specific use as found in a local zoning ordinance.

57 is an existing use.

58 is a proposed use.

59 is property utility.

60 is a development standard control building size use because parking requirements control use.

61 is definitions.

62 is building size potential.

63 is building height.

64 is number of units or density.

65 is investment potential.

66 is adaptive reuse.

67 is location change indicator data.

68 is role buyer.

69 is owner.

70 is business owner.

71 is architect.

72 is investor.

73 is lender.

74 is neighbor.

75 is neighboring properties.

76 is color to associate location with zoning control.

77 is a descriptor used to articulate a zoning control.

78 is a development standard zoning control.

79 is organized structured zoning ordinance data creating an inventory view.

80 is building information modeling (BIM).

81 is standardizing uses from a zoning ordinance to other classification systems.

82 shows an interface to select a use.

83 shows the ability to incorporate a proposed change to reflect in the data returns; this is also referred to as motivation.

84 is the ability to search for business operations as controlled by the zoning.

85 is the property search by an image.

86 is the search by brand.

87 is the visual display of returns matching criteria that when clicked can generate calculations and retrieve data specific to the location and based on the query.

88 is the option to share the findings whether by email, through a portal on a website or a data export function.

89 is the map legend able to use color tiles on the map to express zoning controls.

90 is a filter for a geography reflecting the data returns lat/lon coordinates relative to a geo-boundary.

92 is the "i" for information to add guidance to the user while in the application.

93 is the user's preferences for data to be retrieved as part of a search.

94 is the search parameter.

95 is a return of matches based on query.

96 is the functionality of the list of data record returns from the query.

97 numbers the data record returns from the query and when clicked connects to individual parcel level data returns automatically.

98 is the association of zoning permission for a use; "likely ok" is associated with the zoning ordinance showing the use as permitted.

99 is the association of zoning permission for a use; "maybe ok" is associated with the zoning ordinance showing the use as conditional.

100 the association of zoning permission for a use; "unlikely ok" is associated with the zoning ordinance showing the use as prohibited.

101 is the retrieval of use opportunity for a parcel and its neighboring parcels.

102 shows the application's ability to calculate a maximum building structure using zoning control attributes; this example shows size in square feet.

103 shows the application's ability to calculate a maximum building structure using zoning control attributes; this examples shows height in stories.

104 shows messages created to give the legalese nature of zoning and land-use development controls context to the lay person.

105 shows the use of policy goals to provide great levels of understanding of the tone of the zoning controls.

106 is the role of the person interested in a land-use development search such as the buyer, 68, owner, 69, business owner, 70.

107 is motivation is linked to the reason for the search.

108 is experience level and includes knowledge of vocabulary and terminology.

109 zoning geo-spatial (GIS) data.

110 lots and parcels geo-spatial (GIS) data.

112 boundary geo-spatial (GIS) data such as city limits.

113 is hierarchy logic for properties with multiple layers of zoning and/or land-use development controls.

114 shows base zoning, the primary set of zoning controls.

115 shows overlay zoning, the secondary set of zoning controls.

116 is compatibility logic for properties to identify specified location controls.

117 is a comprehensive plan, also referred to as a general plan, that shows long-term planning objectives for a municipality.

118 refers to future potential based on a future based zoning control comprising future land use as identified in a comprehensive plan.

119 is future land use code, a description regarding the projected use classification.

121 is logic associated with property characteristics as they relate to zoning and/or land use development controls.

122 is logic associated with geo-spatial data structuring.

123 is location change indicator data.

124 is formulated regulations.

125 are attributes from property data used to run business logic.

126 is an abbreviation for a zoning district.

127 is the name for a zoning district.

DETAILED DESCRIPTION OF EMBODIMENTS OF THE INVENTION

The following detailed description is directed to certain specific embodiments of the invention. However, the invention can be embodied in a multitude of different ways as defined and covered by the claims and their equivalents. In this description, reference is made to the drawings wherein like parts are designated with like numerals throughout.

Unless otherwise noted in this specification or in the claims, all of the terms used in the specification and the claims will have the meanings normally ascribed to these terms by workers in the art.

Unless the context clearly requires otherwise, throughout the description and the claims, the words "comprise," "comprising" and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "above," "below," and words of similar import, when used in this application, shall refer to this application as a whole and not to any particular portions of this application.

Referring to FIG. 1, a fly out box is shown and shows a reference to another code section. As various municipal code sections are referenced within other code sections, one feature of the invention is the inclusion of all referenced code sections in an analysis of proposed uses for a given property with a given zoning value.

Referring to FIG. 2a, a table is presented wherein property uses are delineated for individual look ups by a particular code or use and its approval rating by the code. For example, Principal Uses (permitted by right) and Conditional Uses (subject to commission or special approval) are presented to the right of three listed zoning districts.

Referring to FIG. 2b, a table of translations is presented. Terms of zoning code "use" information is presented next to lay categories that are understandable to lay people. The presented segregation of data allows for a reverse-directory search for data.

FIG. 3 presents a disclosed method of delineating Permitted Use and Conditional Use by zoning codes and specified uses such as Single Family Home. The "P" shows Permitted Uses and "C" shows Conditional Uses. The rows show specified uses and the columns show zoning codes. A unique data retrieval methodologies of an embodiment of the invention is the entering of individual uses into a database associated with multiple zoning codes.

FIG. 4 presents rows for zoning districts and columns for some of the size criteria used in zoning: lot size, floor area ratio and setbacks.

FIG. 5 presents one method of delineating zoning codes and lot size data upon a spread sheet that is entered into a database. Not only is the "lot size" data used but so are the other requirements such as "maximum height" for the building(s).

FIG. 6 presents a sample generated report using a disclosed method to a) show a comprehensive overview of the zoning code's basics (uses and size) and b) to check these requirements for a particular property. The goal is to check for uniformity. This specific property's data can be auto-filled from a third-party data provider such as public record data or the user can enter the data to show the property "as is" or to test various scenarios.

FIG. 7 presents a pseudo screen shot with a disclosed interface in facilitating a search of the disclosed data base, such a search might include a zoning district, a specific property, a use (excludes parking/signage/"watch use" and "watch code.") The interface supports multiple views and pivot points to examine zoning code data. In various embodiments of the invention, a user, such as a non land-use expert, may focus upon on data retrieval as well as manipulation to add organization and greater comparability and comprehension of zoning codes and other building restraints.

FIG. 8 presents a pseudo screen shot of a provided process and interface comparing size data, specified zoning codes, for a specified city or specified county.

FIG. 9 presents a pseudo screen shot showing process of looking up "Use" data by a specified zoning code for a specified city or specified county.

FIG. 10 presents a pseudo screen shot of a disclosed process of looking up "Specified Use" and the results show what zoning codes allow that specified use. Additionally, the users could search by a brand name to find out what zoning codes support that use. This is geared primarily to help a business find a potentially suitable location. The system may also be used to communicate with the municipal planner to describe with "use" they are applying for.

FIG. 11 presents a Zonability Flexibility Rating chart. In one embodiment, the Zonability Flexibility Rating chart rates a specific zoning code en masse, not by a specific property. Elements that may be used to derive a Zonability Flexibility Rating include: prominence of zoning code in particular market, number of uses permitted by a particular zoning code, number of uses requiring a conditional use permit, size related rules, exclusions and exemptions, parking requirements, design review requirements, rebuilding options in case of destruction, bonus densities, energy efficiency requirements, and moratorium uses or encouraged uses for land.

FIG. 12 presents an explanation for one type of Zoning Score which reflects a specific property. FIG. 12 also presents one set of steps used to derive a Zoning Score. The Zoning Score may be auto-generated using available data. The Zoning Score can change as the user interacts with the data.

FIG. 13 presents a sample of CC&R restrictions sorted by categories. Such CC&R may be used to define uses that are prohibited or permitted. Such permitted and unpermitted uses may be collected by one embodiment of the disclosed invention and used for ascertaining permitted uses or the desirability of acquiring a property.

FIG. 14 presents a pseudo screen shot of how one embodiment of the disclosed invention could be used in a typical third party website as a widget or API (application program interface).

FIG. 15 presents a "size" related output for a selected zoning code. This table may be the product of an ancillary "size" widget that uses or works with one embodiment of the invention.

FIG. 16 presents a "use" related output for a selected zoning code. This table may be the product of an ancillary "use" widget that uses or works with one embodiment of the invention.

FIG. 17 presents a table of calculations derived from a data provider like GIS technology to target a specific parcel's data including it zoning code(s) and other attributes such as lot size, house/building size and other attributes.

FIG. 18 presents a pseudo screenshot using GIS technology wherein a user has been prompted to enter an address and wherein a user has received a "details" hyperlink to view further information regarding the entered address. Such details are shown in FIG. 19a, and include, lot number, land use, lot area and name of neighborhood.

FIG. 19b presents further "details" from the hyperlink of FIG. 18. Such additional details include content from a screenshot using GIS technology. The available "details" provide extensive content culled from a database such as GIS. database. Such details include allowed uses and other data elements. The GIS provides layers used to create unique interactive maps with zoning ordinance data and related data embedded. GIS maps manipulated with database data show percentages by use (residential, commercial, mixed, industrial public) by block, specified neighborhood or radius from a specified location.

FIG. 20a presents a pseudo screenshot using GIS technology and shows a sample of data culled from the database and the calculations using the development standard rules. The figure presents one embodiment of Z.O.E. also known as a "zoning ordinance evaluator" tool.

FIG. 20b presents another pseudo screenshot using GIS technology and shows another Z.O.E.

FIG. 20c presents yet another pseudo screenshot using GIS technology with a Z.O.E. showing the compliance or non-compliance with various zoning restrictions.

FIG. 20d presents yet another pseudo screenshot using GIS technology with a Z.O.E. showing the compliance or non-compliance with various zoning restrictions and showing lot and zoning information.

FIG. 21 presents a pseudo screenshot of one contemplated embodiment of the invention. This embodiment includes an interactive map that allows users to click upon either a map label for zoning information or to click upon a parcel to obtain further information such as zoning, code name, description or rules. These maps can be generated by neighborhood, block or a radius from a specified location.

FIG. 22 presents a pseudo screenshot of one contemplated embodiment of the invention, featuring Zoning Details a function with the ability to organize data by zoning code including peripheral data relevant to understanding the impact of zoning such as the number of properties zoned, the average lot size and building size (in comparison to the zoning code rules), the variances, planning commissioner meeting notes and other data elements. This data can be made mobile through the creation of a widget or API.

FIG. 23 presents a pseudo screenshot of one embodiment of the invention use to evaluate condominiums, one example of a use that has Covenants, Conditions and Restrictions.

FIG. 24 presents an example of a pre-formatted letter allowing a city or county planner to select answers to save time. The invention includes embodiments wherein reports are automatically generated by use of the disclosed system.

Referring to FIG. 25 shows a simplistic view of the invention allowing for self-service, computer implemented search, 1, through an application that consists of several parts. The structured database, 4, combines spatial data, zoning controls in the form of structured data, environmental data, transportation, neighborhood, property data, historic and economic. In the element for logic, 5, the rules relevant to the subject of zoning and land-use development controls comprise compatibility, calculations, property characteristics and spatial data are handled. Answers, 3, return results in several formats comprising reports, score, application programming interface, maps, data and inquiry Referring to FIG. 26A, the consumer, 21, has a manual and multi-step process to access, 22, zoning and land-use development controls by phoning, emailing or visiting in person a government agency, 23, for information, 46. There are two types of zoning information a consumer receives: 1. Unofficial, 49, which is obtained from an agency free of charge and is casually dispensed; and 2) official, 48, information for which the consumer is required to submit for the request, often times for a monetary fee, to get back what is often times called a letter of verification or letter of determination within a time frame spanning multiple business days that explains the zoning controls on the property. In the case of a letter of determination, it expands the scope of work to return an initial planner's view of the proposed use and/or development for a specific property. The limited online tools provided by the government agency, 23, are often too complicated for the layperson to know how to use primarily because the online tools focus on an agency and/or jurisdiction control. For instance, the property data, from a tax assessor, is a different agency and often times jurisdiction (county vs. city) yet it is the zoning controls paired with property data that provides for answers relevant to a consumer. A consumer may contact an expert, 24, to get their questions answered. The experts will have the experience to navigate the on line tools provided by the government agency and/or may opt to call the agency for information. The consumer will likely hire and pay the expert, allowing time for the expert to gather, analyze and respond. The key differences between the invention and either the government planner or private planner is time and/or money and/or level of detail. While the private planner may provide a detailed report for their customers, the government planner's outputs lack contetxtual details and tend to be useful to users with expert experience to read and comprehend the outputs.

Referring to FIG. 26B, it is a visual expression of the decision tree for assembling zoning information with a flow regarding the process for zoning referred to as zoning action, 50. The invention automatically gathers the information, 46, to first understanding the zoning controls, 7, relative to a specific property or properties, 11, looking for compliance, 47, "yes" or "no" with an official, 48, or unofficial, 49, check of the property's compliance. The perspective, 31 includes roles of parties motivated to get the information and comprise owner, seller, agent. The zoning action, 50, is the process of submitting officially to gain permission for some type of action such as rezoning or requesting a variance. The invention is designed to provide answers for the consumer in their weighing of decision to undergo a zoning process. Whether an government agency or expert, the steps require the person(s) understand the rules associated with a property or properties, compare the rules to the property or properties and match findings to motivation of the consumer to return answers about the need to undergo a zoning process and the likelihood of achieving a zoning permit.

FIG. 27 illustrates the application with three identified groups to use the system including the consumer, 21, the experts, 24, and the government agencies, 23. The structured database, 4, and logic, 5, store data and support the execution and retrieval of queries. The inventions provides an option for government agencies, 23, to use the system across multiple agencies with a singular platform offering continuity and a method to automate tasks, 28, which comprise letters of verification and/or letters of determination, character area analyses and planning capacity study reports. The invention allows for the consumer, 21, to work with experts, 24, in the form of preformatted inquiries, 27. The experts can work from the same system, 29, to work more efficiently with government agencies on consumer directed inquiries.

FIG. 28A provides an overview of the application to show the flow from the initial search, 30, to getting answers in various formats, 33. The user is given the opportunity to add perspective, 31, which includes the role, experience level and motivation for wanting to get their inquiry or inquiries answered. The application, 2, retrieves structured data, 40 (spatial) and 41 (non spatial), in the database, 4, with logic, 5, as needed for the query. A data record, 32, is procured and the option to iterate, 42, by editing the query, and/or to filter, 43, by sifting through the retrieved data records, is offered. The answers, 3, can then be returned in various format, 33.

FIG. 28B provides details for search, 30, comprising property, 35, use, 36, hypothetical, 37, attribute, 38, and/or electronic map, 39 and answers, 3, comprising data, score, report, api, electronic map, api and inquiries with the option to edit, 44, the report format. The property search, 35, is used when the location is known but the zoning controls relative to the property or properties is unknown. The use search, 36, is used when the use is known but the location or locations is unknown. The hypothetical search, 37, is used when a property or group of properties is known but testing of scenarios is desired to see "what if" possible outcomes. This search enables the user test zoning actions comprising rezoning, changing a use permission, changing a development standard and selecting one ore more variables to test the hypotheticals. Through this process, the user is able to gain a sense of the power of zoning controls by automatically seeing outcomes. It is also applicable to creating automated capacity studies in which variables are tested automatically generating results. Search by attribute, 38, allows for a query based on the notion the user knows the attribute but not the data associated with it. Search by electronic map, 39, is a search initiated on an electronic map allowing for geo-location functionality in addition to the search by property, 35, use, 36, hypothetical, 37, and/or attribute 38. The combination search, 34, allows the search to use one or more of the search. For example, a user could search for a "use" such as medical office and "property" to specify a location. The structured database, 4, stores structured spatial data, 40, and non-spatial data, 41. The invention uses spatial data which allows for the association of data on a latitude and longitude basis. While the current format is known as geographical information system (GIS), the invention is able to adapt. The logic, 5, allows for the application to automatically calculate development potential for a property or properties and provide compatibility analysis to identify situations that don't meet requirements for distance-to for protected uses such as churches and schools, adjacency zoning issues such as a commercial district adjacent to residential and/or street type controlling uses to protect or promote identifiable developments and/or uses.

FIG. 28C provides potential search options. The invention allows for robust search across multiple jurisdictions due to the structuring of data with logic. The invention solves the problem of focusing on a specific location and then identifying the land-use development potential and/or use restrictions. Instead, the user can query data to find results based on their specific interest in knowing the land-use development potential and/or use restrictions as well as the contextual data around the subject such as "location change indicators", 67, which provides data analytics regarding physical changes completed, underway or planned in the queried area. Another example is to run a search for properties allowing a specific use, 56, in which the structured data base is able to return parcel-level data for matches.

Referring to FIG. 28D, the perspective allows for a more personalized search experience because the role, 106 and motivation, 107 influence the level of data retrieval required comprising calculations, comparisons and messages. Adding a level of zoning and entitlement experience in a specific jurisdiction, 108, further articulates the user's perspective. Examples of perspective, are: 1) an owner/user of a one-story commercial building with no prior experience with zoning is interested in knowing if it looks possible to redevelop it into a multi-story building in the future. The zoning controls for building size and likelihood of obtaining permission are at the root of the question. Because the user is not experienced, definitions will include beginner level guidance notes with the data response. 2) a potential investor is interested in buying the same one-story commercial building and is well experienced in zoning matters and, in particular, for that municipality. The zoning controls for building size and likelihood of obtaining permissions are at the root of the question. Because the user is experienced, no definitions are returned with the data response.

FIG. 29 focuses on the spatial data used in the application. While the structuring of the zoning ordinance and land-use development rules create a self-contained search and retrieval with organization of the data, the spatial data creates an association of that data with a location with varying levels of granularity. The spatial data for zoning, 109, creates polygons for geo-spatial locations but this level can't specify the levels of regulation at a defined parcel. This is why spatial data for lots and parcels, 110, is incorporated. The spatial data for boundaries, 111, allows for blocks of search by a geo-spatial defined area or areas such as zip code, city boundary and/or neighborhood boundaries.

FIG. 30A provides greater detail as to the types of data spatial, 40, nonspatial, 41, and the logic, 5, used in the invention. Spatial data, 40, forms the association of a property's location with land-use controls which are often set up geographically. The non-spatial data, 41, provides contextual data regarding the land-use controls and the property. The logic, 5, handles hierarchy and compatibility type of logic using rules associated with property characteristics, 121, and GIS spatial data structuring, 122. Hierarchy, 113, has to do with the situation arising from multiple layers of regulations on a parcel and knowing which layer is valid for which zoning control and is further explained on FIG. 30D. The compatibility logic, 116, has to do with the nature of zoning and land-use development in terms of how permissions and limits are expressed and is further explained on FIG. 30B.

FIG. 30B shows the logic for testing compatibility, 116, in which a rule or series of rules specify location of uses by stipulating a distance-to requirement and/or adjacent zoning and/or adjacent existing uses and/or a combination.

FIG. 30C refers to creating a test for compatibility issues by selecting a location and retrieving potential compatibility conflicts. The exhibit shows an "x" which is meant to represent a protected use, such as a school, that can impact development potential around it. Item "1" is meant to show such a location that may be zoned to allow for a "bar" but due to the proximity to the protected use, it is not a suitable candidate for that use. Item "2" shows as having no compatibility issue. Item "3" shows an issue with the "x" being another known protected use, residential.

FIG. 30D provides an example of a property with multiple layers of regulations requiring the use of logic for hierarchy, 113, to enable the return of data applicable to the requested search. The base zoning, 114, has primary control, and reflects the item labeled "MF-4" and identified with a circled number "1". The overlay zoning, 115, has additional policies to model and is identified by the three labeled items "UNO", "RDS" and "NP" with a circled number "2".

FIG. 31 is a return of a data output with the electronic map displaying capabilities of associating a zoning control and/or descriptor with a location or locations automatically. A descriptor is a way to describe a zoning policy that is either trying to encourage or discourage development and/or change. The map legend is color coded to associate a location with a zoning control and/or descriptor.

FIG. 32 shows a that descriptor is subjective but it can be based on objective data given the structured database with zoning controls, zoning permits etc. For example, the descriptor "design" has to do with requirements for attributes comprising glass, paint color, architectural details, parking placement. The descriptors can be associated with other information such as definitions, zoning cases and/or news stories involving zoning.

FIG. 33 is a screenshot of the input for the zoning controls associated with development standards. Each zoning ordinance has its own way to express building size and form as well as placement, design and additional structures. The application is able to coalesce the data required to return a uniform output for estimated maximum building size, lot size requirements, heights etc. for multiple jurisdictions.

FIG. 34 shows a screenshot of the structured data creating a dashboard from which zoning controls can be viewed, edited and compared. The organization of data with geo-spatial data allows for the user to know the inventory of a jurisdiction, neighborhood or other boundary by querying the data for the properties allowing a specified use and/or that meet a lot size and/or building size criteria and/or year built. For example, demand for data centers could be the focus of a query in which the user asks which districts permit the use and then have all parcels return with an supply report comprising number of parcels, size of parcels and locations. When paired with property data, the query for supply can expand to include existing uses, ownership, current improvements etc.

Referring to FIG. 35A, the invention's structuring of data creates an opportunity to use it for compatible applications such as building information modeling, a technology being used by engineering companies to help the community visual the proposed projects. This is of great use in building community support for a planned and/or proposed project, especially infrastructure and/or private-public projects impacting the real estate located adjacent and nearby.

FIG. 35B shows the use of location change indicator data, 123, in which the economic drivers for new construction are made readily available.

FIG. 36 shows a hypothetical using a search based on economic development corporation sponsored projects since such investments can work to change the area around the investment. The user identifies the property or properties and sets up the hypothetical zoning action, in this example "rezoning", to query what zoning district or districts allow for a building height of at least 3 stories and then to apply those rules to the identified property or properties. Other queries are possible regarding the approved economic development project and/or the brand. The invention allows for branded development. Most, if not all, economic development corporation sponsored projects involve a brand. The collection and structure of the data can reflect development standards associated with the planned project, what is typical for the brand, typical lot size requirements etc. and pair the economics of the approved or branded project such as store sales, per square foot, earnings, number of employees etc.

FIG. 37 is a view of search by use where the user knows one or more uses and wants to know where they can be located. This can be accomplished for one or more jurisdictions using a methodology, 81, of standardizing uses from a zoning ordinance to other classification systems to allow for search by use.

FIG. 38 shows another view of search by use in which the user is also able to query the database for proposed change, 83, options and business operations, 84. Zoning controls hours of operating, outdoor display, outdoor seating, drive through windows, walk up take out windows and size related data such as number of employees, tables, etc. The application is able to use structured data and logic to return applicable results.

FIG. 39A is another way to search by image and brand. The image search allows the user to send a query from a mobile device, 85. The user's geo location is identified and results returned. FIG. 39B search by brand, 86, allows the user to select an image and/or logo and query where the branded development might be allowed, or not. The data associated with a branded type of development is added to the database.

FIG. 40A refers to output from a search in which multiple locations are possible with search by use, 36. The query, 94, allows the user to articulate the type of search with the option to have the query focus on data preferred by the user, 93. The results, 87 and FIG. 40B, provide multiple ways for the user to interact with the data. The user can click on a map icon to get parcel level information with or without neighboring properties. The map legend, 89, express zoning controls by coloring the electronic map. The user can opt to change these as part of a hypothetical search, 37, which can be combined as part of another search, 30.

FIG. 40B shows the number of returns, 95, a description of each return, 97, in a list, 96, with functionality FIG. 40C shows an example of output by use permissions with a side-by-side comparison, 101, for multiple properties. The "i" is useful to providing additional help in guiding the user. The permissions include likely ok, 98, maybe ok, 99, and unlikely, 100, which correspond to permitted, conditional and prohibited. The application is able to highlight uses based on the user's query. Use permissions associated with physical property requirements such as a lot size can be factored in through the logic, 121. For instance, if the rule requires the lot be at least "x" size, the application can take that into consideration and retrieve relevant returns.

FIG. 40D shows an example of an output for a maximum building potential using calculations, data retrieval and logic. The application can convert the returns to metric, stories to feet and feet to stories, square feet to acres and acres to square feet etc. The development potential estimate uses logic which formulates a hierarchy to know to return results based on the trumping effect between multiple layers of zoning and/or land-use development controls. For instance, the rule for height could be retained by the primary base zoning but the land-use development control for watersheds, for example, could constraint the maximum building size. The ability to connect numeric outputs to relevancy for the area and/or relative-to comparison as well as connecting location change indicator data such as demographics to results.

FIG. 40E shows an example of the output with messages created to provide greater understanding of the district, development standard and/or use and/or other zoning control. The policy goal is used to help provide greater context to the user and can also be used to improve logic associated with search and data retrieval. For instance, a auto-related use may be conditional meaning some form of special permission is needed to ensure the municipality has had the chance to review the situation prior to providing a permit. If the policy goals are slanted towards "environmental" or "pedestrian friendly" the policy's tone could be anti-auto. The data return could indicate the probability for the use being approved at that location is lower than in another area without the same policy.

FIG. 40F refers to the report output with property data, 125, used to run calculations, comparisons, lists potential restrictions and check for jurisdiction controls over land-use and zoning.

FIG. 40G shows the visual representation of the calculations performed on a select property with deltas to show "relative to" the existing conditions and potential.

FIG. 40H the data output can include data exportable to use in a spreadsheet; the output also includes an API, application programming interface, to allow for the data to be used in other applications FIG. 41 shows a hypothetical. The user selects an area and asks to apply a different lot size requirement for the use "duplex". This provides a planning tool as well as a way for a user to understand the implications of zoning controls. It can be used to find suitable sites for development, possibly requiring a zoning action to obtain the zoning permits. When it comes to development, entitlements are part of the soft costs along with fees and holding costs. The hard costs are the construction materials and labor. A user making a decision to go forward with a zoning action is interested in knowing the outcomes from similar cases. This is why the invention includes permit data to allow for the user to weigh their options.

FIG. 42 refers to future planning determinations, 118, as per a comprehensive plan, 117, which create future land use codes, 119. The future plans create future land use codes which are descriptive but without the zoning controls. Examples include: "high density residential", "office", "mixed-use." Spatial data contains the variables for a comprehensive plan in draft and/or finalize format. The comprehensive plan is sometimes called a general plan and looks out 10 or more years as to the planning needs for a municipality. Once approved, a comprehensive plans guides decisions made using future land use codes as an indicator of what development a municipality wants at a specified location. It works with zoning controls because in instances where the zoning and the future land use code vary, if a user is motivated to change a property, the municipality has the power to not allow the change given the comprehensive plan which is land-use development control. In cases in which a property is currently zoned for industrial use and has a future land use code of mixed-use, a rezoning request to change the zoning to support mixed-use development is allowed because it adheres to the municipality's vision. This invention's inclusion of permit data allows for the search and retrieval of data points relative to the zoning process and relative to the existing zoning as well as approved rezoning. Data regarding the subject of rezoning approval or disapproval and/or another zoning action such as variances, conditional use permits issued in the past may help in creating a pattern for the potential for future approvals.

FIG. 43 shows a outcome of using spatial data from multiple governmental agencies in a structured database issues about data anomalies come up and some are mistakes while others are reflect the realities. The parcel in the example spans across two county boundaries and appears to be reflect a reality. The application is able to handle spatial data structuring, 122.

FIG. 44 is an example of applying the application to water districts which are similar to zoning districts in that they have names, abbreviations and associations to plans and/or ordinances with controls on property development and use potential (its utility). The future for zoning could intertwine the use of water to a greater degree than is currently expressed. For instance, a jurisdiction could require water, and other utilities, to have a measurement base level associated with a use and/or building type and build regulation around meeting the requirement, similar to how traffic impact analysis (TIA) studies are used currently. A use may be allowed but "subject to" a TIA with a pre-set constraint. Should the TIA show excess traffic, the zoning permit may be denied. The land-use development codes may include water-related constraints such as watersheds. While watersheds have development controls that function like a zoning control and impact a property's utility, the linkage to water districts is not opaque. This invention makes the connection of water scarcity and/or availability relative to a location thus making water rights more transparent. Furthermore, as a way to disclose additional information, the hypothetical.

FIG. 45 shows the invention's ability to retrieve data based on the user's perspective as the issue has been the "one size fits all" mentality of planning departments to dispense information. The invention's structured database and logic allows for data returns to be organized to meet the level of the user's experience with the local zoning and real estate development, their role and motivation.

FIG. 46 shows the invention's data structure applied to formulated regulations, 124, such as transit oriented developments (TOD) and transect zones in which preconceived controls are used in multiple jurisdictions with the option to calibrate or alter the controls to meet the specific jurisdiction's needs. The common themes are captured by the application including the controls allowing for their implementation in hypothetical scenarios in addition to its incorporation as a zoning and/or land use development code regulating a property's development potential and use. The invention is able to segment data regardless of the type, meaning the new urbanism can be modeled as well as the conventional.

Multiple Utility of the Various Embodiments of the Invention

Zoning is the "open sesame" of real estate and yet the existing methodologies to obtain such pertinent data are buried in cumbersome zoning ordinances or similar property related such as covenants, conditions and restrictions. This invention removes the need to go through this time consuming process and allows the user to look up specific information requested as it relates to size, use, parking, signage, code summary and a specific property's information as well as various related municipal ordinances such as "green ordinances".

Data once retrieved can be exported into a printed report format or into a .cvs format. Methods, developed as a result of the research conducted in analyzing zoning code data, provide the basis for a Zoning Flexibility Rating, which reflects the rating for a zoning code based on a variety of variables. The Zoning Score in one version, is based on a per property basis and focuses on signifying if the property appears to be conforming or non-conforming as well as projecting upside potential or downside risk using either public record data or user provided data. Other versions are by perspective (such as buyer, remodeler, renter, investor, seller) neighborhood or geographic area. The invention includes the ability for users to iterate using a pre-programmed calculator based on the zoning rules and includes web-based and mobile APIs.

Covenants, conditions and restrictions (referred to as CC&Rs) are widely used for condominiums, master-planned communities and planned-unit developments—all of which share the need to describe the rights and duties of the owners. While they differ from zoning in that the contract is between private parties rather than a government enforcement agency, the same principles apply to developing a data retrieval tool.

Embodiments of the disclosed invention include methods of segregating data. Embodiments of the invention include data mining and information retrieval within the typical labyrinth of zoning regulations and optionally pairs it with data providers like Geographic Information System (GIS), considered a public record source, to identify a property's zoning code (s) and retrieve criteria to assist in ascertaining if the property meets conformity standards. The availability of GIS allows for the creation of "Interactive Zoning Maps" which combine the zoning code abbreviation and/or description and/or rules and/or other available property specific information. Users can click upon a zoning map label or parcel outline to obtain information. Embodiments of the invention work with additional zoning and land-use related data such as variances, transcribing planning commissioner meeting notes, historic districts, and other factors to add to information to either a specific property or to a zoning code. Embodiments of the invention include a "distance to" aspect detailing zoning and code use allowed or not allowed within a specified number of feet from the subject property.

People don't "see" zoning and land-use controls as they are an invisible force but they see the results, which manifest into physical characteristics and changes of a place. The invention approaches the complex subject of zoning and land-use development controls by structuring both spatial and non-spatial data with structured zoning controls and logic. Prior to this invention, finding answer for a specific property, zoning control or combination was a manual, labor-intensive project requiring technical expertise. In the case of search by "use" with user determined parameters such as lot size and building size, a manual process is not feasible given the volume of variables; a database with structured data and logic is required.

Embodiments of the disclosed invention include methods of expansive search and retrieval capabilities allow answering complex questions about existing conditions and hypothetical scenarios based on the perspective of the user. An important function of the invention is addressing hypothetical and for serving multiple purposes including assessing proposed rezoning, considering rezoning a property to achieve a certain expected outcome and/or asking for the zoning district to meet the criteria of the project being proposed. Until the zoning process to approve or deny a request for a zoning permission is complete, the scenario is hypothetical. The same is true for planning which differs from zoning in that zoning is regulatory while planning is a function of gathering data, assessing conditions and making recommendations for how to change the zoning in order to meet the policy objectives.

Cities are starting to undergo rezoning. Denver and Philadelphia completed rezoning in the last 5 years. Austin is just starting the process which involves planning, measuring community sentiment about ideas and then creating the zoning regulations. Hypothetical scenario analysis is helpful for understanding existing conditions in comparison to what is being proposed or future conditions for one or more properties and/or districts with associations of financial consideration including assessed values, retail sales, property values and costs reported with permits.

The incorporation of perspective refers to motivations, role and experience with zoning in a specific jurisdiction; this can be expanded to reflect risk tolerance and real estate development knowledge for a particular property type and/or municipality. Local knowledge is powerful information, especially when coupled with community connections to gauge the sentiment of a proposed (hypothetical) development.

Zoning is the law for a particular municipality and is written in technical language. It should not be confused with land-use codes which are used at the county level for tax assessment purposes and describe broad real estate categories such as vacant land, industrial, residential. The conventional zoning is called Euclidean while newer zoning is called form-based (also called transect zones or Smartcode). Regardless of the type, the rules regulate what can be built where, at what size and how it can be used and are captured by the invention.

The disclosed invention is designed to eliminate the need to access a zoning ordinance, a zoning map, and/or a property data record when conducting initial research and leverages the ability for searching for properties using zoning controls from the zoning ordinance. It is also designed to present aspects of the zoning process currently difficult to understand given the current methodology for the announcements of proposed projects, recordation of community sentiment and searchable retrievals of the outcomes involving the public hearings relative to the query.

Terms and Definitions

In describing the various embodiments of the invention the following terms and definitions are sometimes used:

"Action-oriented" use categories include: "at work", "at home", "at play", "at gov".

Classification: zoning designation

Code: same as classification, it is a way to identify a zoning type

DIY value: one of the various names of the invention, sometimes used as "do it yourself valuation."

Effort: refers to the number of steps needed to be taken prior to submittal of documentation to the city or county to request a use that requires a conditional or special use permit and/or permit to make physical changes to the property that require building permits.

"Everyday Recognition" adds well-known brand named that people can identify so as to make the type of use and size understood.

Friendly use descriptions: conversion of 'expert' terms to make understandable to the layperson Nomenclature translation and explanation—real estate terms include square feet (sf), floor area ratio (FAR). Embodiments of the disclosed invention seek to level the playing field in the user's comprehension by offering conversion of the uses. Examples include the use "hotel" which in some zoning codes is labeled as "transient habitation".

Reverse directory: concept of being able to retrieve information from multiple perspectives Size: refers to development standards that include such things as minimal lot size, maximum number of stories, and density levels that refer to number of dwelling units per square foot of a lot size.

Time: refers to the actual time in days or months once required documentation concerning obtaining a use permit or building permit is submitted.

"Traditional" use categories include: "retail", "industrial", "office", "residential", "other"

User-friendly rating: scale that rates ease, cost and convenience to the property owner or renter relative to obtaining proper permissions to use a property.

Use: refers to activities: residential and businesses.

Watch list encompasses property types (by use) or related to size or some other characteristic that need to be recognized as either being no longer allowed, being allowed but only with conditional use permit or the reverse—uses that were once subject to a conditional use permit no longer are or those uses that were not permitted even with a conditional use permit but now are either with or without a conditional use permit.

Zonability: sometimes used to describe embodiments of the disclosed invention.

Zoning Calculator: refers to the development of a series of pre-set formulas developed by a specific zoning code to mimic the rules. Users can add variables such as lot size, building size, etc. and get feedback as to whether or not such imputed variables meet the preset rules and can show how this impacts the property's Zoning Score.

Zoning Flexibility Rating: a method that measures the appeal of a zoning code or classification based on its uses permitted, scale of sizes permitted and other pertinent data points.

Zoning Score: a measure for a specific property as to its likely conformity or nonconformity per the zoning rules and/or level of compatibility of a property's zoning considering adjacent properties and/or a measure of upside potential and downside risk. Data about the property is from a public record source. Users can add and edit data to see a revised "user generated" Zoning Score. A Zoning Score may also be considered a measurement the specified property conforms to the current zoning (or not) based on available data that includes public record and/or user added. The tool is able to indicate potential upside based on a series of calculations or downside risk. Upside potential would signify room to expand while downside risk suggests an overbuilt situation.

Zoning controls are the elements that are regulated about a building's size, height and/or use. For conventional zoning, the terminology is development standards, user permissions and additional requirements regulating a property's utility. For form-based codes or transect zones, the terms are building type, buildable area, height and use permissions.

Zoning controls with assessment of location change indicator data: the pairing of structured zoning controls with data associated with measuring change for a location comprising demographics, neighborhood boundaries, assessed values, zoning permits, zoning cases, building permits, retail sales, real estate sales.

Zoning compatibility: the concept applies to assessing a situation that may put prove not harmonious by adding more steps to check if a use will be permitted or building can be constructed and how. It involve a residential property adjacent to commercial, a protected use such as a church or school which require a certain number of linear feet for separation; this is also referred to as the "distance-to" rule.

Descriptor: a brief description for the the zoning control and/or policy goal in such a way a lay person can understand the concepts of encouraging or discouraging development and/or change and/or existing condition. For conventional zoning, the use is the driver for most policy such as "residential" "mixed" etc. For form-based codes or transect zones, the terminology is more descriptive such as "meighborhood main street".

Suitable property: the concept that some real property sites are more suitable varies by the user's perceived needs as well as data showing economic conditions in one or more locations.

Building development potential: the term is also called "massing" and relates to the potential building size and height using zoning controls to express either a minimum and/or a maximum.

Use permissions potential: the regulated zoning controls regarding how a property is used in terms of the business use, building type and/or activities.

User perspective: the concept of perspective involves motivation, role and experience level. "Motivation" has to do with why the user is searching. "Role" has to do with the position of the person relative to the property such as owner/investor, owner/user, buyer, real estate agent etc. The "experience" level has to do with knowledge about zoning, real estate development and/or the zoning process relative to the jurisdiction of their inquiry.

Study and/or Character area: the area describes the building inventory in terms of physical characteristic comprising number of parcels, age of buildings, construction quality, type, ownership rate, length of tenancy, area amenities, new construction, permit levels, assessed values, job opportunities, retail, transportation and crime.

Property utility: the development and use related options for a property with a focus on the intensity of development allowed.

Property utility with hypothetical zoning controls: the possible development and use related options for a property to be developed with a focus on the intensity of development allowed.

Private-public partnerships: the formation of a partnership to construct a property or project that uses public money in some form which can vary from waived permit fees to donation of land and using the private sector to actually handle the construction and/or management duties of the property once built.

Economic utility: a focus on the property's revenue generating capacity now and in the future with projections of potential gross revenue relative to current and projected supply and demand for the use which includes its construction, building type and durable of the income stream relative to its characteristics including the surrounding area.

Economic development: the concept that policy driven initiatives such as infrastructure projects, job creation incentives, construction incentives, will build wealth for the municipality. The role of an economic developer is to develop and administer policy based on the municipality's objectives such as creating new jobs or increasing the retail sales tax base. Real estate invariably becomes a factor.

Community resource: a specific property, property type, aged property or area viewed as having value to the community that allows the community to have a voice on deciding what the property owner can and cannot do; in effect, it is another zoning control.

Community notification: the zoning process to let people know of a proposed zoning case; the notification is sent by US mail to those property owners and renters within a certain distance of the proposed project.

Community comments: a form that allows the community to write their views about a zoning case and/or speak at a public hearing.

Community benefits: developer provided incentives to the community provided in exchange for their support of the the proposed development.

Planner recommendation: an indication of how the planners view a zoning case based on their review of the case.

Future land use: a description for a property type that reflects the municipality's objectives for the location generated from future planning determinations.

Development controls: all controls on development including zoning and/or other land-use requirements including environmental, water, utilities, infrastructure, community benefits.

Comprehensive plan: a long-term plan, often mandated by the state, for a municipality to prepare to show their vision, goals and objectives to handle future growth including but not limited to transportation, housing, etc. It can be a document or series of documents and is used for making land use decisions, preparation for implementing ordinances, preparations for capital investments, and the location for future growth.

Existing conditions: the existing level of improvements, site characteristics, ownership, demographics (neighborhood character); often called an existing conditions assessment used by planners to understand the situation before applying new regulations.

Retail sales tax base: the tax revenue generated from consumers' purchase of goods and services within a municipality.

Leakage studies: an assessment as to where the sales tax revenue is coming from in terms of the customer base to identify if the local market is the being serviced or if they are spending the dollars elsewhere. Demographics matter so municipalities under a threshold size will not as easily attract well established chain retailers.

Property tax base: the properties contributing to the municipalities tax basis.

Hypothetical property value: an indication of the property's value "as if" built to the hypothetical building size, height and/or use.

Land use development controls: additional requirements beyond those found in zoning required for obtaining a zoning permit and/or entitlement. Examples include a) environmental requirements for watersheds, wetlands b) regulating plans that work in tandem with zoning and c) transportation plans with requirements for buildings and uses in proximity of stations.

Types of zoning: transect, Euclidan, form-based and/or some combination.

Land-use code: a description used by assessors to classify a property regarding existing conditions and are not associated with a set of regulations.

Location change indicator data: data providing a sense of how a place is changing in measurable terms comprising demographics, transportation options, retail sales, new construction, permit activity.

Transit-oriented development (TOD)—A mixed-use residential or commercial area designed to maximize access to public transport, increase economic activity, and often incorporates features to encourage transit ridership. A TOD typically has a center with a transit station or stop (train station, metro station, or bus stop), surrounded by relatively high-density development with progressively lower-density development spreading outward from the center.

Geographic information systems data: is spatial data geo-referenced to the coordinates of the earth. Geo-spatial and GIS are used interchangeably with the formal name geographic information system. Should this technology be replaced, the application will reflect the new format.

ExtraTerritorial Jurisdiction (ETJ): The area outside the city boundaries but identified as land a city can expand into with the power to implement zoning.

Further Details of the Various Embodiments of the Invention

In one embodiment of the disclosed invention, a quick glance feature or the composure of a Zoning Score may be composed by use of the following criteria:

By Use(s), to find the zoning classifications which allow for XYZ, or proposed uses of the property.

This can be general use (retail, residential, industrial, office, mixed)

Specific use (examples: dress store, barber shop, auto dealership)

Logic by grouping

Download option/report option

By Size, to find the zoning classifications that allow for XYZ.

By minimal lot size

By Floor Area Ratio (or density)

By Maximum Height (or # of stories)

Logic by groupings

Download option/report option

By Zoning classification or code, provides a summary or overview with an option to add a specific property to "test" its conformity or nonconformity based on basic principles such as:

Minimum lot size

Uses

Number of Stories

By Specific Property relies upon linking an address with a zoning code(s) that provides an overview of the property's zoning per publicly available data. This includes showing:

Zoning Code Name and abbreviated Name

Zoning Code Definition

Permitted Uses

Conditional Uses

Developmental standards

By Zoning Score, as defined above.

EXAMPLES OF EMBODIMENTS OF THE INVENTION

Example 1

A business owner wants to open up a clothing store in an area and is considering a few cities but doesn't know which zoning allows for "retail—women's apparel". By using Zonability's technology, the user would enter the search for "retail" in the primary field, "women's apparel" or "dress store" in the secondary field to find a printout of zoning codes in a specified city or county that matches those uses requested.

Example 2

A user could use this invention to see uses by category such as "at work" and opt to select a zoning code or not. Either a single city or multiple cities can be selected. Example 2a. shows if the user specifies a zoning code and a specific city.
  2a. Uses "At Work"—for specified zoning (C2) in (San Francisco)
    Office—yes
    Medical office—no
    Manufacturing—no
  2b. Zoning Codes for Uses "At Work" for specified city/county (San Francisco) but does not specify a zoning code so all "at work" uses will return.
    C2—office, bank, insurance agency
    M1—office, school, manufacturing, auto repair
    C3—medical office
  Zonability offers a reverse directory concept so a user can look up by the end result desired or by code. This is the logic and an example for "Uses"
    At home—housing, pet related (boarding), child related (day care facilities), religious, boarding homes, accessory buildings
    At work—office, schools, manufacturing, medical offices, bank, insurance agency, police, private school, Laundromats, auto repair
    At play—restaurants, retailers, entertainment, gyms, museums, parks, media, café, clubs, hotels, produce market, personal care
    At gov—this is the catch all category for such government buildings, institutions, parks, Rotary club, hospitals
  Some uses that cross between the 4 or so categories can be classified in two of the three. A park may be "at play" or "atgov".
  Regarding "Size", this invention allows users to look up information either by floor area ratio (FAR), minimum lot size, or number of stories.
    Reverse directory concept—example for "Size"
    Users select the City and/or County.
    Then, the user selects "Size" choice to search for specific data with pull down menu to select ranges sought for one of the three:
      Floor area ratio (FAR)—pull down options with data range (1.0 and less, 1.0 to 2.0, 3.0 to 4.0, 4.0+)
      Minimum lot size—pull down options with data range (2,000 sf and smaller, 2,001 to 4,000 sf, 4,001 to 6,000 sf).
      Maximum number of stories—pull down options (1, 2, 3, 5 and under, 5 to 10, 10+)
    The database shows the zoning classification that meets the criteria that matches. So, if a user wants to know what zoning allows for a high FAR, they might select the range (4.0+) and the result would show the corresponding zoning classifications that allow for FAR of 4.0+.

Example 3

City—San Francisco
Size Choice—FAR and 4.0+
Results:
RC-4
C-2-1
C-3-0
C-3-R
Other Look Ups:
By Code: Logic/Example
Zonability has taken zoning code information by assigned zoning classification (by the jurisdiction) and created a user friendly summary of the pertinent data based on the notion of satisfying the more common zoning needs.

Example 4

A user could get an aggregation of data regarding a particular zoning in the form of a widget. The zoning code, abbreviation, definition, a set of rules regarding development standards and lists of approved uses as well as conditional uses. The invention takes that zoning information that is shown on line and refers to multiple sections within the Code to show Size and Use information in a summary format and following the same concept of layperson language.

Example 5

This invention allows prominent sections of other municipal ordinance such ordinances as the "Green Ordinance". The data is taken from the ordinance and allows for data retrieval—Chart 1 shows a synopsis of the data collected. Users can ask "what properties are impacted by the Green Ordinance". Answer: New construction, some remodels. Or, how many points are required for 4-plexes? Answer: 50 for this year.

CHART 1

| Mkt | By type | By project | Points by 2010 | Points by 2011 | Points by 2012 | Storm water mgmt? |
|---|---|---|---|---|---|---|
| San Francisco | 4 units and less | New, some remodels | 50 | 50 | 75 | Yes |
| San Francisco | 5+ units and/or mid-rises | New, some remodels | 50 | 50 | 75 | Yes |
| San Francisco | 5+ units and/or high-rises (75+ feet) | New, some remodels | LEED Silver | LEED Silver | LEED Silver | Yes |

Example 6

A user could get an aggregation of data regarding zoning. The zoning code, abbreviation, definition, a set of rules regarding development standards and lists of uses with permissions.

CHART 2

| List of animals - SF County | Ok in R-zones? | Is a local license required? | Dept. | Qty. limits | Other requirements 1 | Other requirements 2 |
|---|---|---|---|---|---|---|
| Horses | | Yes | Dept. of Public Health | 1 | Stable is required | Neighbor input considered. |
| Cattle | No | | | | | |
| Sheep | | Yes | | 1 | Stable is required | Neighbor input considered. |
| Goat | | Yes | Dept. of Public Health | 2 | Stable is required | Neighbor input considered. |
| Poultry | | Yes | | | "4" is the maximum number of animals (dogs, rabbits, cats, chickens, gerbils). | Must keep in coops or enclosures - 20-foot requirement from residence. |

By A Specific Address: Logic/Example

An address can be requested for a zoning look up. This is an extra step to the basic invention but data providers exist that links addresses to zoning classifications. The same steps outlined in "By Code" are done. Please see steps outlined in this Look Up.

See FIG. 6 Shows sample report with method to compare a particular property's check for conformity—this relies on using a public record source namely GIS, a widely recognized source for providing information like this and is often times open to the public to use in software applications.

Other Look Up & Data Retrieval Options
Parking to Find Ratio of Required Parking:
By zoning classification or code
By such words as "none"
By specified ranges
Download option/report option
Signage to Find Rules by Asking to Retrieve Information:
By zoning classification or code
By use
By size (specify range that includes billboards)
Zoning Download option/report option
Zoning in Transition—By Product is a "Watch List"
"Uses" no longer approved (by city/county, by use, by zoning classification)
"Uses" recently approved (by city/county, by use, by zoning classification)
"Uses" moved to "special permission" category (by city/county, by use, by zoning classification)
Down zoned properties—list by address
Rezoning—list by address
Proposals to change policy within zoning code
Carbon Trading Impacts Embedded in Zoning
Uses no longer approved (by city/county, by use, by zoning classification)
Uses recently approved (by city/county, by use, by zoning classification)
Uses moved to "special permission" category (by city/county, by use, by zoning classification)
New requirements in process for obtaining use permits
New requirements for buildings to meet compliancy standards (this includes meeting Green Ordinance standards).
Ability to model hypothetical changes to a property using Green Ordinance guidelines and recalculate its carbon impacts.

Market vs. Property energy use (gas, electric, water) as well as calculated output based on size characteristics and market benchmarks.

Ability to know the percentage of properties within a zoning code that exceed limits set for emissions.

Zoning Impacts—Peeling Away Layers of Data Available on a Per Parcel Basis:
Historic significance
Variances Zoning as a Consumer Protection Issues—a Disclosure Given the weight of zoning on property rights, potential property buyers may want a formal disclosure to be issued at the time of purchase.

Pre-Zoning Notification—Overview of the Process:

A property owner wants to change something that will impact the property's appearance and/or use. The zoning process requires public notification in order to gather outside feedback and weigh what is being requested to what has already been approved in the past under similar conditions.

Using this invention, property owners can create their own notification to let those within a specified distance know about potential plans to alter a property and to gather feedback as well as attempt to generate some consensus building.

Posting photos of similar projects, uploading conceptual drawings/plans, showing analysis for how the plan works with the current zoning—essentially providing a way to explore the natural process that already happens when submitting a plan requiring public approval on a small scale.

The present invention overcomes shortfalls in the known related art by presenting unobvious and unique methods of breaking down zoning code information that is written in either a sentence structure, table format that references other sections of the code and creating individual fields of the data. By breaking down the data, this allows each piece to be viewed individually and allows for users to retrieve specific information as well as it allows for the grouping of data.

This invention also allows for the export of the data in either a printed report format (PDF) and/or a spreadsheet (.cvs) format.

Side-by-side comparison of zoning—this would allow users to see what are the differences between various zoning codes and/or properties.

Measuring the zoning code's flexibility can add insight into the value of a property's location.

Providing a Zoning Score gives context to the way a property property's conformity or non-conformity Linking an address with a code and providing a calculation to see where the property conforms or not. This relies on a data such as GIS.

Combining the zoning ordinance data with other related data including carbon trade requirements, a building code issue, whether generated through automation or input by user can deliver a more robust and complete picture of a property's liability as it relates to some government controls.

Segmenting relevant CC&R data for a specific building, complex or master-planned community allows for easy data retrieval regarding rules and financial issues included in the CC&Rs such as a) pet policy b) process to make changes to a unit c) hours of operation d) financial health of the Association e) inclusion of expenses in the dues. Other relevant issues that apply to a broad audience of existing owners and potential buyers could be included in this list.

One of the main advantages of this invention is that is makes something currently obtuse to a layperson practical and "user friendly". The rating and scoring system put a measurement to a process or concept that currently doesn't have one currently, adding to the user's comprehension.

In another embodiment of the disclosed invention, multiple agency and/or department data sets are fused with segmenting the zoning ordinance data into a database to allow for a user to understand the layers of regulation applicable to the parcel or parcels. When displayed on an electronic map, color coded options can be added to make distictions about the districts readily visible. The user is able to identify a property and/or location with a zoning district or districts and additional property information.

When using the interface associated with the database, the user is able to retrieve information about a zoning district as associated with parcels within the district. This replaces the need to associate the layers of regulations in addition to the zoning ordinance for simple search and retrieval needs. It provides for a self-service tool useful to government departments, private planners, real estate professionals, economic developers.

In another embodiment of the disclosed invention, site selection become automated by the use of paired segmented zoning ordinance data with geo-spatial zoning data and property data to find locations suiting a user's needs comprising:

Use of the site with permissions as regulated by the zoning and/or land use development codes;

Development potential for the parcel as regulated by the zoning and/or land use development codes;

Property record data for the parcel or parcels identified.

In yet another embodiment of the disclosed invention, a user is able to run hypothetical scenarios to better understand the impacts of zoning actions on proposed developments for a specific property and/or area and/or district comprising:

Rezoning, Change of use, Change of development standard

EXAMPLES OF EMBODIMENTS OF THE INVENTION

Example A, a prospective buyer is interested in a property and wants to know the zoning using a mobile device. The invention includes a map to use for search which allows the user to either get geo-located or use the menu to enter and address and/or property identification number from the assessor to locate the property. Once located, the user is able to visual see the zoning associated with the location comprising district abbreviation(s) and/or name(s) and/or descriptor(s) with property data comprising the improvements, ownership, existing use, year built. Color coding the map provides more context to the user relative to a zoning descriptor and/or policy and/or control and/or status.

Example B, a business owner wants to find a new location that meets the business' need for a restaurant. The ideal location is along a well-known street that extends between three municipalities. The invention allows for this type of search. First, the user identifies the use wanted which is restaurant. Next, the location is identified by drawing a polygon that includes the corridor containing parcels within three municipalities. The user can opt to run a search with this criteria or add other search variables comprising a) property traits such as a range for lot size, a range for existing building size, a range for year built; and/or b) rule traits such as potential building size, potential building height, potential number of units. The data retrieval associates the zoning controls allowing for a restaurant use with a property. The results can be returned and the user can iterate and/or filter by changing a search parameter. Results can be paired with location change indicator data. This provides more context about the locations retrieved and comprises demographics, permits, retail sales, transportation proximity, workforce accessibility.

Example C, an architect has a client asking about locations to allow for a three-story, 30,000 square foot medical office building in zip code 78704. The invention allows the architect to search for the proposed development parameters including a) potential building size b) potential building height and c) use. The results can be returned and the user can iterate and/or filter by changing a search parameter. Results matching the criteria are returned can be paired with location change indicator data. This provides more context about the locations retrieved and comprises demographics, permits, retail sales, transportation proximity, workforce accessibility.

Example D, a property owner receives a notice in the mail announcing the upcoming public hearing for a proposed rezoning of a property in the neighborhood located within 500 feet, the prescribed linear feet requiring notifications to property owners and renters. The notice includes an address, the existing zoning abbreviation and name as well as the proposed. It includes a description of the proposed development; however, the user wants to see a before and after snapshot and try to understand the implications should the rezoning be approved. The invention allows the user to run a search for the existing conditions. Then, it allows the user to run a search with hypothetical conditions in which the property is identified and the proposed zoning controls are applied. The data retrieval reflects the zoning impacts including calculations for potential development standards comprising building size, density and height and potential use permissions. The data can be paired with zoning permit and zoning case data to provide additional context as to the uniqueness and outcomes from similar zoning actions.

Example E, an investor has narrowed down the options for an upcoming purchase to two properties and wants to understand the development potential. By using the invention, the structuring data including zoning and land use development code data with logic provide a reasonable idea of each property's development potential and use without having to undergo a feasibility analysis. Adding a proforma reflecting the property potential, allows the user to run a financial analysis on the "as if" built then deduct an estimate for construction costs to get to an "as is" property value indication.

Example F, a realtor has a prospective seller and is doing research to use as part of the listing proposal. The invention allows for looking up a property to understand its development potential and use. In this case, the property is improved with an older home in an area transitioning to a demographic wanting more compact homes. After entering a search criteria to identify the property, the invention generates a report with the structure zoning controls returning several types of residential uses shown as likely permitted including patio homes, attached townhouses and residential condominium. The development potential uses the zoning control for maximum height to return a 4-story building. The report also generates answers for neighboring properties. With this information, the realtor is able to see the subject property has an advantage over an existing listing down the block which limits the types of residential to detached house or duplex and only allows 2-story buildings.

Example G, a site locator is looking for a new location for an expanding chain of bars. The use "bar" is one regulated at the State level in order to obtain a liquor sales license permit. The requirements, per the local zoning ordinance, mimic the State level's requirement that no new bar establishment be located within 1000 feet of an existing school or church. The invention is able to model the zoning compatibility using logic that retrieves only records for properties that allow the use "bar" and are not located within 1000 feet of an existing school or church. This functionality can be expanded to include other uses and reversed to allow a user to identify locations of what they perceive as "incompatible" uses within a specified distance from an identified starting location. These could reflect existing and/or potential uses.

Example H, a prospective homebuyer wants to understand the location of the home and thinks it is wise to check for zoning and/or land-use development controls to see if the area is uniformly regulated by zoning and/or land use development controls. The applications saves the user from having to go to multiple agency websites to look up the same location to see which regulations apply to the property and its location within, or not, the city boundary.

Example I, a site consultant is hired to look into the economic feasibility for a proposed Target store and is interested in building an analysis that includes the future zoning plans for the area to better understand the long term economic potential for developing in the proposed location.

Step 1. The user identifies the type of search from a menu, or types a search or clicks on an image to express "future planning"

Step 2. The user identifies the location for a property search with options comprising allowing the user to get geo-located or enter an address or addresses and/or property identification number(s) from the assessor to locate the property. Once located, the user is able continue with search.

Step 3. The user selects what area to include in the assessment of "future planning" and is able to draw a polygon, enter addresses and/or property identification numbers assigned by the assessor's office or specify a buffer of "x" feet or miles.

Step 4. Data retrieval includes the development potential for the identified properties and identifies future land use with the option to map outputs color coded by future land use Automated Site Selection—Example J A business owner is interested in finding a new location and would prefer to know all potential locations for the use, which is "hotel," in one of 3 cities with the criteria being a 100,000 to 150,000 square foot building to re-purpose.

Step 1. The user identifies the use for "hotel."

Step 2. The user identifies the locations of interest by identifying the jurisdiction names from a list or clicking a map.

Step 3 A search box allows the user to identify the parameters for the search for physical property traits reflecting the 100,000 to 150,000 square foot building size.

Step 4. Data retrieval shows locations matching search criteria with property specific information comprising the property data, zoning, the use requested "hotel" and the permission for all 100,000 to 150,000 square foot buildings in the 3 cities requested.

10. Automated Site Selection—Example K

An architect wants to build a custom home for his client with the requirements it be located in zip code 78704 and a lot of at least 2 acres to ensure room for either a swimming pool or tennis court.

Step 1. The user identifies the use "single-family home".

Step 2. The user identifies the location, zip code 78704.

Step 3. The user identifies the search parameters to include the lot size parameter of 2 or more acres.

Step 4. Data retrieval shows locations matching the parameters for the search for properties in 78704 with at least 2 acres allowing the use "single-family home."

Example L, a planner wants to get existing conditions for a study area, which is something done as a step to assess a location before making policy changes and/or a zoning process decision.

Step 1. The user identifies the type of search from a menu, or types a search or clicks an image to express "existing conditions"

Step 2. The user identifies the location for an area with options comprising zip code, neighborhood, draw a polygon, enter in property identification number(s) from the assessor, and/or enter in address(es) or specify a buffer of "x" feet or miles from an identified property.

Step 3. Data retrieval shows existing conditions for the parcels identified comprising number of lots, median lot size, median building age, ownership type, ownership length, zoning districts.

Example M, "What If?" Zoning—Example 1

A hypothetical scenario testing in which user can search and retrieve differences between two zoning districts as relates to an identified property. A student wants to know the difference between MF-3 and MF-6 zoning as it might apply to a vacant lot.

Step 1. The user identifies the type of search from a menu, or types a search or clicks an image to express "district-to-district"

Step 2. The user identifies the jurisdiction

Step 3. The user identifies the two zoning districts from a menu of all zoning districts in the specified jurisdiction.

Step 4. Data retrieval shows the district descriptors and controls comprising name, abbreviation, development standards and uses as they apply to the identified property which include a calculated development building potential and uses specific to that location.

Example N, "What If?" Zoning—Example 2

A hypothetical scenario testing in which user can search and retrieve impacts on a specified property by changing a physical attribute. A developer wants to know what would be the impact on the property's zoning controls if the lot were 10,000 square feet.

Step 1. The user identifies the type of search from a menu, or types a search or clicks on an image to express "hypothetical—property"

Step 2. The user identifies the location for a property search with options comprising allowing the user to get geo-located or enter an address(ed) and/or property identification number(s) from the assessor to locate the property. Once located, the user is able continue with search.

Step 3. The user is asked to select which property attribute to change. In this case, the user identifies "lot size" from a menu.

Step 4. The user is then asked what size lot to run the analysis on and the user enters the hypothetical size.

Step 5. Data retrieval shows the impact on development potential and use if the lot were 10,000 square feet.

Example O, "What If?" Zoning—Example 3

A hypothetical scenario testing in which user can apply a change in a development standard for a specified area in order to obtain retrieve the results for the maximum building size potential for the identified properties in the identified area. A planning commissioner wants to know what would be the impact on maximum potential building size if the commissioners approved an overlay zoning district to change the height maximum from 2 stories to 4 to an area.

Step 1. The user identifies the type of search from a menu, or types a search or clicks on an image to express hypothetical change.

Step 2. The user identifies the location for an area with options comprising zip code, neighborhood, draw a polygon, enter in property identification number(s) from the assessor, and/or enter in address(es) or specify a buffer of "x" feet or miles from an identified property.

Step 3. The user identifies the hypothetical change by selecting from a drop down menu, choosing an image, or typing, changing the development standard "height".

Step 4. The value of the development standard is added, 4 stories.

Step 5. Data retrieval includes existing conditions and the development potential for the identified properties using the current 2-story maximum and the 4-story maximum which reflects calculations for potential maximum building size.

Example P, Hypothetical scenario testing in which user can retrieve information about future zoning plans for a specified area. A site consultant is hired to look into the economic feasibility for a proposed Target store and is interested in building an analysis that includes the future zoning plans for the area to better understand the long term economic potential for developing in the proposed location.

Step 1. The user identifies the type of search from a menu, or types a search or clicks on an image to express "future planning"

Step 2. The user identifies the location for a property search with options comprising allowing the user to get geo-located or enter an address(ed) and/or property identification number(s) from the assessor to locate the property. Once located, the user is able continue with search.

Step 3. The user selects what area to include in the assessment of "future planning" and is able to draw a polygon, enter addresses and/or property identification numbers assigned by the assessor's office or specify a buffer of "x" feet or miles.

Step 4. Data retrieval includes the development potential for the identified properties and identifies future land use with the option to map outputs color coded by future land use.

Unexpected results include:

Additional search engine criteria to be used to find property

Interactive Zoning Map

Auto-generation of Letters of Verification

Economic Development Department tool to match "use" with available space

Infill Housing

Zoning Flexibility Rating

Zoning Score

Carbon footprint tie-in with Green Ordinance

Covenants, Conditions and Restrictions (CC&R) data retrieval

Zoning Index—standardized access to zoning codes over a myriad of local governments Multi-sourced regulations impacting a parcel or parcels Zoning district data organization by segmented data Site selection for a use with permission as per local zoning for one or more jurisdictions Hypothetical scenario testing district, property, use permission and/or development standard changes Compatibility for select uses requiring distance-to, adjacency Auto generated planning capacity Infill development opportunity finder Allowing users to read, write and edit data to allow for crowd sourced data capture and maintenance including sharing knowledge about specific properties and/or districts and/or uses and/or zoning controls and/or CC&R documents and/or private deed restrictions.

Providing search and retrieval requirements for subdividing property, design elements, soils condition, build-able lot, infill development, parking and signage.

Associating water-related management with zoning and land-use development controls.

Associating carbon tax credit requirements in the event they are regulated by a use and/or locations regulated by the local zoning.

Progress, monitoring and enforcement of policy created through zoning.

Monitoring of individual properties, groups of properties for changes in development controls with financial impacts.

Question/Answer search and retrieval for wide range of property development and use-related questions.

Conversions of data to metric system and applying language translations in order to make the outputs relevant to people with different preferences.

Associations of metrics with zoning controls that translate the potential building size and/or units to economic and/or demographic indicators. Examples include a) number of people per apartment type b) retail sales for a use such as a fast food restaurant c) number of jobs per square foot of a research and development facility.

Associations of new trends in real estate development relative to the zoning ordinance to create search by "new trends" which can cover a wide range of topics about lifestyle, energy, transportation and urban environments.

Transit oriented development (TOD) automation in which the center for the plan is used as the basis for search to monitor inventory of available parcels and buildings per the TOD classification system consisting of the concentric circles surrounding the station.

Transect zoning automation in which the area search provides details about the existing conditions which can be paired with the "rural-urban" categorization system which covers 6 zones.

Creating the basis from which a pro forma for a development using outputs from the invention can be incorporated with the objective of associating a potential property value to the property's utility, an important need for investors.

Additional search to include potential for area change using location change indicator data, property data and structured future planning data.

Additional search to include policy zoning descriptors to align lifestyle fit with properties being retrieved.

Creating land value estimates using hypothetical search and retrieval since the property's utility coupled with economic conditions creates an "as if" built potential from which a hypothetical cost of construction and sales price can be deducted to represent a land residual value.

Assessor valuations using mass appraisals can use the technology to better understand the utility the zoning affords the properties.

Monitoring community sentiment about specific properties in their community that could be candidates for redevelopment or development, building types they support or not, businesses they support or not, zoning policy such as preservation, design etc. they support or not.

2-to-3-way communication with the consumer and experts, with option to add 3rd, government agencies, to learn more about the potential to change a property or area and/or gain and connect with local technical expertise.

Pre-development submittals are used by larger scale projects and allow experts to meet with a municipality before submitting a project to gain more insight into what their chances are of the project getting approved and/or to obtain zoning process expertise. This invention could allow for predevelopment submittals for any scale project to be uploaded to the application and shared to get peer consumer and/or expert feedback. The application is able to track data such as published pre-development submittal meetings as part of the zoning process module. Municipalities often publish the parties who have come to the municipality seeking pre-development services in order to provide transparency. The information published comprises names, addresses and/or locations, proposed use, timing and proposed building size.

Identifying properties with development incentives including being able to build in excess of the zoning, pay less tax or obtain favorable financing. Examples include: affordable housing bonus densities, locations within enterprise zone, and properties within transit-oriented development zones that qualify for favorable federal financing to purchase and develop in such districts.

Establishing where in the market a neighborhood is relative to the market cycle (revitalization, growth, maturity, decline) using data analytics from location change indicator data paired with character area. Information such as this is helpful when making policy or investment decisions.

Detecting risk associated with zoning and non conforming uses and/or buildings for purposes of properly insuring, planning and notifying interested parties.

National database of zoning district abbreviations, name, municipality, zoning policy goal and/or descriptor.

National database of zoning district uses with association to user-friendly display names and/or investment categories.

National database of Planned Developments with reverse engineered data about what got developed.

National database of zoning actions comprising location, type of zoning action, date, result with reverse engineered data about the property's existing condition.

National database of chain store real estate requirements comprising lot size, building size, building footprint, demographics.

National database of approved affordable housing projects with reverse engineered data about what got developed.

Predicative analytics for measuring the pace of change for a specified area and/or jurisdiction and/or region using the zoning process data with changes, by date, in building inventory as captured by invention with the type and use of building, size, height with demographics and/or location change indicator data.

Algorithms for property tax assessments using the basis of the amount of inventory non-taxable relative to the changes in demographics, zoning and building permits.

Virtual zoning charettes tool in which participants can interact with data to understand existing conditions relative to hypothetical or proposed changes and express an opinion.

Districts for other subject areas with real estate impacts including forest or wilderness plans, parks, fire, even zoning for the ocean is being discussed. As long as there identifiable districts associated with a place that ties a place to a regulated use and/or development, this invention can work.

Adaptive reuse tool that identifies similar "before" situations and solutions applied. An example might be a mall that was re-adapted for a use as a community center with associated retail services.

The creation of a checklist for experts to contact regarding how to achieve the development potential for a property and a way to communicate using the application to manage the pre-feasibility process.

Providing information about development potential in the ExtraTerritorial Jurisdiction (ETJ) comprising subdividing, utilities, restrictions and new developments with reverse engineered development standards to provide a sense of building mass and/or use(s) in the ETJ.

Monitoring, Communicating, Searching, Data layering

1. Zoning Flexibility Rating: the creation of a standardization system for rating zoning flexibility based multiple layers of data.

Steps Necessary to Create a Zoning Flexibility Rating

Step 1: Prominence of zoning code in particular market

Step 2: Number of uses permitted by a particular zoning code

Step 3: Number of uses requiring a conditional use permit

Step 4: Size related rules with an emphasis on density and FAR

Step 5: Exclusions and exemptions based, in part, on the number of other sections within the code referenced.

Step 6: Parking requirements

Step 7: Design review requirements

Step 8: Rebuilding options in case of destruction

Step 9: Bonus densities

Step 10: Energy related controls through such options as a "Green Building Ordinances" and/or reporting requirements for energy use, used for carbon footprint calculations.

Step 11: Moratorium uses/encouraged uses

Objectives: A Zoning Flexibility Score provides a way to measure scarcity for an existing stock of buildings as well as to project future opportunity based on the zoning for vacant land.

2. Zoning Score: creating of a score to indicate what a property's zoning is relative to the existing (or planned) project.

Steps Necessary to Create a Zoning Score

Step 1: Set of development standard rules for a particular zoning code

Step 2: List of uses permitted for a particular zoning code

Step 3: Size characteristics with an emphasis on lot size, building height, project density and overall size (floor area ratio—FAR).

Step 4: Other physical traits including year built, last remodel, parking and construction type.

Objectives: A Zoning Score provides a 0 to 100 score articulating the degree to which a property appears to be conforming to the existing zoning code rules as well as provides for upside potential, which would be the case for a small house on a large lot that could (per the zoning code) be theoretically 50% larger in size. It also measures the downside risk, an example might be a four-plex in a zoned area for only single family homes.

The formula:

Each development standard from the local zoning code is procured.

The initial set of calculation is to measure the public record data with the zoning code rule.

A determination is made if the property appears to meet the code requirement. For each market the data is set to allow for a margin of error. An example is lot width. The zoning code might specify 25 feet. The margin for error may be set, for this variable, to be within 3 feet based on the market's averages.

For properties that appear to be undersized, the results show "room for potential expansion". However, this invention models the intent of the zoning rules. For instance, if a property is only one-story while the maximum height for that zoning allows for a two-story structure but the building size exceeds the amount allowed then this invention will show results similar to "this property appears to be at its maximum size based on its square footage."

Other examples might be for a property with adequate attributes that appear to meet the development lot standards except for parking. In such an instance, this invention will show results "property appears to be conforming except for the parking requirement."

The following charts (Charts 3-5) show the sequence of how data is used for the Zoning Score, a key part of this invention. Based on the development standards criteria such as lot size, width etc. each variable is weighted. This weight is developed from a) availability of public data b) importance by market.

The User Zoning Score includes data added by the user. This invention includes the preset calculation functions to measure the likelihood the property conforms or doesn't and potential upside potential as well (expansion potential) and downside risk (signaling overbuilt conditions).

The 2nd column shows how the zoning ordinance evaluator rates that data by level of importance which is pre-set by market. The 3rd column is used for the user-generated Zoning Score and reflects the rating system, again by market, for each criteria.

CHART 3

| | Data point | Level of importance - Zoning Score | Level of importance - User Zoning Score |
|---|---|---|---|
| 1 | Minimum lot size | High | High |
| 2 | Minimum lot width | Moderate | High |
| 3 | Floor Area Ratio (FAR for short) | High | High |
| 4 | Density - lot size per Residential Unit (Equals Maximum # of Residential Units) | Moderate | Moderate |
| 5 | Setbacks - front | Low | Moderate |
| 6 | Setbacks - rear | Low | Moderate |
| 7 | Setbacks - side 1 | Low | Moderate |
| 8 | Setbacks - side 2 | Low | Moderate |
| 9 | Open space | Low | Moderate |
| 10 | Height in Feet | Moderate/Low | Moderate |
| 11 | Parking | Moderate/High | High |

Chart 4 shows how the programming assigns a "true" for meets zoning rule or "false". It also shows the flexibility within the pre-set calculations for variables such as lot size which the user can override, meaning edit for the user generated Zoning Score.

CHART 4

| | Data | RULE per zoning: Conforming lot size | ASSESSOR DATA: Lot size in sf (user can override size) | OUTCOME | RULE per zoning: Conforming lot width | ASSESSOR DATA: Lot width (user can over ride and/or GIS) |
|---|---|---|---|---|---|---|
| | | 5000 Formula: RULE = or > than Assessor size | 4500 | TRUE | 25 Formula: RULE => than Assessor Lot Width | 25 |
| Minimum lot size | 5000 | OUTCOME TRUE | | | | |
| Floor Area Ratio (FAR) | 1.8 | | | | | |
| Density lot size (sf)/unit | 500 | | | | | |
| Setback - front | 10 | | | | | |
| Setback - rear | 25 | | | | | |

CHART 4-continued

| Setback - side | 0 | |
|---|---|---|
| Parking/unit | 2 | |
| Minimum lot width | 25 | TRUE |
| Max height in stories | 3 | TRUE |
| Minimum lot size | | |

3. Carbon footprint tie-in with Green Ordinance

The adoption of Green Ordinances by communities is like any other zoning ordinance in terms of its control and directing for how people use their properties. Each community's Green Ordinance can have different sets of regulations that give local government controls. Using the same data retrieval methodology regarding zoning codes, a user can find out when, where and how the Green Ordinance impacts a property.

Furthermore, benchmarks set by a community can be included in the data to acts as a comparison for a specified property's current energy performance. Given the invention's design to pre-set calculations using the local Green Ordinance, users can run scenarios showing how improvements in energy efficiency change the property's carbon footprint.

4. CC&Rs Data Retrieval

Every condo unit, townhouse or restricted property such as those found in senior master-planned communities have an additional set of rules and regulations. While the local zoning ordinance supersedes the CC&Rs, knowing the rules within the CC&R document is important for maintaining a harmonious and well-functioning community.

This invention uses a similar technique outlined for data retrieval. The emphasis is breaking down the CC&R document so that users can easily do look ups regarding such things as owning pets, what can go on the balcony, window coverings, hours for construction, what is included in the Association dues, financial health of the Association, next Association meeting and current leaders' contact information.

5. Zoning Index—Standardized access to zoning codes over a myriad of local governments This invention allows for analysis of zoning codes from different local governments—those within close proximity, similar in population, location etc. The ability to perform this kind of analysis warrants the creation of an Index, one that measures current, historical and projected performance. Questions that can be answered include: What do the local government's most popular zoning indicate? Stability. Consistency. Transparency. Exemptions. Restrictions.

6. Monitoring, Communicating, Searching, Data layering

This invention allows for monitoring of both a local zoning code as well as by specific property.

It opens the channel for communicating between citizens and government agencies using the API, a bi-product of this invention, or through a customer relation manager using pre-programmed questions.

Searching for properties by a specified "use" as found in a zoning code ordinance is unique.

Data layering reflects adding other sources of geo-coded data to further enhance what is allowed, restricted or being decided as well as inquires received regarding a property's zoning (these could be variances denied or approved, proposed uses or changes, previous zoning or restrictions.)

7. Multi-Source Data Consolidation—allows for one-stop review of data to get initial property characteristics with development controls.

Data pertaining to zoning, land-use development and property record data is created and maintained by multiple departments and/or agencies. By consolidating the data into one database, associating a district to a classification that displays on an electronic map and/or descriptor, it is possible to automatically identify the controls as it relates to a parcel and also see property data information simultaneously.

Steps Necessary to Create a Multi-Sourced Data Record

Step 1. The spatial data from the various agencies is gathered, standardized and imported into a database. The data comprises zoning (base and overlay), lots and parcels, planning areas, city and/or county boundaries, flood zone, enterprise zones, historic district boundaries, watershed and/or creeks, transportation data and future land use.

Step 2. The property record data comprising information about the property's improvements, ownership, existing use is imported from the county level agency, the assessor's office.

Step 3. Data is transferred or imported into database comprising district abbreviation, district name, descriptor and/or agency.

Step 4. An interface allows access to run queries with data returns being an electronic map, a report, API and/or data.

8. Automated Study Area—allows for existing conditions regarding real property to be gathered for analysis and use prior to making proposed changes to zoning policy and/or before presenting a proposed project to a group of experts. It is designed to help the user make an informed decision about what development might be needed for a location and why.

Steps Necessary to Create an Automated Study Area

Step 1. The spatial data from the various agencies is gathered, standardized and imported into a database. The data comprises zoning (base and overlay), lots and parcels, city and/or county boundaries, flood zone, enterprise zones, historic district boundaries, watershed and/or creeks, transportation data and future land use.

Step 2. The property record data is imported from the county level agency, the assessor's office.

Step 3. Data associated with changes for a location comprising demographics, neighborhood boundaries, zoning permits, zoning cases, building permits, retail sales, real estate sales is imported into a database.

Step 4. An interface allows access to run queries with data returns being an electronic map, a report, API and/or data.

9. Automated Site Selection—ability to find locations for businesses and/or development types using the combined structured data with zoning controls and logic articulating requirements for uses with permissions and development standards data that can be used to calculate potential building size and height (building mass) with the property record data. In effect, the user starts with the answer they want to achieve and ask the application to find location suitable for their request using structured zoning and property data.

Steps Necessary to Create Automated Site Selection Data Retrieval

Step 1. Importing geographical information system spatial data into a database comprising lots and parcels, zoning for base and overlay districts, city and/or county boundaries, special planning areas, watersheds, transportation plans in order to associate current zoning and/or land-use development controls on one or more parcels;

Step 2. Importing or transferring zoning controls into database to segment the data comprising district development standards related to individual zoning district basis into a database comprising of lot size and dimensions, floor area ratio, density of units, height requirements, yards or setbacks, parking;

Step 3. Importing or transferring regulated uses with permissions for individual zoning districts into a database comprising identified uses associating each with a permission as identified by the specific zoning district within the jurisdiction such as "permitted" "conditional" and "prohibited";

Step 4. Importing data for real property into a database;

Step 5. Standardizing the data and applying business logic to ensure the data returns for development potential and use permissions reflects the hierarchy of the multiple layers of regulations on a property to allow for the district with the controlling power to determine building mass and/or use to reflect in data returns;

Step 6. Data returns are based on the search query regarding site selection with the options being either a use such as a business and/or building type or a desired building size with search parameters allowing for the user to identify a range of lot sizes and/or existing building sizes and/or year built and/or existing use(s). The concept is the data is structured and can be used for a search with the end result in mind rather than starting with a specific location.

Step 7. The user must identify the location for the search which can expand over more than one jurisdiction and can be identified by drawing on a map, which is applicable for corridors spanning over multiple jurisdictions and/or by zip code and/or within radius of specified location.

Step 8. An interface allows access to run queries with data returns being an electronic map, a report, API and/or data.

10. Zoning Compatibility—The rules for zoning include details for protecting certain uses such as residential, schools and churches and/or uses that generate traffic which surpass the baseline zoning regulations for use permissions and development standards with the exception of entertainment districts. The invention allows for the structuring of rules to reflect such conditions and then uses spatial data and data for locations of select uses to provide location suitability by addressing zoning compatibility. This could also be reversed to include uses that people may perceive to be problematic such as check cashing, pawn shops and adult entertainment which, if they were located prior to the development of a church and/or school, are allowed to continue to run their businesses.

Steps Necessary to Create Zoning Compatibility Logic

Step 1. Importing geographical information system spatial data into a database comprising street type, traffic counts, entertainment districts, desired development zones, redevelopment area.

Step 2. Importing data to identify protected uses and/or areas associated with compatibility comprising schools, churches, residential neighborhoods. Within the database, associate the uses with a classification code to articulate "protected use" and those uses that "cause protection check" namely gas stations, drive-through services, liquor stores, bars.

Step 3. Transferring rules expressing compatibility requirements comprising buffer areas, distance-to rules, adjacency use, nearby uses, adjacency zoning district(s), street type by identifying zoning districts and/or planning areas into structured database with IF/THEN statements articulating conditions. The following explains the details:

i) Retrieved results for a query are identified to which the compatibility scan is to be applied.

ii) Each result has a parcel boundary from which a distance-to buffer can be run. The distance to requirement is programmed.

iii) Logic written in the form of a IF/THEN statement such as IF "protected use" is within "x" feet from the parcel boundary THEN return the result TRUE/FALSE.

Step 4. Applying zoning compatibility logic allows user to opt to remove

10. "What If?" Zoning address hypothetical scenario testing—Given the number of rezoning cases, amendments to rules controlling development standards and/or uses and the creation of new districts, it is important to test the potential outcomes. The application, through structured zoning and property data, is able to let the user see the outcomes when the a different zoning district is applied to the same property, or a use permission is changed which could impact the property's development potential or changing one or more of the development standards which could impact the building size, use or both.

Steps Necessary to Create Automated Hypothetical testing

Step 1. Importing geographical information system spatial data into a database comprising lots and parcels, zoning for base and overlay districts, city and/or county boundaries, special planning areas, watersheds, transportation plans in order to associate current zoning and/or land-use development controls on one or more parcels;

Step 2. Automatically obtaining data for real property and importing the data into a database;

Step 3. Importing or transferring zoning controls into database comprising district development standards related to individual zoning district basis into a database comprising of lot size and dimensions, floor area ratio, density of units, height requirements, yards or setbacks, parking Step 4. Importing or transferring permissions about uses related to individual zoning districts into a database comprising of the list of identified business uses, building types, activities and associating each with a permission as identified by the specific zoning district within the jurisdiction such as "permitted" "conditional" and "prohibited";

Step 5. An interface allows access to run a hypothetical query which entails selecting a hypothetical zoning action comprising rezoning, changing a use permission, changing a development standard.

Step 6. The user selects one or more variables to test outcomes based on the hypothetical situation comprising a zoning district, a permission for a use, a value for specified development standard;

Step 7. Retrieving data pertaining to search criteria the retrieved data to include a comparison of existing zoning controls, for the one or more properties identified in the search, to outcomes for the hypothetical scenario in regard to reflect how the property (or properties) might be developed and/or used by running calculations; and Step 8. Creating an output comprising data, API, report, visual display of data returns on electronic map.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not only the systems described herein. The various embodiments described herein can be combined to provide further embodiments. These and other changes can be made to the invention in light of the detailed description.

All the above references and U.S. patents and applications are incorporated herein by reference. Aspects of the invention can be modified, if necessary, to employ the systems, functions and concepts of the various patents and applications described above to provide yet further embodiments of the invention.

These and other changes can be made to the invention in light of the above detailed description. In general, the terms used in the following claims, should not be construed to limit the invention to the specific embodiments disclosed in the specification, unless the above detailed description explicitly defines such terms. Accordingly, the actual scope of the invention encompasses the disclosed embodiments and all equivalent ways of practicing or implementing the invention under the claims.

While certain aspects of the invention are presented below in certain claim forms, the inventors contemplate the various aspects of the invention in any number of claim forms.

ITEMS

The invention includes, but is not limited to various items as described herein.

Item 1. A method of transforming data to create a zoning score, the method comprising:
a) producing a zoning score having a value between 0 and 100 with the value reporting the amount to which a property:
i. appears to be conforming to zoning code rules;
ii. appears to possess upside potential, such as an increase in building size, less any downside risk, such as a four-plex property in an area zoned for a single family home only;
b) obtaining data for a property to be considered;
c) obtaining each development standard from each zoning code requirement affecting the property to be considered;
d) transforming each zoning code requirement to a user defined weight ranging from 0 to 100%;
e) creating a zoning score by multiplying each zoning code requirement by the user defined weight and a true (1) or false (0) outcome, with the outcome derived by comparing a zoning code requirement to the applicable characteristic of the property to be considered, with such characteristics comprising, minimum lot size, floor area ratio, density of lot, setback—front, setback-rear, setback-side, parking units, minimum lot width, maximum height of building in feet, maximum height of building in stories, and minimum lot size.

Item 2. A method of transforming real estate records to create a report of permitted land uses, the method comprising:
a. entering a search for a specific parcel of real property;
b. retrieving a zoning code abbreviation applicable to the specific parcel of real property;
c. transforming the zoning code abbreviation into a word phrase;
d. displaying the zoning code and word phrase;
e. retrieving data pertaining to the specific parcel of real property, the retrieved data to include, lot size, location, type of building, square footage of any building, pending projects, and proximity to a hazard, with the term hazard defined as a floodplain or moratorium use; and
f. comparing the retrieved zoning code to the retrieved data pertaining to the specific parcel of real property and creating a report displaying permitted uses for the specific parcel of real property.

Item 3. A method of transforming data to create a zoning flexibility rating, the method comprising the assignment and summation of positive or negative values to the following data elements:
a) prominence of zoning codes for a location being rated;
b) number of uses permitted within the location being rated;
c) size related rules with an emphasis on density and FAR;
d) exclusion and exemptions based, in part, upon the number other sections within a code referenced;
e) parking requirements;
f) design review requirements;
g) rebuilding options in the event of property destruction;
f) bonus densities;
g) energy related controls; and
h) moratorium uses and encouraged uses.

Item 4. A computer implemented method to automatically identify real property zoning and/or land-use development controls with property data for one or more parcels comprising the steps of:
a) importing geographical information system spatial data into a database including lots and parcels, city and/or county boundaries, zoning for base and/or overlay districts, and/or planning areas in order to associate zoning and/or land-use development controls on one or more parcels;
b) transferring or importing data for zoning districts and/or land-use development control document and/or planning documents into a database comprising district abbreviation, district name, descriptor and department and/or agency associated with the data;
c) automatically obtaining data for real property and importing the data into a database;
d) entering a search comprising one or more methods using keyboard, geo location function, images or map with desired search criteria comprising location, zoning district, planning area; district descriptor and/or agency;
e) retrieving data comprising development controls for a location, district name and/or abbreviation with property data for one or more properties in one or more jurisdictions; and
f) creating an output comprising electronic map, report, API.

Item 5. A computer implemented method of identifying existing conditions for a study area comprising the steps of:
a) importing or transferring data associated with changes for a location comprising demographics, neighborhood boundaries, zoning permits, zoning cases, building permits, retail sales, real estate sales into a database
b) entering a search by identifying the study area comprising drawing on a map, entering a zip code, entering locations; and
c) retrieving results comprising number of parcels, length of ownership, existing uses, age of buildings, demographics, assessed values Item 6. A computer implemented method to automatically identify real property locations based on development potential and/or use using structured data for real property zoning controls comprising the steps of:
a) importing geographical information system spatial data into a database comprising lots and parcels, city and/or county boundaries, zoning base and/or overlay, planning areas in order to associate current zoning controls on one or more parcels;
b) automatically obtaining data for real property and importing the data into a database;
c) importing or transferring zoning controls into database comprising district development standards related to individual zoning district basis into a database comprising of lot size and dimensions, floor area ratio, density of units, height requirements, yards or setbacks, parking and/or regulated uses with permissions individual zoning districts into a database comprising identified uses associating each with a permission as identified by the specific zoning district within the jurisdiction such as "permitted" "conditional" and "prohibited";
e) entering search comprising one or more jurisdictions, locations, zoning districts, uses regulated by zoning, development potential building size and search criteria for lot size parameters and/or existing building size range and/or use and/or age;
f) retrieving data matching search criteria comprising one or more properties, districts, uses or jurisdictions the retrieved data to include development standards regarding the physical attributes of how the property might be developed using the parcel's zoning and use permissions comprising of a name of a use and the restriction or permission regarding how the property might be used as it relates to a business, a building type and/or activity; and
g) creating an output comprising data, API, report, inquiry, visual display of data returns on electronic map.

Item 7. A computer implemented method to identify suitable properties by applying logic for zoning compatibility issues, the method comprising:
a) importing geographical information system spatial data into a database comprising lots and parcels, city and/or county boundaries and/or Extra Territorial Jurisdiction boundaries, zoning base and/or overlay districts, street type, planning areas in order to associate zoning controls on one or more parcels;
b) importing data to identify protected uses and/or areas associated with compatibility comprising schools, churches, residential neighborhoods;
c) transferring rules expressing compatibility requirements comprising buffer areas, distance-to rules, adjacency use, nearby uses, adjacency zoning district(s), street type by identifying zoning districts and/or planning areas into structured database with IF/THEN statements articulating conditions;
d) applying rule logic to run queries on a structured database to identify locations with or without zoning compatibility constraints;
e) retrieving data matching criteria; and
f) creating an output comprising data, API, report, visual display of data returns on electronic map Item 8. A computer implemented method to automatically identify and manipulate hypothetical real property development potential and/or use through structured data of real property zoning controls comprising the steps of:
a) importing geographical information system spatial data into a database comprising lots and parcels, city and/or county boundaries and/or Extra Territorial Jurisdiction boundaries, zoning base and/or overlay districts, planning areas in order to associate zoning controls on one or more parcels or part of a parcel basis;
b) automatically obtaining data for real property and importing the data into a database;
c) importing or transferring zoning controls into database comprising district development standards related to individual zoning district basis into a database comprising of lot size and dimensions, floor area ratio, density of units, height requirements, yards or setbacks, parking and/or permissions about uses related to individual zoning districts into a database comprising of the list of identified business uses, building types, activities and associating each with a permission as identified by the specific zoning district within the jurisdiction such as "permitted" "conditional" and "prohibited";
e) creating a search that identifies one or more properties to run a hypothetical query;
f) selecting a hypothetical zoning action comprising rezoning, changing a use permission, changing a development standard and then allows for selecting one or more variables to test outcomes based on the hypothetical situation comprising a zoning district, a permission for a use, a value for specified development standard;
f) retrieving data pertaining to search criteria the retrieved data to include a comparison of existing zoning controls, for the one or more properties identified in the search, to outcomes for the hypothetical scenario in regard to reflect how the property (or properties) might be developed and/or used; and
g) creating an output comprising data, API, report, visual display of data returns on electronic map.

Item 9. A computer implemented method to automatically create a capacity study comprising the steps of:
a) identifying the area for a planning capacity study;
b) applying hypothetical zoning action comprising rezoning, change of use permission and/or change of a development standard;
c) retrieving data pertaining to search criteria the retrieved data to include a comparison of existing zoning controls for the planning capacity study area identified in the search, to outcomes for the hypothetical scenario in regard to reflect how the properties might be developed and/or used;
d) filtering data returns to comprise removal of districts and/or existing uses to iterate results; and
f) creating an output comprising data, API.

What is claimed is:
1. A computer implemented method to automatically standardize zoning districts for a plurality of zoning ordinances, said method comprising the steps of:
a) automatically, by computer, importing Geographic Information System (GIS) spatial data into a database comprising lots and parcels, zoning for base and/or overlay districts for an identified jurisdiction or municipality;
b) manually mapping data elements from the GIS and creating an association with the corresponding key descriptors such as definition, intent or focus for each zoning district, including base and overlays, from the specific jurisdiction zoning ordinance;
c) automatically, by computer, assigning one or more descriptors to each zoning district, from lists of descriptors for properties including zoning district type, land-use/development focus, and/or land-use/development policy focus, wherein a list of descriptors for zoning district type includes one or more of base, overlay, or other, a list of descriptors for land-use/development focus includes one or more of residential, multifamily, mixed-use, commercial, industrial, agricultural, public, planned special or unzoned, a list of descriptors for land-use/development policy focus includes one or more of design, pedestrian friendly, medical/health, entertainment, developer incentive, preservation, or transit related, and the importing, transferring and assigning produce a logic-enhanced database;

d) automatically, by computer, performing a search of the logic-enhanced database for one or more descriptors;

e) automatically, by computer, retrieving a list of parcels identified as meeting criteria of the one or more descriptors; and f) automatically, by computer, creating an output of data.

2. A computer implemented method to automatically standardize zoning use permissions as specified as a zoning control in one or more zoning ordinances, said method comprising the steps of:

a) automatically, by computer, importing GIS spatial data into a database comprising lots and parcels, zoning for base and/or overlay districts for an identified jurisdiction or municipality;

b) manually mapping data elements from the GIS and creating an association with the corresponding key descriptors such as definition, intent or focus for each zoning district, including base and overlays, from the specific jurisdiction zoning ordinance;

c) adding parsed zoning uses from a zoning ordinance for the identified jurisdiction with permissions for individual zoning districts into a database to include the actual name of zoning use identified as a specific business uses and/or building types with a permission as identified by the specific zoning district;

d) automatically, by computer, assigning a land-use/development focus, specific business use and/or building type for each zoning use identified from a list of descriptors, wherein a list of descriptors for land-use/development focus includes one or more of residential, multifamily, mixed-use, commercial, industrial, agricultural, public, or planned special, a list of descriptors for specific business use uses a recognized standardization system to create consistency for a zoning use, a list of descriptors for building types includes one or more of house, duplex, triplex, fourplex, and/or configuration descriptors for freestanding, attached, or semi-attached, and the importing, transferring, adding and assigning produce a logic-enhanced database;

e) automatically, by computer, performing a search of the logic-enhanced database to identify one or more jurisdictions and zoning uses identified by actual name as parsed from ordinance and/or one or more descriptors; and f) automatically, by computer, returning output for identified parcels responsive to the search.

3. The method of claim 2, wherein the permission as identified by the specific zoning district comprises "permitted," "conditional," or "prohibited."

4. The method of claim 2, wherein the recognized standardization system comprises the North American Industry Classification System (NAICS).

5. A computer implemented method to automatically standardize future land use code permissions as specified as a potential future zoning control in one or more future land use comprehensive plans, said method comprising the steps of:

a) automatically, by computer, importing GIS spatial data into a database comprising lots and parcels, future land use for an identified jurisdiction or municipality;

b) manually mapping data elements from the GIS and creating an association with the corresponding key descriptors such as definition, intent or focus for each future land use designation, from the specific jurisdiction zoning comprehensive plan;

c) adding parsed future land use descriptors such as "town center" and associating future land use descriptor with a future zoning use identified as a specific business use and/or building type with a permission as identified by the specific future land use designation such as "permitted" or "conditional" or "prohibited";

d) automatically, by computer, assigning a land-use/development focus and specific business use and/or building type for each future land designation identified from a list of descriptors; wherein list of descriptors for land-use/development focus consists of residential, multifamily, mixed-use, commercial (office and/or retail), industrial, agricultural, public, planned special;

list of descriptors for specific business use using known standardization systems to create consistency for a future zoning use, list of descriptors for building types include house, duplex, triplex, fourplex, apartments and/or configuration descriptors for freestanding, attached, or semi-attached, and the importing, transferring, adding and assigning produce a logic-enhanced database;

e) automatically, by computer, performing a search to identify a one or more jurisdictions and future use(s) identified by actual name as parsed from comprehensive plan and/or descriptor(s); and f) automatically, by computer, returning output(s) for identified parcels that meet the search.

6. The method of claim 5, wherein the permission as identified by the specific zoning district comprises "permitted," "conditional," or "prohibited."

7. The method of claim 5, wherein the recognized standardization system comprises the North American Industry Classification System (NAICS).

* * * * *